(12) United States Patent
Wolf et al.

(10) Patent No.: US 7,088,398 B1
(45) Date of Patent: Aug. 8, 2006

(54) METHOD AND APPARATUS FOR REGENERATING A CLOCK FOR AUXILIARY DATA TRANSMITTED OVER A SERIAL LINK WITH VIDEO DATA

(75) Inventors: Paul Daniel Wolf, San Carlos, CA (US); Adrian Sfarti, Cupertino, CA (US); John D. Banks, Cupertino, CA (US); Stephen J. Keating, Sunnyvale, CA (US); Duane Siemens, Mountain View, CA (US); Eric Lee, San Jose, CA (US); Albert M. Scalise, San Jose, CA (US); Gijung Ahn, Sunnyvale, CA (US); Seung Ho Hwang, Palo Alto, CA (US); Keewook Jung, Santa Clara, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 785 days.

(21) Appl. No.: 10/171,860

(22) Filed: Jun. 14, 2002

Related U.S. Application Data

(63) Continuation-in-part of application No. 10/095,422, filed on Mar. 12, 2002, and a continuation-in-part of application No. 10/036,234, filed on Dec. 24, 2001.

(51) Int. Cl.
*H04N 7/08* (2006.01)
*H04N 7/12* (2006.01)
*H04N 7/52* (2006.01)

(52) U.S. Cl. .................. 348/423.1; 348/473; 348/478; 348/465; 348/515; 348/425.4; 375/240.28

(58) Field of Classification Search ............. 348/423.1, 348/425.3, 425.4, 473, 476, 477, 515, 512, 348/500, 461, 462, 465, 468, 478; 370/464, 370/535, 536; 375/365, 366, 368, 244, 219, 375/240.26, 240.28
See application file for complete search history.

(56) References Cited

U.S. PATENT DOCUMENTS 5,150,211 A 9/1992 Charbonnel et al. ........ 358/143

(Continued)

FOREIGN PATENT DOCUMENTS

WO WO 00/16525 3/2000

OTHER PUBLICATIONS

*High-Bandwidth Digital Content Protection System*, Revision 1.0, by Intel Corporation, Feb. 17, 2000, pp. 1-60.
*High-Bandwith Digital Content Protection System Revision 1.0 Erratum*, by Intel Corporation, Mar. 19, 2001, pp. 1-9.
*Upstream Link for High-bandwidth Digital Content Protection*, Revision 1.00, by Intel Corporation, Jan. 26, 2001, pp. 1-38.

(Continued)

*Primary Examiner*—David Ometz
*Assistant Examiner*—Jean W. Désir
(74) *Attorney, Agent, or Firm*—Girard & Equitz LLP

(57) ABSTRACT

A communication system including a transmitter, a receiver, and a serial link, in which encoded data (e.g., video, audio, and optionally also other auxiliary data) are transmitted from the transmitter to the receiver. The serial link can but need not be a TMDS or TMDS-like link. In typical embodiments, packets of encoded audio data are transmitted over each of one or more channels of the link during data islands between bursts of encoded video data, a pixel clock is transmitted over the link, and the receiver regenerates a clock for the audio data using time code data in the packets and the pixel clock. Other aspects of the invention are transmitters for transmitting encoded data and a pixel clock over a serial link, receivers for receiving such data and pixel clock and performing audio clock regeneration, and methods for transmitting encoded data and a pixel clock over a serial link and performing clock regeneration using the transmitted data and pixel clock.

45 Claims, 22 Drawing Sheets

U.S. PATENT DOCUMENTS

| | | | | |
|---|---|---|---|---|
| 5,199,030 | A | 3/1993 | Ueda | 370/68 |
| 5,241,382 | A | 8/1993 | Paik et al. | 358/133 |
| 5,420,866 | A | 5/1995 | Wasilewski | 370/110.1 |
| 5,475,421 | A | 12/1995 | Palmer et al. | 348/15 |
| 5,506,932 | A | 4/1996 | Holmes et al. | 395/2.14 |
| 5,515,373 | A | 5/1996 | Lynch et al. | 370/79 |
| 5,521,979 | A | 5/1996 | Deiss | 380/20 |
| 5,523,795 | A | 6/1996 | Ueda | 348/480 |
| 5,541,662 | A | 7/1996 | Adams et al. | 348/460 |
| 5,550,589 | A * | 8/1996 | Shiojiri et al. | 348/386.1 |
| 5,835,498 | A * | 11/1998 | Kim et al. | 370/537 |
| 5,905,769 | A | 5/1999 | Lee et al. | 375/376 |
| 5,940,070 | A | 8/1999 | Koo | 345/302 |
| 5,974,464 | A | 10/1999 | Shin et al. | 709/231 |
| 6,072,832 | A | 6/2000 | Katto | 375/240 |
| 6,141,691 | A | 10/2000 | Frink et al. | 709/233 |
| 6,148,135 | A * | 11/2000 | Suzuki | 386/12 |
| 6,151,334 | A | 11/2000 | Kim et al. | 370/468 |
| 6,157,674 | A | 12/2000 | Oda et al. | 375/240 |
| 6,191,822 | B1 | 2/2001 | Smyers | 348/552 |
| 6,208,715 | B1 | 3/2001 | Haavisto | 379/88.07 |
| 6,212,201 | B1 | 4/2001 | Hinderks et al. | 370/468 |
| 6,249,669 | B1 | 6/2001 | Ogino et al. | 455/63 |
| 6,744,815 | B1 * | 6/2004 | Sackstein et al. | 375/240 |
| 6,904,089 | B1 * | 6/2005 | Sueyoshi et al. | 375/240 |
| 6,914,637 | B1 * | 7/2005 | Wolf et al. | 348/473 |
| 6,917,366 | B1 * | 7/2005 | West et al. | 345/558 |
| 6,931,071 | B1 * | 8/2005 | Haddad et al. | 375/240.28 |
| 7,027,714 | B1 * | 4/2006 | Ohta et al. | 386/68 |
| 7,030,930 | B1 * | 4/2006 | Kovacevic | 348/515 |
| 2001/0044713 | A1 | 11/2001 | Lokhoff et al. | |
| 2002/0163598 | A1 | 11/2002 | Pasqualino | |
| 2003/0037342 | A1 | 2/2003 | Pasqualino | |
| 2003/0133509 | A1 | 7/2003 | Yanagihara et al. | |

OTHER PUBLICATIONS

Lieberman, David "PC Video Interface Looks to Add Audio Capability", *EE Times* (Mar. 26, 2001, 11:57 a.m. EST), pp. 1-3, downloaded from the Internet on May 23, 2001 from http://www.eetimes.com/story/OEG20010326S0029.

Silicon Image, Inc., *"Silicon Image First to Couple Digital Audio and Video on the DVI Link"*, Sunnyvale, Jan. 16, 2001, pp. 1-4, downloaded from the Internet on May 22, 2001 from http://www.siimage.com/press/01_16_01.asp.

Silicon Image, Inc., *"CE Industry Heavyweights Proclaim DVI HDCP as the Interface for HDTV-Further Propelling Silicon Image into the CE Space"*, Las Vegas, Jan. 4, 2001, pp. 1-4, downloaded from the Internet on May 22, 2001 from http://www.siimage.com/press/01_04_01a.asp.

* cited by examiner

| Specific CTL | CTL [1:0] | Preamble (q0:q9) | Guardband (q0:q9) | GB (d7:d0) | Purpose |
|---|---|---|---|---|---|
| R (CTL [3:2]) | 00 | 0010101011 | 0011001101 | 0xAB | Video Preamble/Video Guardband/Post-Data Aux Guardband |
| G (CTL [1:0]) | 00 | 0010101011 | 0011001101 | 0xAB | Video Preamble/Video Guardband/Post-Data Aux Guardband |
| B (VSYNC:HSYNC) | XX | 1 of 4 values | 0011001101 | 0xAB | Video Preamble/Video Guardband |
| R (CTL [3:2]) | 01 | 1101010100 | 1100110010 | 0x55 | Aux Preamble/Pre-Data Aux Guardband |
| G (CTL [1:0]) | 10 | 0010101010 | 1100110010 | 0x55 | Aux Preamble/Pre-Data Aux Guardband |
| B (VSYNC:HSYNC) | XX | 1 of 4 values | 1 of 4 values | 0x5B, 0xB5, 0xD3, 0xD9 | Aux Preamble/Pre- or Post-Data Aux Guardband |
| R (CTL [3:2]) | 10 | 0010101010 | | | VSync Window, HDCP enabled |
| G (CTL [1:0]) | 00 | 0010101011 | | | VSync Window, HDCP enabled |
| B (VSYNC:HSYNC) | XX | 1 of 4 values | | | VSync Window, HDCP enabled |

FIG. 3

17 Ordered Codes

| | Input D7-D0 | Hex | TMDS pattern | TMDS result | Rx Decode | Hex | Highly Probable |
|---|---|---|---|---|---|---|---|
| PRE-DATA GUARD BAND for Aux data | 01010101 | 55 | 1100110010 | 1110110010 | 01011001 | 59 | |
| | | | | 1100010010 | 01100101 | 65 | |
| | | | | 1100111010 | 10010101 | 95 | IGNORE |
| | | | | 1100110000 | 10101011 | AB | IGNORE |
| AD0 | 01011011 | 5B | 0011100101 | 1011100101 | 01011000 | 58 | |
| | | | | 0001100101 | 01010111 | 57 | |
| | | | | 0011110101 | 00111011 | 3B | |
| | | | | 0011100001 | 11011011 | DB | |
| AD1 | 10110101 | B5 | 0110001101 | 1110001101 | 10110110 | B6 | IGNORE |
| | | | | 0111001101 | 10101101 | AD | |
| | | | | 0110000101 | 01110101 | 75 | |
| | | | | 0110001111 | 01001011 | 4B | IGNORE |
| AD2 | 11010011 | D3 | 0010011101 | 1010011101 | 11010000 | D0 | |
| | | | | 0000011101 | 11011111 | DF | |
| | | | | 0010001101 | 10110011 | B3 | |
| | | | | 0010011111 | 00101101 | 2D | |
| AD3 | 11011001 | D9 | 0100011101 | 1100011101 | 11011010 | DA | IGNORE |
| | | | | 0100001101 | 10111001 | B9 | |
| | | | | 0100011111 | 00100111 | 27 | |
| AD4 | 01101101 | 6D | 0111000101 | 1111000101 | 01101110 | 6E | |
| | | | | 0111100101 | 01011101 | 5D | |
| | | | | 0111000001 | 11101101 | ED | |
| | | | | 1111100101 | 01011110 | 5E | |
| AD5 | 10100100 | A4 | 0011100110 | 1011100110 | 10100111 | A7 | IGNORE |
| | | | | 0001100110 | 10101000 | A8 | |
| | | | | 0011110110 | 11000100 | C4 | |
| | | | | 0011100010 | 00100100 | 24 | |
| | | | | 0011100111 | 10100101 | C5 | IGNORE |

FIG. 4A

| | | | | | | |
|---|---|---|---|---|---|---|
| AD6 | 10010010 | 92 | 0111000110 | 1111000110 | 10010001 | 91 | |
| | | | | 0111100110 | 10100010 | A2 | |
| | | | | 0111000010 | 00010010 | 12 | |
| | | | | 0111000111 | 10010011 | 93 | IGNORE |
| AD7 | 01000100 | 44 | 0011110010 | 1011110010 | 01000111 | 47 | |
| | | | | 0001110010 | 01001000 | 48 | |
| | | | | 0011111010 | 10000100 | 84 | |
| | | | | 0011110000 | 10111010 | BA | IGNORE |
| AD8 | 00100010 | 22 | 0111100010 | 1111100010 | 00100001 | 21 | |
| | | | | 0111110010 | 01000010 | 42 | |
| | | | | 0111100000 | 11011100 | DC | |
| | | | | 0111110000 | 10111100 | BC | |
| AD9 | 01001011 | 4B | 1001110010 | 1101110010 | 01001101 | 4D | |
| | | | | 1000110010 | 01010011 | 53 | |
| | | | | 1001111010 | 10001011 | 8B | |
| | | | | 1001110000 | 10110101 | B5 | IGNORE |
| AD10 | 10010011 | 93 | 1000111010 | 1100111010 | 10010101 | 95 | |
| | | | | 1000011010 | 10100011 | A3 | |
| | | | | 1000111110 | 00010011 | 13 | |
| GUARD BAND for video data and POST-DATA GUARD BAND for Aux Data (and AD11) | 10101011 | AB | 0011001101 | 1011001101 | 10101000 | A8 | IGNORE |
| | | | | 0001001101 | 10100111 | A7 | |
| | | | | 0011101101 | 10011011 | 9B | |
| | | | | 0011000101 | 01101011 | 6B | |
| | | | | 0011001111 | 01010101 | 55 | IGNORE |
| AD12 | 01011010 | 5A | 1100011001 | 1110011001 | 01010110 | 56 | |
| | | | | 1100001001 | 00111010 | 3A | |
| | | | | 1100011101 | 11011010 | DA | IGNORE |
| | | | | 1100011000 | 01011011 | 5B | IGNORE |
| AD13 | 01101100 | 6C | 1000111001 | 1100111001 | 01101010 | 6A | |
| | | | | 1000011001 | 01011100 | 5C | |
| | | | | 1000111101 | 11101100 | EC | |
| | | | | 1000111000 | 01101101 | 6D | IGNORE |
| AD14 | 10100101 | A5 | 1100011010 | 1110011010 | 10101001 | A9 | |
| | | | | 1100001010 | 11000101 | C5 | |
| | | | | 1100011110 | 00100101 | 25 | |
| AD15 | 10111010 | BA | 1100001101 | 1110001101 | 10110110 | B6 | |
| | | | | 1100000101 | 01111010 | 7A | |

FIG. 4B

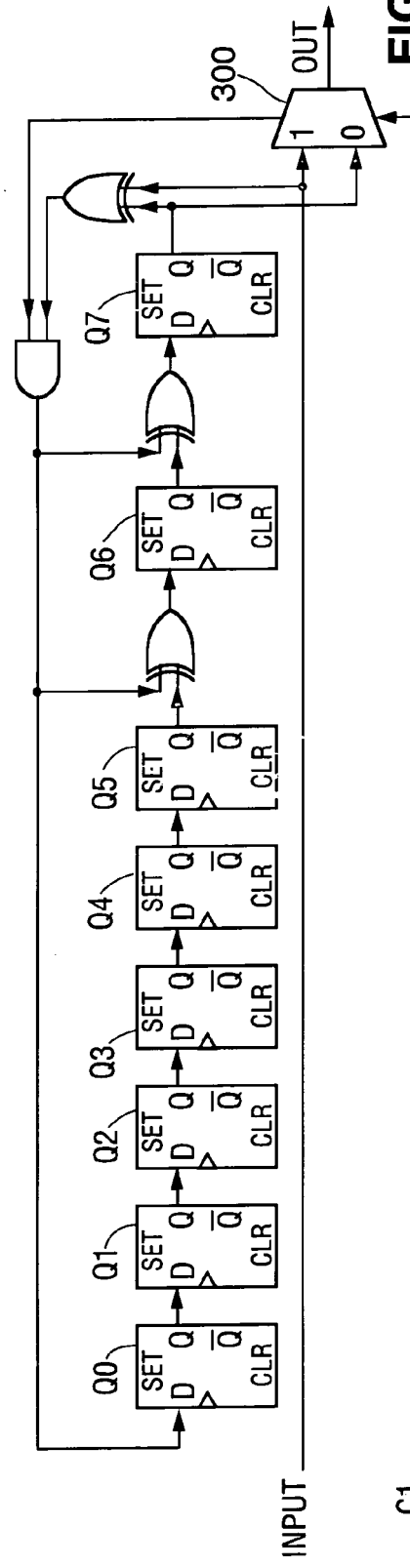
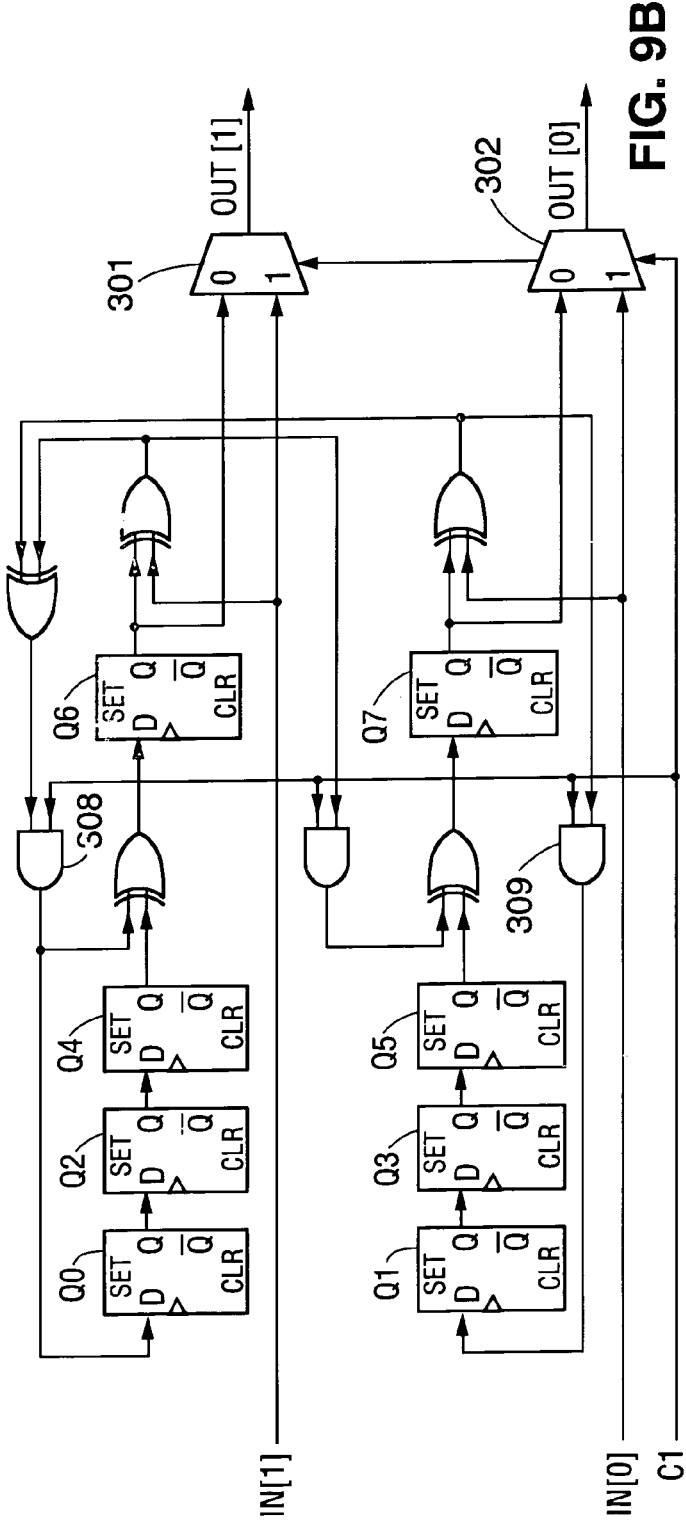
FIG. 9A
FIG. 9B (Case 1: Asynchronous Link Integrity Checks)

(Case 2: Synchronous Link Integrity Checks (Good))

(Case 3: Synchronous Link Integrity Checks (Bad))

(Case 4: Ciphers Out-of-Sequence, Async Checks)

(Case 5: Ciphers Out of Sequence, Sync Checks (Very Bad))

METHOD AND APPARATUS FOR REGENERATING A CLOCK FOR AUXILIARY DATA TRANSMITTED OVER A SERIAL LINK WITH VIDEO DATA

CROSS-REFERENCE TO RELATED APPLICATION

This application is a continuation-in-part of pending U.S. patent application Ser. No. 10/036,234, filed on Dec. 24, 2001, and assigned to the assignee of the present application, and a continuation-in-part of pending U.S. patent application Ser. No. 10/095,422, filed on Mar. 12, 2002, and assigned to the assignee of the present application,

TECHNICAL FIELD OF THE INVENTION

The invention pertains to methods and systems for transmitting encoded video data and at least one other stream of encoded data (e.g., encoded video data and packets of encoded audio and/or other auxiliary data) over a serial link, and to transmitters and receivers for use in such systems. In preferred embodiments, the serial link is a transition minimized differential signaling ("TMDS") link, or a link having some but not all of the characteristics of a TMDS link.

BACKGROUND OF THE INVENTION

Throughout the specification, decimal ("base 10") numbers are represented using no additional prefixes or suffixes, and the following notation is sometimes used:

"bit 0" denotes the least-significant bit of a byte or word;

the prefix "0x" denotes that the following symbol is a hexadecimal representation of a number (for example "0xC" denotes a binary number 1100); and the prefix "0b" denotes that the following symbol is a binary (base-2) representation of a number (for example "0b1000" denotes a decimal number 8).

Elements of this invention are based upon properties of a serial link. Various serial links for transmitting data and clock signals are well known.

One conventional serial link, used primarily for high-speed transmission of video data from a host processor (e.g., a personal computer) to a monitor, is known as a transition minimized differential signaling interface ("TMDS" link). The characteristics of a TMDS link include the following:

1. video data are encoded and then transmitted as encoded words (each 8-bit word of digital video data is converted to an encoded 10-bit word before transmission);

a. the encoding determines a set of "in-band" words and a set of "out-of-band" words (the encoder can generate only "in-band" words in response to video data, although it can generate "out-of-band" words in response to control or sync signals. Each in-band word is an encoded word resulting from encoding of one input video data word. All words transmitted over the link that are not in-band words are "out-of-band" words);

b. the encoding of video data is performed such that the in-band words are transition minimized (a sequence of in-band words has a reduced or minimized number of transitions);

c. the encoding of video data is performed such that the in-band words are DC balanced (the encoding prevents each transmitted voltage waveform that is employed to transmit a sequence of in-band words from deviating by more than a predetermined threshold value from a reference potential. Specifically, the tenth bit of each "in-band" word indicates whether eight of the other nine bits thereof have been inverted during the encoding process to correct for an imbalance between running counts of ones and zeroes in the stream of previously encoded data bits);

2. the encoded video data and a video clock signal are transmitted as differential signals (the video clock and encoded video data are transmitted as differential signals over conductor pairs);

3. three conductor pairs are employed to transmit the encoded video, and a fourth conductor pair is employed to transmit the video clock signal; and 4. signal transmission occurs in one direction, from a transmitter (typically associated with a desktop or portable computer, or other host) to a receiver (typically an element of a monitor or other display device).

A use of the TMDS serial link is the "Digital Visual Interface" interface ("DVI" link) adopted by the Digital Display Working Group. It will be described with reference to FIG. 1. A DVI link can be implemented to include two TMDS links (which share a common conductor pair for transmitting a video clock signal) or one TMDS link, as well as additional control lines between the transmitter and receiver. The DVI link of FIG. 1 includes transmitter 1, receiver 3, and the following conductors between the transmitter and receiver: four conductor pairs (Channel 0, Channel 1, and Channel 2 for video data, and Channel C for a video clock signal), Display Data Channel ("DDC") lines for bidirectional communication between the transmitter and a monitor associated with the receiver in accordance with the conventional Display Data Channel standard (the Video Electronics Standard Association's "Display Data Channel Standard," Version 2, Rev. 0, dated Apr. 9, 1996), a Hot Plug Detect (HPD) line (on which the monitor transmits a signal that enables a processor associated with the transmitter to identify the monitor's presence), Analog lines (for transmitting analog video to the receiver), and Power lines (for providing DC power to the receiver and a monitor associated with the receiver). The Display Data Channel standard specifies a protocol for bidirectional communication between a transmitter and a monitor associated with a receiver, including transmission by the monitor of an Extended Display Identification ("EDID") message that specifies various characteristics of the monitor, and transmission by the transmitter of control signals for the monitor. Transmitter 1 includes three identical encoder/serializer units (units 2, 4, and 6) and additional circuitry (not shown). Receiver 3 includes three identical recovery/decoder units (units 8, 10, and 12) and inter-channel alignment circuitry 14 connected as shown, and additional circuitry (not shown).

As shown in FIG. 1, circuit 2 encodes the data to be transmitted over Channel 0, and serializes the encoded bits. Similarly, circuit 4 encodes the data to be transmitted over Channel 1 (and serializes the encoded bits), and circuit 6 encodes the data to be transmitted over Channel 2 (and serializes the encoded bits). Each of circuits 2, 4, and 6 responds to a control signal (an active high binary control signal referred to as a "data enable" or "DE" signal) by selectively encoding either digital video words (in response to DE having a high value) or a control or synchronization signal pair (in response to DE having a low value). Each of encoders 2, 4, and 6 receives a different pair of control or synchronization signals: encoder 2 receives horizontal and vertical synchronization signals (HSYNC and VSYNC); encoder 4 receives control bits CTL0 and CTL1; and encoder 6 receives control bits CTL2 and CTL3. Thus, each of encoders 2, 4, and 6 generates in-band words indicative of video data (in response to DE having a high value), encoder 2 generates out-of-band words indicative of the values of HSYNC and VSYNC (in response to DE having a low value), encoder 4 generates out-of-band words indicative of the values of CTL0 and CTL1 (in response to DE having a low value), and encoder 6 generates out-of-band words indicative of the values of CTL2 and CTL3 (in response to DE having a low value). In response to DE having a low value, each of encoders 4 and 6 generates one of four specific out-of-band words indicative of the values 00, 01, 10, or 11, respectively, of control bits CTL0 and CTL1 (or CTL2 and CTL3).

It has been proposed to encrypt video data transmitted over a serial link. For example, it has been proposed to use a cryptographic protocol known as "High-bandwidth Digital Content Protection" ("HDCP") to encrypt digital video to be transmitted over a DVI link and to decrypt the data at the DVI receiver. A DVI transmitter implementing HDCP outputs a 24-bit bus, known as cout[23:0], during the video active period (i.e. when DE is high). This 24-bit cout data is "Exclusive Ored" (in logic circuitry in the transmitter) with the 24-bit RGB video data input to the transmitter in order to encrypt the video data. The encrypted data is then encoded (according to the TMDS standard) for transmission. The same cout data is also generated in the receiver. After the encoded and encrypted data received at the receiver undergoes TMDS decoding, the cout data is processed together with the decoded video in logic circuitry in order to decrypt the decoded data and recover the original input video data.

Before the transmitter begins to transmit HDCP encrypted, encoded video data, the transmitter and receiver communicate bidirectionally with each other to execute an authentication protocol (to verify that the receiver is authorized to receive protected content, and to establish shared secret values for use in encryption of input data and decryption of transmitted encrypted data). After the receiver has been authenticated, the transmitter calculates the initial set of encryption keys (for encrypting the first line of input video data) in response to a control signal and sends the control signal to the receiver (during each vertical blanking period, when DE is low) to cause the receiver to calculate an initial set of decryption keys (for decrypting the first received and decoded line of transmitted video data). Following generation of the initial set of encryption/decryption keys, each of the transmitter and receiver performs a re-keying operation during each blanking (vertical or horizontal) interval to generate a new set of keys for encrypting (or decrypting) the next line of video data, and actual encryption of input video data (or decryption of received, decoded video data) is performed using the latest set of keys only when DE is high (not during the blanking intervals).

Each of the transmitter and receiver includes an HDCP cipher circuit (sometimes referred to herein as an "HDCP cipher") including a linear feedback shift register (LFSR) module, a block module coupled to the output of the LFSR module, and an output module coupled to an output of the block module. The LFSR module is employed to re-key the block module in response to each assertion of an enable signal, using a session key (Ks) and frame key (Ki). The block module generates (and provides to the LFSR module) the key Ks at the start of a session and generates (and applies to the LFMS module) a new value of key Ki at the start of each frame of video data (in response to a rising edge of a control signal which occurs in the first vertical blanking interval of a frame).

The block module comprises two halves, known as "Round Function K" and "Round Function B." Round Function K includes 28-bit registers Kx, Ky, and Kz, seven S-Boxes (each a 4 input bit by 4 output bit S-Box including a look-up table), and a linear transformation unit K. Round Function B includes 28-bit registers Bx, By, and Bz, seven S-Boxes (each a 4 input bit by 4 output bit S-Box including a look-up table), and a linear transformation unit B. Round Function K and Round Function B are similar in design, but Round Function K performs one round of a block cipher per clock cycle to assert (to the output module) a different pair of 28-bit round keys (Ky and Kz) each clock cycle in response to the output of the LFSR module, and Round Function B performs one round of a block cipher per clock cycle, in response to each 28-bit round key Ky from Round Function K and the output of the LFSR module, to assert (to the output module) a different pair of 28-bit round keys (By and Bz) each clock cycle. The transmitter generates value An at the start of the authentication protocol and the receiver responds to it during the authentication procedure. The value An is used to randomize the session key. The block module operates in response to the authentication value (An) and an initialization value (Mi, also referred to as an integrity verification key) which is updated by the output module at the start of each frame.

Each of linear transformation units K and B outputs 56 bits per clock cycle. These output bits are the combined outputs of eight diffusion networks in each transformation unit. Each diffusion network of linear transformation unit K produces seven output bits in response to seven of the current output bits of registers Ky and Kz. Each of four of the diffusion networks of linear transformation unit B produces seven output bits in response to seven of the current output bits of registers By, Bz, and Ky, and each of the four other diffusion networks of linear transformation unit B produces seven output bits in response to seven of the current output bits of registers By and Bz.

The output module performs a compression operation on the 28-bit keys (By, Bz, Ky and Kz) asserted to it (a total of 112 bits) by the block module during each clock cycle, to generate one 24-bit block of pseudo-random bits cout[23:0] per clock cycle. Each of the 24 output bits of the output module consists of the exclusive OR ("XOR") of nine terms.

In the transmitter, logic circuitry receives each 24-bit block of cout data and each input 24-bit RGB video data word, and performs a bitwise XOR operation thereon in order to encrypt the video data, thereby generating a word of encrypted RGB video data. Typically, the encrypted data subsequently undergoes TMDS encoding before it is transmitted to a receiver. In the receiver, logic circuitry receives each 24-bit block of cout data and each recovered 24-bit RGB video data word (after the recovered data has undergone TMDS decoding), and performs a bitwise XOR operation thereon in order to decrypt the recovered video data.

Throughout the specification the expression "TMDS-like link" will be used to denote a serial link capable of transmitting encoded data (e.g., encoded digital video data) and a clock for the encoded data, from a transmitter to a receiver, and also capable of transmitting (bidirectionally or unidirectionally) one or more additional signals (e.g., encoded digital audio data or other encoded data) between the transmitter and receiver, that is or includes either a TMDS link or a link having some but not all of the characteristics of a TMDS link. Examples of TMDS-like links include links that differ from TMDS links only by encoding data as N-bit code words (e.g., with N 10) that are not 10-bit TMDS code words, and links that differ from TMDS links only by transmitting encoded video over more than three or less than three conductor pairs. There are several conventional TMDS-like links.

The term "transmitter" is used herein in a broad sense to denote any device capable of encoding data and transmitting the encoded data over a serial link (and optionally also performing additional functions, which can include encrypting the data to be transmitted and other operations related to encoding, transmission, or encryption of the data). The term "receiver" is used herein in a broad sense to denote any device capable of receiving and decoding data that has been transmitted over a serial link (and optionally also performing additional functions, which can include decrypting the received data and other operations related to decoding, reception, or decryption of the received data). For example, the term transmitter can denote a transceiver that performs the functions of a receiver as well as the functions of a transmitter. In a more specific example, the term transmitter (with reference to a device that transmits non-audio auxiliary data over a TMDS-like link or other serial link) can denote a transceiver that is configured to receive video data and audio data over the link and to transmit the non-audio auxiliary data over the link.

Some TMDS-like links encode input video data (and other data) to be transmitted into encoded words comprising more bits than the incoming data using a coding algorithm other than the specific algorithm used in a TMDS link, and transmit the encoded video data as in-band characters and the other encoded data as out-of-band characters. The characters need not be classified as in-band or out-of-band characters based according to whether they satisfy transition minimization and DC balance criteria. Rather, other classification criteria could be used. An example of an encoding algorithm, other than that used in a TMDS link but which could be used in a TMDS-like link, is IBM 8b10b coding. The classification (between in-band and out-of-band characters) need not be based on just a high or low number of transitions. For example, the number of transitions of each of the in-band and out-of-band characters could (in some embodiments) be in a single range (e.g., a middle range defined by a minimum and a maximum number of transitions).

The data transmitted between the transmitter and receiver of a TMDS-like link can, but need not, be transmitted differentially (over a pair of conductors). Also, although a TMDS link has four differential pairs (in the single pixel version), three for video data and the other for a video clock, a TMDS-like link could have a different number of conductors or conductor pairs.

Typically, the primary data transmitted by a TMDS link are video data. What is often significant about this is that the video data are not continuous, and instead have blanking intervals. These blanking intervals provide an opportunity (exploited in some embodiments of the present invention) for auxiliary data to be transported, and they represent unused bandwidth. However, many serial links do not transmit data having blanking intervals, and thus do not encode input data (for transmission) in response to a data enable signal. For example, audio serial links would typically transmit continuous data.

The expression "auxiliary data" is used in a broad sense herein to denote digital audio data or any other type of data other than video data and timing information for video data (e.g., a video clock). For example, timing information for audio data (e.g., a clock for recovering transmitted audio data) falls within the scope of "auxiliary data." Other examples of "auxiliary data" transmitted in accordance with the invention include computer keyboard signals, still image data (generated by a camera, for example), text data, control signals for a power supply, picture in picture data, monitor control information (audio volume, brightness, power state), control signals for indicator lights on a monitor or keyboard, non-audio or video control information, etc.

The term "stream" of data, as used herein, denotes that all the data are of the same type and is transmitted with the same clock frequency. The term "channel," as used herein, refers to that portion of a serial link that is employed to transmit data (e.g., a particular conductor or conductor pair between the transmitter and receiver over which the data are transmitted, and specific circuitry within the transmitter and/or receiver used for transmitting and/or recovery of the data) and to the technique employed to transmit the data over the link. Because it is desirable to transmit many different streams of auxiliary data in important applications of the invention, preferred embodiments of the invention provide multiple channels for transmission of auxiliary data, including channels for transmission of auxiliary data in both directions over the link (that is, with and against the direction of the video data). In some implementations, a channel is employed to transmit one stream of auxiliary data. In other implementations, a channel is employed to transmit more than one stream of auxiliary data. In some embodiments of the invention, two (or more than two) streams of serial video data are transmitted (over one, two, or more than two channels), and either one, two, or more than two streams of serial auxiliary data are also transmitted.

U.S. Pat. No. 5,999,571, issued Dec. 7, 1999, teaches (e.g., at col. 5) that, when the code words (indicative of video data) transmitted over a TMDS link are transition minimized words (a first subset of a set of code words), synchronization words (distinguishable from the transition minimized code words) can be transmitted over the link during "preamble" periods in which encoded video data are not transmitted. The synchronization words can be transition maximized words that are members of a second subset (disjoint from the first subset) of the set of code words. U.S. Pat. No. 5,999,571 teaches that several (e.g., three) repetitions of a synchronization word should be transmitted consecutively, to allow the decoder (in the receiver) rapidly and accurately to identify a specific transition (e.g., the leading edge) of one of the synchronization words and thus to accomplish synchronization with the encoder (in the transmitter.

U.S. Pat. No. 6,151,334, issued Nov. 21, 2000, teaches transmission (over a TMDS link) of several different types of encoded control words, each distinguishable from transition minimized code words indicative of data. At least some of the control words can be transition maximized words. One of the control words is a "data stream separation" word that is transmitted before or after a burst of data and is indicative of the start or end of a burst and the type of data transmitted during the burst. Another one of the control words is an "isochronous data transfer" word that is a synchronization character typically transmitted at the beginning or end of a blanking interval and indicates the type of the blanking interval (e.g., horizontal or vertical) and distinguishes between the beginning and the end of the blanking interval. For example, a first isochronous data transfer word indicates the start of a vertical blanking interval, a first data stream separation word then indicates the start of a burst of data in the vertical blanking interval, a second data stream separation word then indicates the end of such data burst, and a second isochronous data transfer word then indicates the end of the vertical blanking interval.

Each of the first isochronous data transfer word, the first data stream separation word, the second data stream separation word, and the second isochronous data transfer word is a transition maximized code word, a transition minimized code word can indicate each word of data of the data burst (transmitted in the vertical blanking interval), and the vertical blanking interval can be followed by an active video period comprising a third data stream separation word (indicative of the start of a stream of video data) followed by a stream of transition minimized code words indicative of the video data itself.

SUMMARY OF THE INVENTION

In a class of embodiments, the invention is a communication system including a transmitter, a receiver, and a serial link (having at least one channel), for transmitting a stream of encoded video data and at least one other stream of encoded data (e.g., encoded audio data) over each of one or more channels of the link from the transmitter to the receiver. In preferred embodiments, the serial link is a TMDS or TMDS-like link. In preferred embodiments, the transmitter sends encoded video to the receiver over each of one or more video channels of the link during active video periods, and sends packets including encoded auxiliary data (e.g., audio data) to the receiver over each of at least one of the video channels during data islands, wherein each of the data islands is a time interval that neither coincides with nor overlaps any of the active video periods. The transmitter preferably also transmits control data to the receiver over each of at least one of the video channels during control data periods, wherein the control data periods neither coincide with nor overlap any of the data islands and neither coincide with nor overlap any of the active video periods. Other aspects of the invention are transmitters for use in formatting and encoding multiple streams of data for transmission over a serial link, receivers for receiving and decoding multiple streams of encoded data transmitted over a serial link, and methods for sending multiple streams of encoded data over a serial link.

One or more packets can be transmitted in each data island. In each control data periods (sometimes referred to as a "control data interval" or "control period"), encoded control words (preferably including sync words and preamble words) can be transmitted.

In a class of systems that embody the invention, 8-bit video data words (each encoded using the TMDS encoding algorithm as a 10-bit, transition-minimized code word) are transmitted over the video channels of a TMDS link (or other TMDS-like link having multiple channels for transmitting serial video) during active video periods. During data islands between the active video periods, packets containing 4-bit words (typically including 4-bit audio data words), each encoded according to the TMDS encoding algorithm as a 10-bit, transition-minimized code word, and preferably as a 10-bit golden word, are transmitted over each of at least some of the video channels. During control data periods between the active video periods and data islands, the transmitter sends control words (each encoded as a 10-bit, transition-maximized code word indicative of two control bits: CTL0 and CTL1, or CTL2 and CTL3) and sync words (each encoded as a 10-bit, transition-maximized code word indicative of two sync bits: HSYNC and VSYNC) over the video channels. During each active video period, HSYNC, VSYNC, CTL0, CTL1, CTL2, and CTL3 are assumed by the receiver to maintain the values that they had when the active video period started.

Preferably, transition-minimized code words indicative of HSYNC and VSYNC bits are sent (e.g., one code word per pixel clock cycle, each word indicative of an HSYNC bit, a VSYNC bit, a packet header bit, and another bits) over one channel (e.g., CH0) during each data island.

In a class of embodiments, the invention is a system, including a receiver, a transmitter; and a serial link comprising at least one video channel between the transmitter and the receiver. The transmitter is configured to receive video data and audio data, to generate encoded video data and encoded audio data by encoding the video data and audio data, to transmit code words indicative of the encoded video data over the video channel to the receiver in response to a pixel clock during active video periods, and to transmit packets including encoded auxiliary data to the receiver during data islands by transmitting code words indicative of the packets over the link in response to the pixel clock. The encoded auxiliary data include the encoded audio data. The transmitter is configured to include time code data in at least some of the packets, and the time code data together with the pixel clock are indicative of an audio clock for the audio data. In preferred embodiments in which the encoded video data are transmitted over video channels of a TMDS link (during active video periods), a pixel clock is transmitted over the clock channel of the TMDS link, and packets containing audio (or other auxiliary data) are transmitted over the video channels in intervals between active video periods, the packets also contain time stamp data that (with the pixel clock) determine a clock for the auxiliary data.

In other embodiments, the invention is a transmitter configured to be coupled to a serial link having at least one video channel and at least one video clock channel. The transmitter includes at least one input coupled to receive video data and at least one input coupled to receive audio data, at least two outputs configured to be coupled to the link, including a clock output configured to be coupled to the video clock channel, and circuitry (coupled between the outputs and each input) configured to generate encoded video data and encoded audio data by encoding the video data and audio data, to assert code words indicative of the encoded video data to at least one of the outputs in response to a pixel clock during active video periods, to assert packets including encoded auxiliary data to at least one of the outputs during data islands, and to assert the pixel clock to the clock output. The encoded auxiliary data include the encoded audio data. The circuitry is configured to include time code data (indicative of time stamps) in at least some of the packets, and the time code data together with the pixel clock are indicative of an audio clock for the audio data. In preferred embodiments, the transmitter includes a frequency divider coupled to receive a master audio clock having frequency F and configured to generate an intermediate clock having frequency F/N in response to the master audio clock (where N is a denominator value), and a cycle time counter, coupled to receive the intermediate clock and the pixel clock, and configured to generate data indicative of the time stamps such that each of the time stamps is indicative of a number of cycles of the pixel clock that have elapsed during the most recent cycle of the intermediate clock.

In other embodiments, the invention is a receiver configured to be coupled to a serial link having at least one video channel and at least one video clock channel. The receiver has at least two inputs configured to be coupled to the link, including a clock input configured to be coupled to the video clock channel, at least one video output for asserting video data recovered from the link and at least one audio output for asserting audio data recovered from the link, and circuitry (coupled between the inputs and each output) configured to receive a pixel clock from the clock input, to generate recovered video data including by decoding encoded video data received at at least one of the inputs during active video periods in response to the pixel clock, to assert the recovered video data to the at least one video output, to generate decoded data including by decoding code words of packets of encoded auxiliary data received at at least one of the inputs during data islands in response to the pixel clock, to generate at least one stream of audio data from the decoded data. The receiver asserts each stream of audio data to the at least one audio output. At least some of the decoded data are time code data indicative of time stamps, and the time code data together with the pixel clock are indicative of an audio clock for the audio data.

Preferably, at least some of the decoded data are indicative of a denominator value N that has been employed to generate the time stamps, and the receiver includes a frequency divider (coupled to receive the pixel clock and the time code data indicative of time stamps) configured to generate an intermediate clock having frequency M/N in response thereto, where M is a master audio clock frequency, and a PLL (coupled to receive the intermediate clock and the decoded data indicative of the denominator value N) configured to generate in response thereto a regenerated master audio clock having the frequency M.

BRIEF DESCRIPTION OF THE DRAWINGS

FIG. 3 is a table showing data patterns transmitted in "auxiliary preamble" and "video preamble" portions of a control data period, and guard band code words transmitted after such auxiliary preamble and video preamble portions, in some embodiments of the invention.

FIGS. 4A and 4B are first and second parts, respectively, of a table showing a set of seventeen of the inventive code words (including two guard band words) that are employed in some embodiments of the invention. The table also shows other code words that are mapped to each of these seventeen code words by receivers that are designed in accordance with these embodiments. We shall refer to FIGS. 4A and 4B collectively as "FIG. 4."

FIG. 9A is a schematic diagram of a circuit which is included in a class of preferred embodiments of the invention, for generating BCH parity bits to be included with packetized data and then transmitted.

FIG. 9B is a schematic diagram of a circuit which is included in a class of preferred embodiments of the invention, for generating BCH parity bits to be included with packetized data and then transmitted.

Each of FIGS. 17, 18, 19, 20, and 21 is a timing diagram of a link integrity check operation that can be implemented by some embodiments of the inventive system (or by other systems in which data are transmitted over a serial link).

Figure 22:
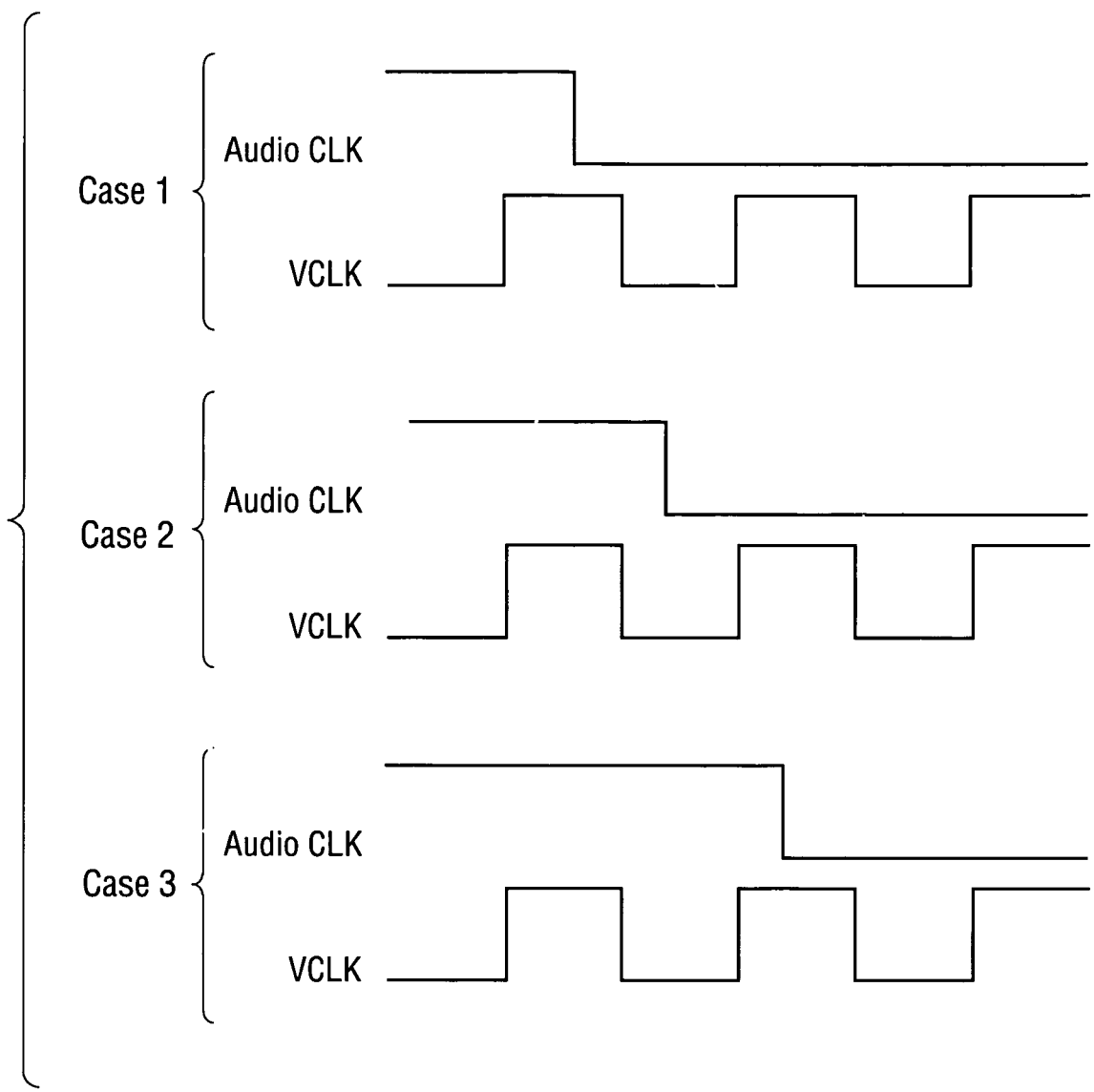

FIG. 22 is a timing diagram of audio and pixel clocks that can be asserted to the inventive transmitter. The audio and pixel clocks shown are not quite synchronous.

Figure 23:
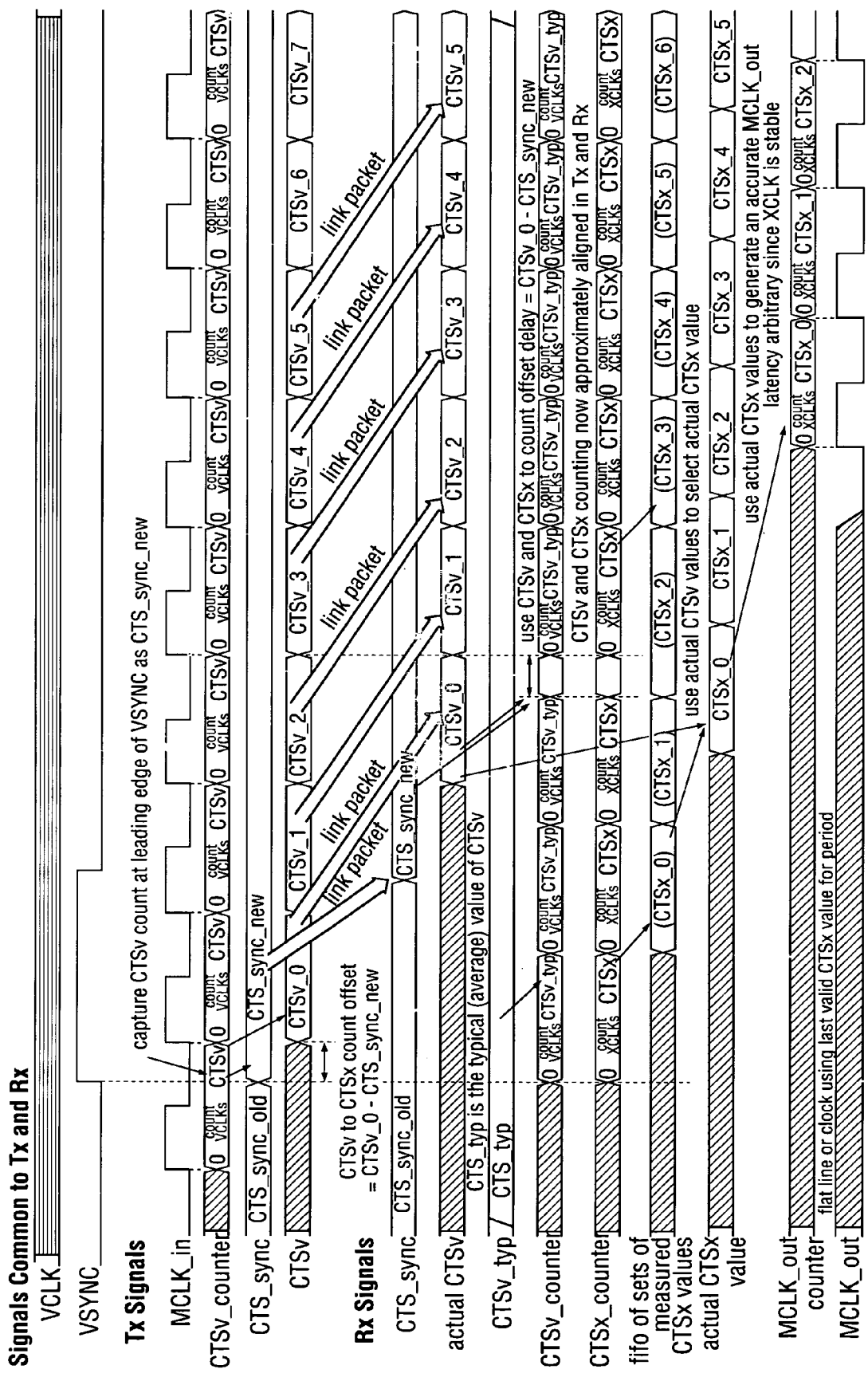

FIG. 23 is a timing diagram of signals generated by a preferred embodiment of the inventive system, showing how CTS counts by the transmitter and receiver counting can be resynchronized.

DETAILED DESCRIPTION OF THE PREFERRED EMBODIMENTS

As noted above, the term "stream" of data (as used herein) denotes that all the data are of the same type and are transmitted with the same clock frequency, and the term "channel" (as used herein) refers to that portion of a serial link that is employed to transmit data (e.g., a particular conductor or conductor pair between the transmitter and receiver over which the data are transmitted, and specific circuitry within the transmitter and/or receiver used for transmitting and/or recovery of the data) and to the technique employed to transmit the data over the link.

When transmitting audio (or other auxiliary) data via a serial link, is it often desired to transmit multiple streams of the auxiliary data, and it is often valuable for multiple channels of the link to be available for transmission of the auxiliary data. For example, there can be two audio streams (left and right streams of stereo audio), six streams (e.g., those of "5.1" surround sound), or up to eight streams (e.g., those of "7.1" surround sound). Alternatively, it may be desired to transmit even more streams of audio data with video, or to transmit streams of non-audio auxiliary data (for providing non-audio effects that are synchronized to the video) with audio and video. All such streams of auxiliary data are typically on the same time base, but alternatively there can be a need for some of the audio (or other auxiliary) data to be based upon another time base, or to have a different sampling rate. For example transmission of six streams of pulse code modulated (PCM) audio data over the link can be based upon one clock. Another two streams of compressed audio data, possibly a down-mix (for playback on a reduced number of speakers), might be transmitted with the video and PCM data as well.

In high-speed serial digital data transmission the data are often encoded to maximize or minimize the number of transitions and to also balance the DC level. For example, in embodiments of the inventive system that include at least one TMDS link, transition-minimized, DC-balanced, TMDS encoded video data are transmitted over each of three channels of the TMDS link, and encoded auxiliary data (e.g., audio data) can be transmitted over one or more of these three channels during blanking intervals between the active video periods. When the bandwidth requirement of the auxiliary data is lower than that of the primary data (video data) and the auxiliary data channel has significant ISI (which can result from a long cable), then the auxiliary data are desirably encoded using a subset (comprising "golden words") of the transition-minimized TMDS code words that are used to encode the video data for transmission.

Figure 1:
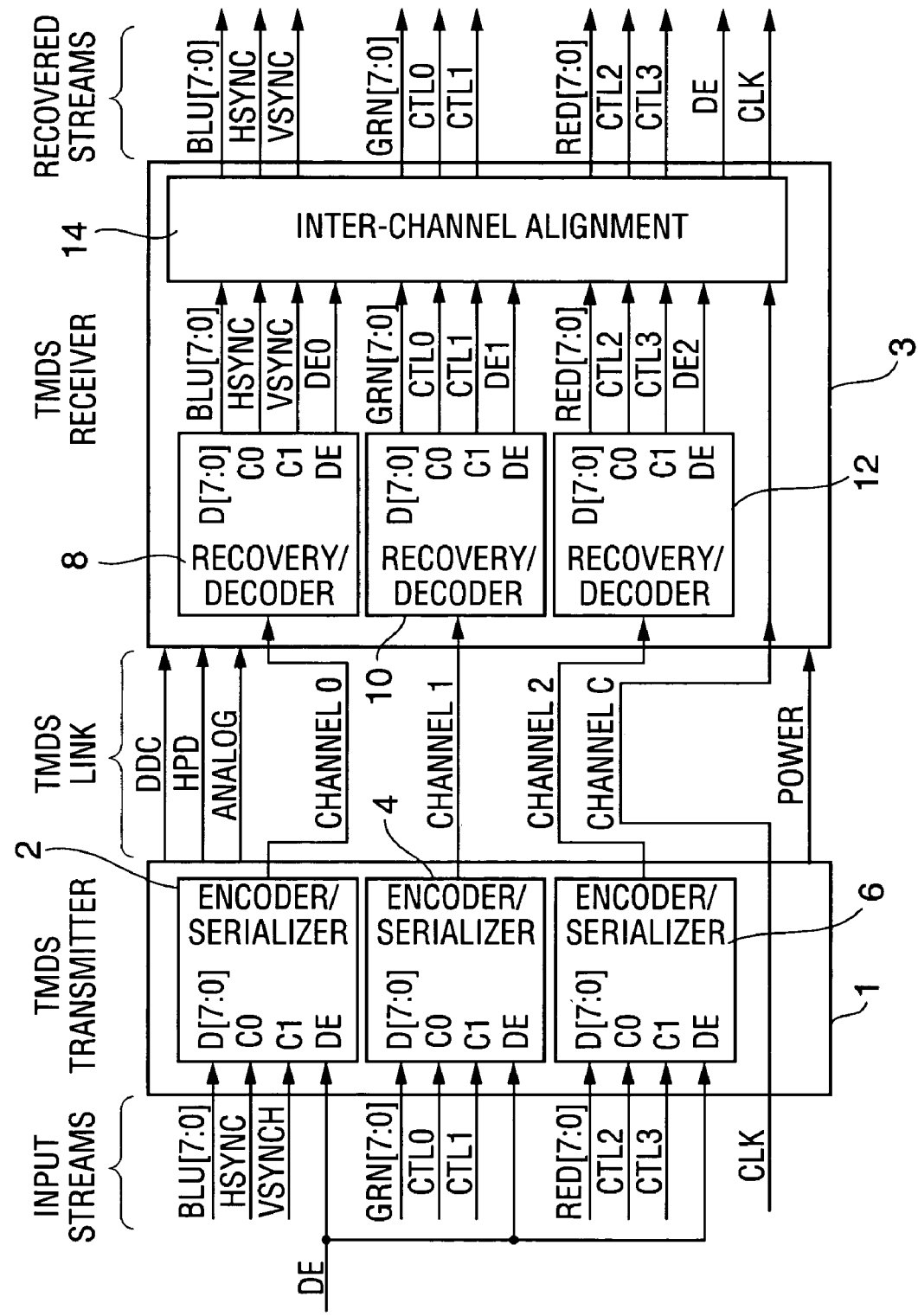
FIG. 1 is a block diagram of a conventional system including a Digital Visual Interface ("DVI") link.
Figure 2:
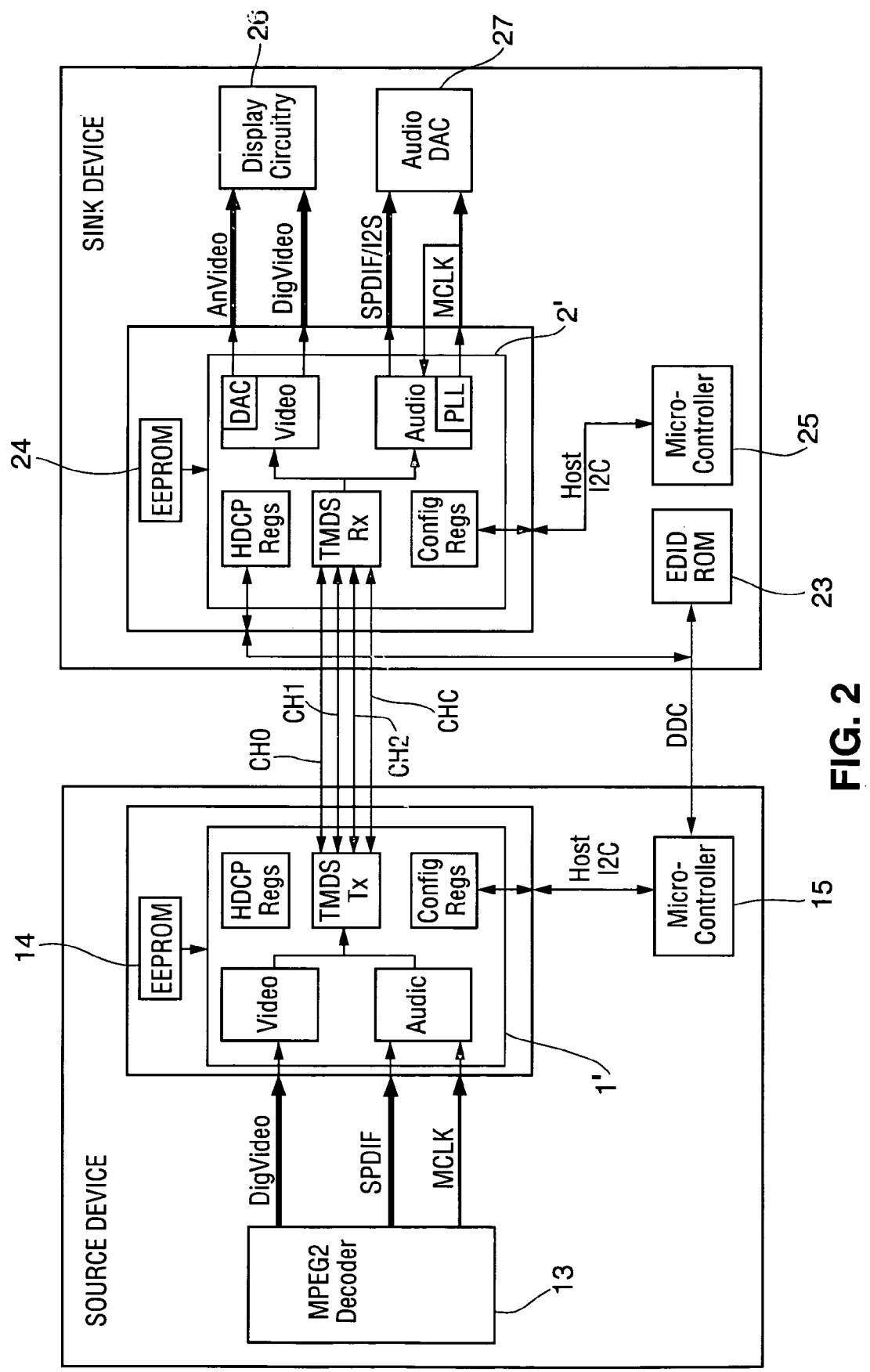
FIG. 2 is a block diagram of an embodiment of the inventive system.

A class of embodiments of the invention can be implemented by a system of a type shown in FIG. 2. The TMDS link between transmitters 1' and 2' of FIG. 2 is identical to the TMDS link between transmitters 1 and 3 in FIG. 1, although some of the conductors thereof are shown in FIG. 1 but not in FIG. 2 (for simplicity). The FIG. 2 system performs the functions of the FIG. 1 system, and is also configured to encode audio data (or other auxiliary data) as well as to encode video data in the same conventional manner as in the FIG. 1 system, to transmit the encoded auxiliary data over one or more of Channel 0, Channel 1, and Channel 2 of the TMDS link (and also transmit encoded video data over each such channel), and to decode the encoded auxiliary data (as well as the encoded video data). Transmitter 1' and receiver 2' of FIG. 2 correspond, respectively, to transmitter 1 and receiver 3 of FIG. 1, but perform auxiliary data encoding, transmission, and decoding functions that are not performed by transmitter 1 and receiver 3 of FIG. 1. Transmitter 1' of FIG. 2 is an element of a source device that also includes MPEG2 decoder 13 and microcontroller 15, coupled as shown. Decoder 13 asserts input video ("DigVideo") to a video data processing subsystem of transmitter 1', and input audio data ("SPDIF") and audio reference clock ("MCLK") to an audio data processing subsystem of transmitter 1'. Input audio SPDIF can be indicative of two or more streams of audio data (e.g., left and right stereo signals). EEPROM 14 stores key values and identification bits for use in HDCP encryption of content to be transmitted to receiver 2'.

Receiver 2' of FIG. 2 is an element of a sink device that also includes EDID ROM 23, microcontroller 25, display circuitry 26, and audio digital-to-analog converter 27 ("DAC" 27), coupled as shown. EDID ROM 23 is coupled to the DDC channel of the TMDS link, and stores status and configuration bits which can be read by microcontroller 15 over the DDC channel. Receiver 2' also includes an interface (e.g., interface 201 of FIG. 14) for communication via the DDC channel with microcontroller 15. Microcontroller 25 is coupled for I2C communication with receiver 2'. EEPROM 24 stores key values and identification bits for use in HDCP decryption of content received from transmitter 1'.

The sink device also includes display circuitry 26 which receives analog and/or digital video recovered by receiver 2', and an audio digital-to-analog converter 27 (DAC 27) which receives digital audio recovered by receiver 2'.

The FIG. 2 system preferably transmits a video clock over a conductor pair (labeled "Channel C in FIG. 2) of the TMDS link, and also transmits a clock for the auxiliary data over at least one channel of the link. For example, transmitter 1' transmits video data to receiver 2' over Channels 0, 1, and 2 (which are identical to the identically numbered channels of the FIG. 1 system) during active video periods, transmits audio data (e.g., left and right stereo signals) over one or more of Channels 0, 1, and 2 to receiver 2' at times other than during the active video periods, continuously transmits a video clock (e.g., determined by the rising edges of a binary waveform) over Channel C, and transmits time stamp data (over one or more of Channels 0, 1, and 2) with each burst of the audio data. The time stamp data determine a clock for the audio data, as described in above-cited U.S. patent application Ser. No. 09/954,663, filed on Sep. 12, 2001. Receiver 2' is configured to process the time stamp data to regenerating the audio clock employed to transmit the audio data. Preferred methods and systems for regenerating a clock from transmitted time stamp data will be described below in detail.

Typically the clock for a stream of audio data has a much lower frequency than the pixel clock for a stream of video. However, in most applications the audio clock needs to be more accurate than the pixel clock, to reduce jitter. This is true since distortion in analog audio (that has been generated from digital audio data having jitter) is more easily discernible (to one experiencing the analog audio) than is the distortion in a displayed video program generated from digital video having the same amount of jitter.

In the FIG. 2 system, 8-bit source words of video data are encoded into transition-minimized 10-bit code words which are then serialized and transmitted over a channel medium (one of the conductor pairs identified as Channels 0, 1, and 2). In receiver 2', each 10-bit code word is decoded back to the original 8-bit word if no errors are present. Each code word comprises a 9-bit base pattern (a transition-minimized member of a set of 29 nine-bit patterns, whose most significant bit indicates that the base pattern is transition-minimized, concatenated with a tenth bit indicating whether the eight least-significant bits of the base pattern have or have not been inverted in accordance with a DC balancing algorithm). In transmitter 1', each 8-bit source word is first encoded to one of the 9-bit base patterns, and a stream of the 9-bit base patterns are then encoded as a stream of the 10-bit code words (in a manner that achieves improved DC balancing of the transmitted stream of 10-bit code words). However, the decoded video data can include errors (especially when the relevant channel has significant ISI), depending on the specific channel media and the specific data patterns of the transmitted serial bit stream.

If transmitter 1' and receiver 2' were operated to encode and decode the auxiliary data in the same way that they encode and decode the video data, and to send both types of encoded data over the same channel of the serial link, the decoded auxiliary data would be subject to error at the same error rate. This error rate can be unacceptably high for auxiliary data (especially when the auxiliary data are audio data), even if it is acceptable for video data. To reduce the error rate for the auxiliary data, transmitter 1' can be configured to encode the auxiliary data using "golden words" as explained below. Optionally, transmitter 1' is configured also to encode the video data using "golden words" (or to be operable in a mode in which it encodes both the video data and auxiliary data using "golden words"). However, since data encoded using "golden words" (a robust subset of a "full set" of code words) necessarily has a lower data transmission rate than the same data encoded using the same "full set" of code words (assuming that both streams of encoded bits are transmitted with the same clock frequency). In many applications, video data cannot practically be transmitted at an adequate rate if encoded using golden words. Thus, typical implementations of the FIG. 2 system will encode auxiliary data (but not video data) using golden words.

In a class of embodiments, the inventive transmitter and receiver distinguish between at least three portions of each blanking interval (between active video periods): an initial portion (in which a "data island preamble" can be transmitted) followed by an auxiliary data portion (sometimes referred to as a "data island") followed by a final portion (in which a "video preamble" can be transmitted). Optionally, there are two or more data islands in a blanking interval (each comprising at least one auxiliary guard band word followed by a burst of a different stream of encoded auxiliary data), an initial portion between the falling edge of DE (at the start of the blanking interval) and the start of the first data island, an additional portion (including another data island preamble) before each subsequent data island in the blanking interval, and a final portion (including a video preamble) between the last data island and the next active video period. During the initial data island preamble of each blanking interval, repetitions of code words indicative of specific patterns of control bits CTL3, CTL2, CTL1, and CTL0, and optionally also initial bit patterns (e.g., patterns in the time interval labeled "Rsvd" in FIG. 5 at the start of the initial auxiliary preamble of channels CH2 and CH1) are transmitted. During the video preamble of each blanking interval, repetitions of code words indicative of other specific patterns of control bits CTL3, CTL2, CTL1, and CTL0, and optionally also initial bit patterns (e.g., patterns in the time interval labeled "Rsvd" in FIG. 6 at the start of the video preamble of channels CH2 and CH1) are transmitted. Preferably, during each data island, packets of code words indicative of encoded auxiliary data and guard band words are transmitted.

As noted, two or more data islands can be transmitted consecutively (without an active video period between them). Also, two or more active video periods can be transmitted consecutively (without a data island between them), or data islands can alternate with active video periods.

Figure 6:
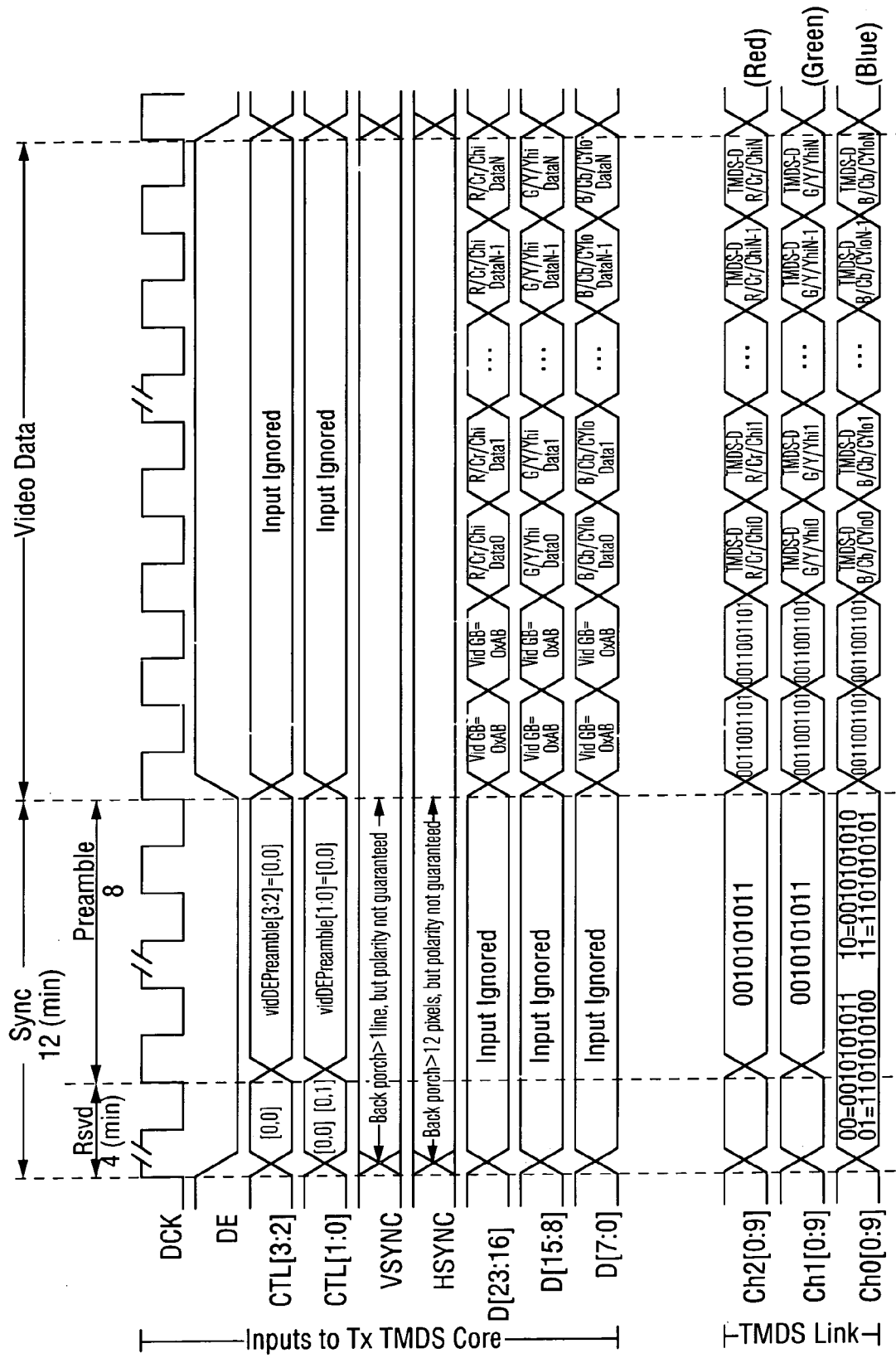
FIG. 6 is a timing diagram of signals input to the transmitter during the video preamble portion of a control data period (and during a subsequent active video period) of an embodiment of the inventive system, and encoded signals transmitted over a TMDS link of such system in response thereto.

In some embodiments, the following signals are transmitted during a video preamble (as indicated in FIGS. 3 and 6): repetitions of a code word, "0010101011" indicative of CTL3=0, CTL2=0 are transmitted on CH2 (preferably after an initial bit pattern in the "Rsvd" interval), repetitions of the same code word, "0010101011" indicative of CTL1=0, CTL0=0 are transmitted on CH1(preferably after an initial bit pattern), and repetitions of a code word indicative of one of the four possible combinations of sync bits HSYNC and VSYNC are transmitted on CH0. In typical operation, during the final 12 pixel clock cycles of the video preamble (just before the 0-to-1 transition of DE as shown in FIG. 6), both sync bits HSYNC and VSYNC have the value 0, so that the code word indicative of HSYNC=0, VSYNC=0 (namely the code word "0010101011" shown at the bottom of FIG. 6) is transmitted over the channel CH0.

Figure 5:
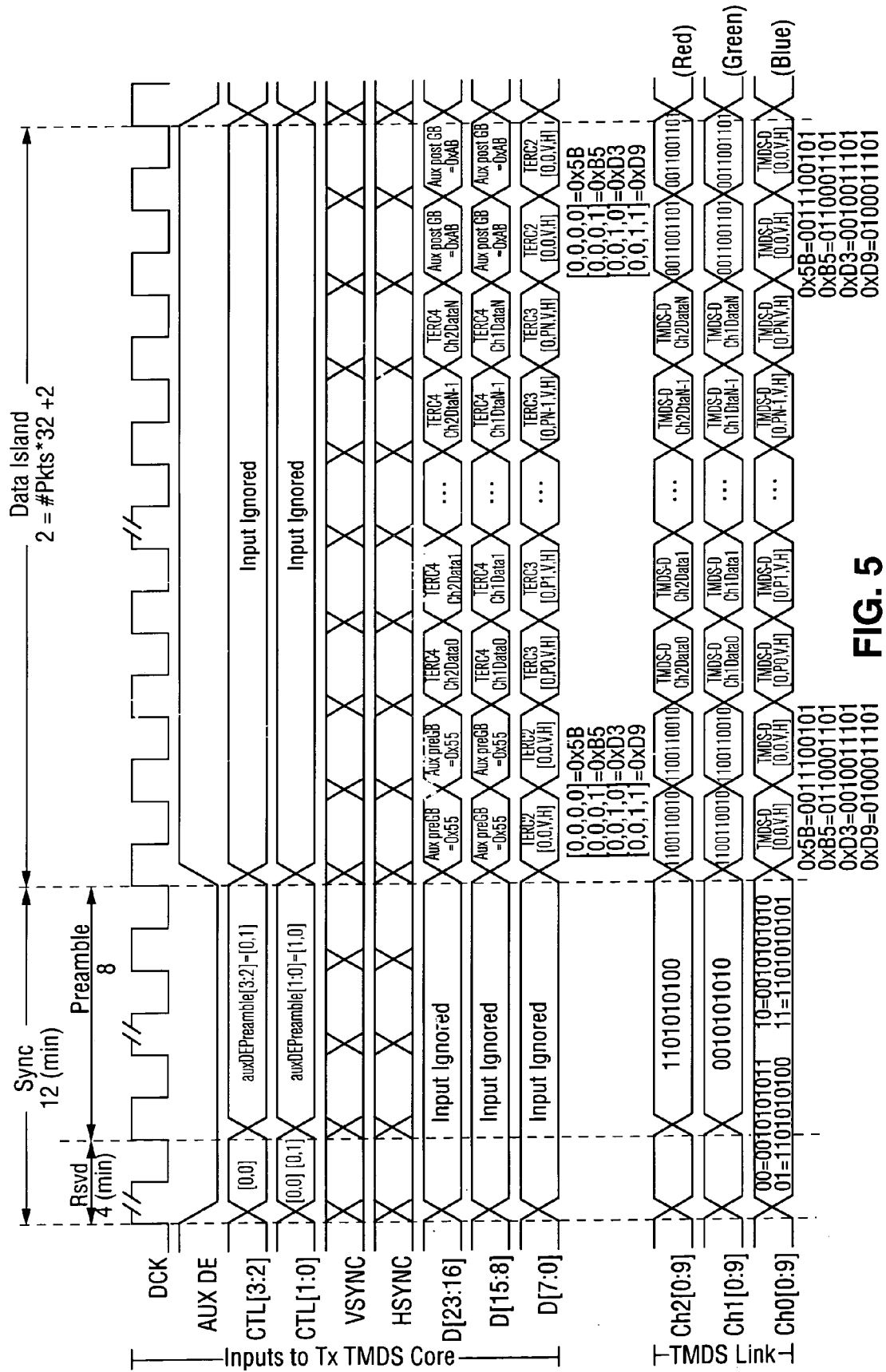
FIG. 5 is a timing diagram of signals input to the transmitter during a control data period and data island of an embodiment of the inventive system, and encoded signals transmitted over a TMDS link of such system in response thereto.

In such embodiments, the following signals are transmitted during the initial data island preamble (as indicated in FIGS. 3 and 5): repetitions of a code word, "1101010100" indicative of CTL3=0, CTL2=1 are transmitted on CH2 (preferably after an initial bit pattern in the "Rsvd" interval), repetitions of the code word, "0010101010" indicative of CTL1=1, CTL0=0 are transmitted on CH1 (preferably after an initial bit pattern), and repetitions of a code word indicative of one of the four possible combinations of sync bits HSYNC and VSYNC are transmitted on CH0.

During transmission of data over a serial link from a transmitter to a receiver, inter-symbol interference ("ISI") can give rise to errors that cause the received data to differ from the transmitted data. The rate at which such errors occur depends on such factors as the channel medium, and when the data are patterns of binary bits, the particular bit patterns that are transmitted. In preferred embodiments of the invention, data (e.g., audio data transmitted during data islands between active video periods) are encoded for transmission over a serial link with bit patterns that are less susceptible to ISI during transmission over the link than are the patterns determined by conventionally encoded versions of the same data. Thus, the data are transmitted more reliably in these preferred embodiments, and with reduced error rate, than are conventionally encoded versions of the same data. More specifically, in preferred embodiments, data are encoded using a subset (a "robust" subset) of a full set of code words. Typically, the code words in the full set have equal length (e.g., each consists of N bits). The robust subset will sometimes be referred to herein as a "selected" or "inventive" set of code words, and the code words in the robust subset will sometimes referred to as the "inventive" code words (or "golden words"). The robust subset is selected such that each transmitted stream of encoded data (coded using only members of the inventive code word set) has patterns that are less susceptible to ISI during transmission over the serial link than are patterns determined by a transmitted, conventionally encoded version of the same data (that has been coded using code words of the full set other than members of the inventive code word set, as well as members of the inventive code word set). Since there are more code words in the full set than there are inventive code words, fewer words of data can be transmitted over the link per unit time if the transmitted data are encoded using only the inventive code words than if the transmitted data are encoded conventionally using the full set of code words.

Encoding of data in accordance with the invention is particularly beneficial in applications in which the encoded data are transmitted over very long conductors or under other conditions in which there would otherwise be a high risk of error due to ISI during transmission.

In a class of embodiments, transmitter 1' is configured to encode auxiliary data transmitted between active video periods in accordance with the invention as follows. A subset of the full set of 10-bit TMDS code words is selected as the "inventive" code word set such that each transmitted stream of 10-bit words of encoded auxiliary data (consisting only of the inventive code words, sometimes referred to as "golden words") has a pattern that is less susceptible to inter-symbol interference than is the pattern determined by a transmitted stream of a TMDS-encoded version of the same data (including not only inventive code words but also members of the full set that are not inventive code words).

In some embodiments, a $2^M$-bit subset (where M<8) of the full set of 10-bit TMDS code words is selected to be the inventive code word set. Optionally, the inventive code word set also includes one or more code words of the full set that are used as guard band words. The 17 inventive code words (each comprising 10 bits) to be described below with reference to FIGS. 3 and 4 are an example of such a $2^M$-bit subset (where M=4) supplemented by one additional guard band word. Receiver 2' is implemented to decode each received one of the inventive 10-bit code words as an auxiliary data word of length M bits. Receiver 2' performs the same decoding operations on the encoded auxiliary words received during blanking intervals that it performs on the conventionally encoded video words received during the active video periods. However, during the encoding of source auxiliary data (using the inventive code words), transmitter 1' does not perform the conventional DC balancing steps that it performs during its conventional encoding of source video data (in which the eight least significant bits of the "N+1"th encoded video word are inverted, and the resulting nine bits are concatenated with a distinctive tenth, most significant bit when the cumulative DC drift of the N previous encoded video words reaches a predetermined threshold, and otherwise does not invert the eight least significant bits of the "N+1"th encoded video word and instead concatenates the word with another distinctive, tenth, most significant bit). Rather, transmitter 1' is configured simply to replace each 4-bit source word of auxiliary data with the corresponding one of the inventive code words, regardless of the cumulative DC drift of the resulting stream of inventive code words (and regardless of whether the MSB of the inventive code word is a one or zero). The inventive code words are preferably chosen so that when the bits of a stream of the inventive code words are transmitted over a serial link as sequence of rising and falling voltage transitions, the bit pattern of such stream of the inventive code words is DC balanced (or is likely to be DC balanced) in the sense that the voltage drift that it determines over time is limited to an acceptable amount.

In other embodiments, transmitter 1' does perform the same DC balancing steps during its encoding of source auxiliary data (using the inventive code words) and during its conventional encoding of source video data. This is taken into consideration in the selection of the inventive code word set. Specifically, each code word of the inventive code word set has a 9-bit base pattern that is a member of a selected subset of the 9-bit base pattern space of the full set of 10-bit TMDS code words, and during encoding of 4-bit words of source auxiliary data (to replace them with the inventive 10-bit code words), the eight least-significant bits of this 9-bit base pattern are either inverted and the resulting pattern concatenated with a tenth (and most significant) bit having a first value, or the base pattern is not inverted and is instead concatenated with a tenth (and most significant) bit having a second value, depending on whether the cumulative DC drift of the stream of previously encoded auxiliary words has reached a predetermined threshold. In these embodiments, receiver 2' is implemented to perform the same decoding operations on the encoded auxiliary data words received during blanking intervals that it performs on the conventionally encoded video data words received during the active video periods, and then to map each 8-bit word (generated as a result of conventional decoding of one of the 10-bit encoded auxiliary data words) to one of the $2^M$ auxiliary data words each having M-bit length.

In the described embodiments of the FIG. 2 system, the size of the auxiliary data encoding space (the number of different auxiliary data words that can be encoded with the inventive code word set) is reduced from 28 (=256) to $2^M$ (where M<8) in accordance with the invention, and thus the effective rate at which the auxiliary data (encoded in accordance with the invention) can be transmitted is reduced from 8 bits per clock period per channel to M bits per clock period per channel. By reducing the value M (i.e., selecting a smaller inventive set of code words from the full set), a lower bit-error rate (BER) can be achieved but the data rate will also be reduced. Conversely, increasing the parameter M results in an increased data rate but at the cost of increased BER.

We next describe an embodiment of the inventive code word set with reference to FIGS. 3 and 4. This code word set is a subset of the full set of conventional TMDS 10-bit code words, and is useful for encoding 4-bit words of auxiliary data for transmission over a TMDS (or TMDS-like) link over which 8-bit video words (conventionally encoded using the full set of TMDS 10-bit code words) are also transmitted, in cases when it is adequate to transmit the auxiliary data at half the data rate as the video data. Typically, 8-bit input words of binary auxiliary data are buffered, the four least-significant bits of each are encoded (e.g., in transmitter 1' of FIG. 2) as one of the sixteen 8-bit words "AD0–AD15" in the left column (labeled "Input D7–D0") of FIG. 4, and the four most significant bits of each 8-bit input word are also encoded as the appropriate one of the sixteen 8-bit words AD0–AD15. Each of the words AD0–AD15 has the hexadecimal representation shown in FIG. 4 in the second column from the left. Each of the words AD0–AD15 is then encoded (e.g., in transmitter 1') as the corresponding one of the 10-bit patterns shown in the third column (labeled "TMDS result") of FIG. 4. We shall describe the other columns of FIG. 4 below, with reference to the aspects of the invention that pertain to the mapping of code word clusters.

In FIG. 4 (and FIG. 3), the left bit of each code word is the LSB and (in the case of each 10-bit code word) is the first bit to be transmitted over the serial link. Also, the right bit of each code word is the MSB and (in the case of each 10-bit code word) is the last bit to be transmitted over the serial link.

For example, an input auxiliary data word 10000000 (whose LSB is 1) would be split into two halves (1000 and 0000) and the two halves then encoded as AD1 and AD0, respectively. Then, the 8-bit word AD0 is encoded as the 10-bit inventive word "0011100101" and the 8-bit word AD1 is encoded as the 10-bit inventive word "0110001101." The two inventive words would then be serialized transmitted over the serial link sequentially, with the bits "0011100101" indicative of the "most significant" half (0000) of the input word being transmitted before the bits "0110001101" that are indicative of the least significant half (1000) of the input word. At the receiver, each 10-bit inventive word is decoded into one of the 8-bit words AD0–AD15, and the original 8-bit input auxiliary data words can be reconstructed from the recovered words AD0–AD15 since there is a one-to-one mapping between each word AD0–AD15 and one half (four bits) of each 8-bit input auxiliary data word.

Of course, the input auxiliary data asserted to the transmitter (e.g., transmitter 1') can be 4-bit words, in which case the transmitter would not need to split (or otherwise pack) received input auxiliary data words into 4-bit format before encoding them as a sequence of the words AD0–AD15. Alternatively, the input auxiliary data can be pre-encoded as a sequence of 8-bit words AD0–AD15, and the pre-encoded auxiliary data then provided to the transmitter in the form of a sequence of the 8-bit words AD0–AD15.

Typically, the encoded auxiliary data are transmitted in the same channels (CH0, CH1, and CH2) of a TMDS link in which video data are transmitted, but the auxiliary data are transmitted during the blanking intervals between the active video periods of video data transmission. FIGS. 5 and 6 are timing diagrams of signals transmitted during such an embodiment of the invention. The upper nine signals of FIG. 5 represent signals input to the transmitter during a control data period and data island (of a blanking interval), and the lower three signals of FIG. 5 represent the auxiliary data (encoded using the 10-bit words of FIG. 4) and encoded control and sync signals (to be discussed below) that are transmitted over channels CH0, CH1, and CH2 during the control data period and data island in response to the upper nine signals. Similarly, the upper nine signals of FIG. 6 represent signals input to the transmitter in a control data period at the end of a blanking interval (the blanking interval of FIG. 5) and during the active video period that follows such control data period, and the lower three signals of FIG. 6 represent the auxiliary data (encoded using the 10-bit words of FIG. 4), video data (conventionally encoded), and encoded control and sync signals (to be discussed below) that are transmitted over channels CH0, CH1, and CH2 in response to the upper nine signals.

In FIGS. 5 and 6:

24-bit words of input data are provided to the encoding circuitry of the transmitter for encoding. FIG. 5 pertains to those of such words (each identified as D[23:0] in FIG. 5) that are words of auxiliary data. FIG. 6 pertains to those of such words (each identified as D[23:0] in FIG. 6) that are words of video data. Eight bits of each input word (D[23:16]) are encoded, serialized, and transmitted on channel CH2 (as 10-bit encoded words CH2[0:9]), another eight bits of each such word (D[15:8]) are encoded, serialized, and transmitted on channel CH1 (as 10-bit encoded words CH1[0:9]) and another eight bits of each such word (D[7:0]) are encoded, serialized, and transmitted on channel CH0 (as 10-bit encoded words CH0[0:9]). In some implementations, the video data are in RGB format (and the red, green, and blue pixels are transmitted on channels CH2, CH1, and CH0, respectively). In view of this, channels CH2, CH1, and CH0, are sometimes referred to herein (such as in FIG. 3) as the red (or "R") channel, the green (or "G") channel, and the blue (or "B") channel, respectively. Alternatively, the video data that are encoded (and then transmitted) are in luminance-chrominance format;

the waveform "DCK" indicates the data clock. During each cycle of the data clock, the ten bits of each one of the inventive code words indicative of auxiliary data (or a guard band), or each of the conventional TMDS 10-bit code words indicative of video data, are sequentially transmitted over the relevant one of channels CH0, CH1, and CH2. In some actual implementations, phase shifting circuitry is used to generate multiple, phase-shifted versions of the clock DCK which are then used (with the clock DCK itself) to clock the encoding, transmission, and decoding operations. In other actual implementations, a clock having ten times the frequency of DCK (but in phase with DCK) could be used to clock the encoding, transmission, and decoding operations, and one code bit would be transmitted during each cycle of this faster clock;

the waveform "DE" (of FIG. 6) is the video data enable signal, and the waveform "AUX DE" (of FIG. 5) is the auxiliary data enable signal. When DE=1 and AUX DE=0, video data (identified as D[23:16], D[15:8], and D[7:0] in FIG. 6) are encoded, and serialized 10-bit words of the encoded video are transmitted over channels CH0, CH1, and CH2. When DE=0 and AUX DE=1, auxiliary data (identified as D[23:16], D[15:8], and D[7:0] in FIG. 5) are encoded, and serialized 10-bit words of the encoded auxiliary data are transmitted over channels CH0, CH1, and CH2. When DE=0 and AUX DE=0, the transmitter ignores signals asserted to its data inputs and instead encodes (as 10-bit TMDS code words) control bit pairs asserted to its control inputs (bits CTL3 and CTL2, indicated as "CTL[3:2]" in FIGS. 5 and 6, and bits CTL1 and CTL0, indicated as "CTL[1:0]" in FIGS. 5 and 6), serializes these code words, and transmits the serialized code words over channels CH1 and CH2. In a DVI system, the transmitter encodes (as 10-bit transition-maximized words) sync bit pairs (HSYNC and VSYNC) asserted to its sync inputs, serializes these code words, and transmits the serialized code words over channel CH0 when DE=0. However, in preferred embodiments of the present invention, during each data island, a 10-bit transition-minimized code word indicative of HSYNC and VSYNC is sent each pixel clock cycle (e.g., one code word indicative of an HSYNC bit, a VSYNC bit, and two other bits is sent per pixel clock cycle) over channel CH0. In this way, HSYNC and VSYNC can be transmitted repeatedly over the 32-pixel clock period required to send a packet during a data island. Preferably, each packet sent during a data island includes a 32-bit packet header, and each code word indicative of HSYNC and VSYNC that is transmitted during a data island is also indicative of one bit of the packet header. Thus, 32 pixel clock cycles are required to transmit an entire 32-bit packet header.

Although FIGS. 5 and 6 have been described with reference to two data enable signals, "DE" and "AUX DE," it is contemplated that the inventive transmitter can be implemented with a portion (e.g., "core" processor 114 of transmitter 100 of FIG. 13) configured to perform all the described encoding, serialization, and transmission in response to a single data enable signal (e.g., a combined enable signal indicative of the result of performing a logical "OR" operation on the signals DE and AUX DE), and a single set of data inputs (D[23:0]) indicative of either video or auxiliary data. Additional circuitry of the transmitter outside the core is configured to receive separate sets of auxiliary data (e.g., 24-bit auxiliary data words) and video data (e.g., 24-bit video data words), and both a video data enable signal DE, and an auxiliary data enable signal "AUX DE." The data enable signals can have the following repeating sequence of values: (DE=0, AUX DE=0), then (DE=1, AUX DE=0), then (DE=0, AUX DE=0), and then (DE=0, AUX DE=1). Of course, the data enable signals can also occur with other sequences of values, including non-repeating sequences. For example, in some circumstances, auxiliary data are transmitted in some but not all video blanking intervals. Thus, auxiliary data can be transmitted in one blanking interval but not the next blanking interval, with the signals DE and AUX DE having the following sequence of values: (DE=0, AUX DE=0), then (DE=1, AUX DE=0), then (DE=0, AUX DE=0), then (DE=0, AUX DE=1), then (DE=0, AUX DE=0), then (DE=1, AUX DE=0), then (DE=0, AUX DE=0), and then (DE=1, AUX DE=0). The additional circuitry of the transmitter can include logic circuitry that "ORs" together the signals DE and AUX DE to produce a combined data enable signal. The additional circuitry can also pack the auxiliary data into 4-bit format, encode each 4-bit portion of the auxiliary data as one of the words AD0–AD15 shown in FIG. 4, add guard band words with appropriate timing into the stream of AD0–AD15 auxiliary data words, and add video guard band words into the stream of video data (or alternatively replace, with appropriate timing, words of the video data with video guard band words). The additional circuitry can assert a sequence of bursts of the video data (with video guard band words) and auxiliary data (with guard band words) to the core (e.g., alternating bursts of the video data with video guard band words, and auxiliary data with guard band words), and also assert the combined data enable signal to the core. The core performs all the encoding, serialization, and transmission operations described with reference to FIGS. 5 and 6 in response to the combined data enable signal (rather than separate DE and AUX DE signals) and the bursts of video and auxiliary data.

In variations on the embodiments described in the previous paragraph, the "additional circuitry" of the transmitter is coupled and configured to receive and encode two or more sets of auxiliary data (each set comprising a different type of auxiliary data). The additional circuitry is also coupled and configured to receive a set of video data, an auxiliary data enable signal for each set of auxiliary data (e.g., first and second auxiliary data enable signals "AUX1 DE" and "AUX2 DE") and a video data enable signal ("DE"), and to assert a sequence of bursts of the video data and bursts of the encoded auxiliary data to the transmitter's core. The video data enable signal ("DE") and auxiliary data enable signals ("AUX1 DE" and "AUX2 DE") can have the following repeating sequence of values: (DE=0, AUX1 DE=0, AUX2 DE=0), then (DE=1, AUX1 DE=0, AUX2 DE=0), then (DE=0, AUX1 DE=0, AUX2 DE=0), then (DE=0, AUX1 DE=1, AUX2 DE=0), and then (DE=0, AUX1 DE=0, AUX2 DE=1). The additional circuitry can include logic circuitry that "ORs" together the signals DE, AUX1 DE, and AUX2 DE to produce a combined data enable signal, and can assert the combined data enable signal (rather than the individual video data enable and auxiliary data enable signals) to the core.

In each of at least one channel of a serial link (e.g., in each of channels CH2 and CH1 in the case of data transmission in accordance with the invention over a TMDS link), an appropriate one of the inventive code words is (or two or more appropriate ones of the inventive guard band words are) preferably transmitted (as a guard band word or set of guard band words) at the start of each burst of encoded auxiliary data (i.e., immediately after each "auxiliary preamble" of each blanking interval), at the end of each burst of encoded auxiliary data, and at the start of each burst of encoded video data (i.e., immediately after the "video preamble" of each blanking interval).

In preferred embodiments of the invention, the source data to be transmitted during data islands are encoded using a "robust" subset of a full set of code words. Each "robust" subset consists of code word sets (sometimes referred to herein as "golden sets"), with each golden set consisting of one or more code words (sometimes referred to herein as "golden words"). Each "golden word" of a golden set is indicative of a single source data value (e.g., a source data word). In the case that a golden set consists of two or more golden words, each of these golden words is indicative of the same source data value. Clusters of code words in the full set are determined. Each cluster includes a "golden set" and optionally also one or more additional code words of the full set, where each of the additional code words is "similar" to a golden word of the cluster's golden set in the sense that each additional code word is likely to be generated as a result of probable bit errors in transmission, or transmission and decoding, of such golden word. Each received code word in one of the clusters is mapped to the source data value determined by the cluster's golden set. Each mapping of a cluster of received code words to a single source data value can provide error correction by mapping an error-containing word in the cluster back to the source data value most likely to correspond to the error-containing word.

The full set of code words can be used to encode one type of data (e.g., video data) for transmission over a channel of a serial link, and the robust subset can be used to encode another type of data (e.g., audio data or other "auxiliary" data related to or useful with video data) for transmission over the same channel.

In some embodiments, each code word in each golden set (and each code word in the full set) is an N-bit word that is an encoded version of an M-bit word, where M is an integer less than N. After transmission of a sequence of N-bit golden words over the serial link, each received N-bit code word can differ from one of the golden words (if a transmission error has occurred) or it can be identical to one of the transmitted golden words. Each received N-bit code word in one of the clusters is decoded to generate a decoded M-bit word, and each such decoded M-bit word is mapped to the source data value determined by the cluster's golden set.

For example, in a class of embodiments, the full set of code words is the set of 10-bit, transition-minimized TMDS-encoded words that are indicative of 256 eight-bit source words. The robust subset of the full set consists of eight-bit "golden words" indicative of a subset of the full set of 256 eight-bit source words. In preferred embodiments in this class, the robust subset consists of sixteen golden sets, each golden set consists of the 10-bit TMDS code words indicative of one eight-bit source word, and each cluster of the 10-bit TMDS code words includes one of the golden sets and at least one 10-bit TMDS code words similar to the code words in such golden set. In such preferred embodiments, each received 10-bit code word in one of the clusters is decoded in accordance with the TMDS decoding algorithm (or a modified version thereof) to recover an eight-bit word, and each recovered eight-bit word is mapped to the eight-bit source word determined by the cluster.

Figure 7:
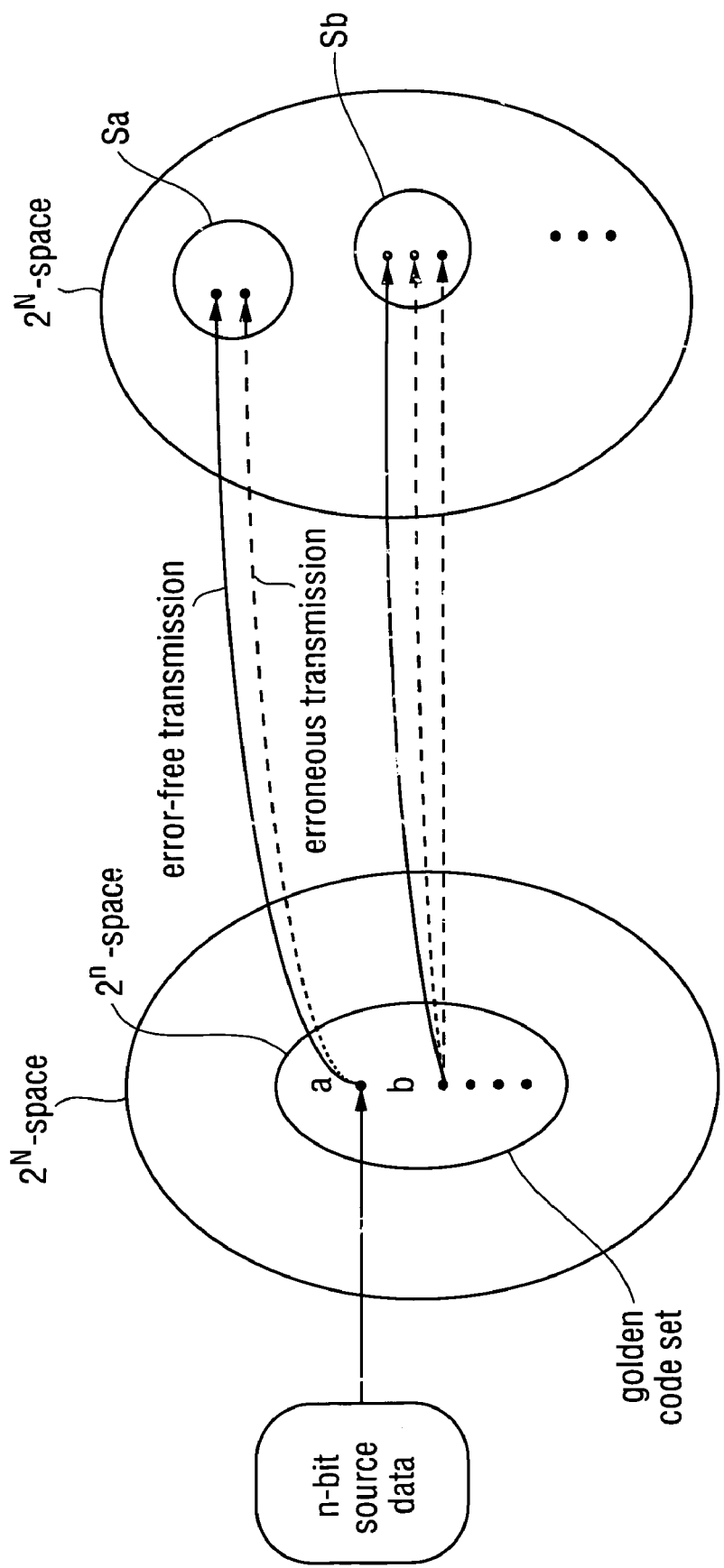
FIG. 7 is a diagram of a mapping of clusters (e.g., clusters $S_a$ and $S_b$) of received code words to individual transmitted code words (e.g., code words "a" and "b") in accordance with some embodiments of the invention.

With reference to FIG. 7, we will further describe the concept of mapping of clusters (e.g., clusters $S_a$ and $S_b$ in FIG. 7) of received words to individual transmitted source data words (e.g., words "a" and "b") that is employed in preferred embodiments of the invention. Then, we will describe a specific example of such mapping with reference to FIG. 4.

With reference to FIG. 7, the full set of code words (which can be used to encode primary data, for example when auxiliary data are encoded in accordance with the invention using only "golden words" of the full set) are those code words (the "$2^N$ space") that can be used to encode $2^N$ different source data words, each source data word being an ordered set of N bits. The golden words (the "$2^n$ space") are a subset of the code words of the full set that can be used to encode $2^n$ different source data words, each such source data word being an ordered set of "n" bits (where "n" is an integer less than N). Initially, raw source data (which can consist of words of any length) can be buffered and packed into an n-bit format (i.e., into n-bit members of a set of $2^n$ source data words). Each different n-bit source data word can then be encoded as one of the golden words (in the "$2^n$ space") and transmitted over a serial link (typically over a single channel of the link). The transmission can result in error or it can be error free.

Clusters of the full set of code words are predetermined such that each cluster includes a "golden set" (of one or more of the golden words) and optionally also one or more additional code words of the full set, where each of the additional code words is similar to a golden word of the cluster's golden set. In FIG. 7, for example, cluster "$S_a$" includes the golden set consisting of each of the golden words that encodes source word "a," and cluster "$S_b$" includes the golden set consisting of each of the golden words that encodes source word "b"). Each received code word in one of the clusters is mapped to the source data value determined by the cluster's golden set.

In some embodiments in which N=8 and n=4, each code word of the $2^N$ space is a 10-bit TMDS-encoded word, and the $2^n$ space is a subset of the full set of 10-bit TMDS-encoded words. Each transmitted 10-bit TMDS code word is decoded in accordance with the TMDS decoding algorithm (or a modified version thereof) to generate an 8-bit code word. In these and other embodiments of the invention, the transmission of golden words (and any decoding thereof) can result in error or can be error free.

For each specific golden word, certain types of transmission errors can be expected when the channel has inter-symbol interference or other degradations. Thus, for each golden word (i.e., for each N-bit member of the $2^n$ space), the cluster containing such golden word preferably includes all the N-bit members of the $2^n$ space likely to result from occurrence of such a transmission error during transmission of the golden word. However, since the clusters are disjoint, an N-bit word included in one cluster is omitted from all the other clusters.

Each embodiment of the invention employs at least one (and typically more than one) cluster that contains at least one code in addition to each golden word of a golden set. Some embodiments of the invention employ at least one cluster that contains at least one code in addition to each golden word of a golden set, and also at least one other cluster that contains no code other than each golden word of a golden set. Since all the clusters (e.g., $S_a$, $S_b$, etc. of FIG. 7) are mutually disjoint, then regardless of whether or not an error occurs during transmission (or transmission and decoding), if a cluster contains a received N-bit code, the received code is mapped back to the correct source word.

In a class of implementations of FIG. 7, the full set of code words (the "$2^N$ space") is the full set of 10-bit TMDS code words, and the "$2^n$ space" consists of those TMDS code words that are indicative of a predetermined set of 16 different 8-bit source data words. Thus, each cluster includes a golden set of the TMDS code words including golden words indicative of one of the 16 different source data words. Typically, 4-bit words of raw source data are preliminarily encoded as the 16 different 8-bit source data words, and each resulting 8-bit source data word is then encoded as one of the 10-bit members of the $2^n$ space for transmission. Thus, the robust subset (of the full set of TMDS code words) consists of those 10-bit TMDS code words that (when decoded in accordance with the TMDS decoding algorithm or a modified version thereof) determine the 16 predetermined 8-bit source data words (of the 256 eight-bit source data words determined by the full set of TMDS code words). Each cluster preferably includes not only the golden words of a golden set, but also at least one 10-bit TMDS code word "similar" to one of the golden words in the sense that it is more likely to result from bit errors in transmission of the golden word than are other TMDS code words (e.g., the code word "similar" to the golden word may differ from the golden word only in the value of one of its bits).

The process of selecting the golden sets from the full set of code words is very important. In general, the best choice for the specific golden sets selected from a full set of binary code words depends on the particular coding implemented by the full set (i.e., the details of which bits of each code word in the full set are zeroes and which are ones). As noted above, in some preferred embodiments, the code words of the golden sets are selected to be those whose serial patterns (during transmission) have fewer contiguous zeros and ones (e.g., on the average), and thus are less susceptible to ISI during transmission, than do those code words in the full set that are not selected (e.g., the average number of contiguous zeros and ones, per code word, of the golden words is less than the average number of contiguous zeros and ones, per code word, of the code words in the full set that are not selected as golden words).

In other preferred embodiments, the golden words are selected to be those satisfying the criterion that the Hamming distance between any golden word in one cluster and any golden word in any other cluster exceeds a threshold, or the criterion that the Hamming distance between golden words in different clusters is maximized (in some sense) to the extent practical (e.g., the criterion that an average Hamming distance between golden words in different clusters is maximized) subject to the constraint that the clusters are mutually disjoint. This helps to increase the number of "errored codes" (codes other than golden codes of one golden set) that can be included in each cluster, while keeping the constraint that the clusters are mutually disjoint.

To implement the invention, the receiver (e.g., receiver 200 of FIG. 14) is preferably configured to include a predetermined table that outputs one value (e.g., a source data word) determined by each cluster in response to each input indicative of an element of the cluster (e.g., in response to each of four received code words, where the cluster consists of one golden word and three code words similar to the golden word). The table implements a mapping of each received code word in each cluster to the source word determined by the cluster's golden set, or of each received code word in each cluster to a golden word of the cluster's golden set (which is then mapped by conventional hardware or software in (or external to) the receiver to a source word determined by the cluster's golden set), or of a decoded version of each received code word in each cluster to a source word determined by the cluster's golden set, or of a decoded version of each received code word in each cluster to a single decoded code word (which is then mapped by conventional hardware or software in, or external to, the receiver to a source word determined by the cluster's golden set).

Figure 14:
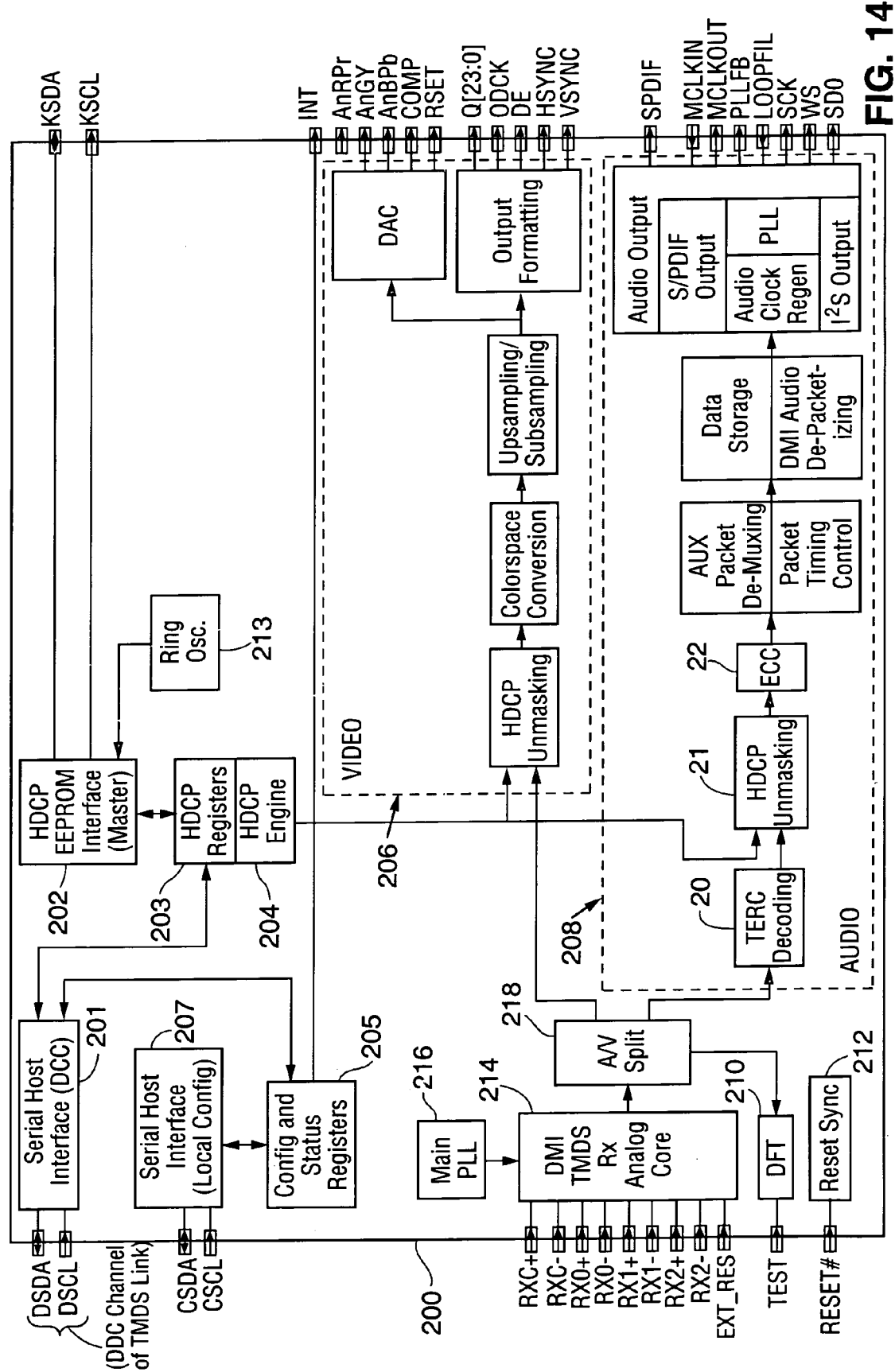
FIG. 14 is a block diagram of a preferred embodiment of the inventive receiver.

For example, receiver 200 of FIG. 14 includes core processor 214 (which includes code word recovery circuitry), and mapping and decoding circuitry 20 (of subsystem 208) which implements such a table. Circuitry 214 is configured to recover 10-bit TMDS code words from the data received on each of TMDS channels CH0, CH1, and CH2. Circuitry 20 is configured to map each recovered word in one of the clusters to a golden word of the cluster (using the table), to decode each golden word to generate an 8-bit decoded value (one of the seventeen 8-bit words in the left column of FIG. 4). The 8-bit decoded values are indicative of source words. Although in some embodiments of the invention, mapping and decoding circuitry would generate a 4-bit raw source data word in response to each decoded 8-bit word (indicative of one of the words AD0–AD15 in FIG. 4), circuitry 20 of FIG. 14 asserts 8-bit decoded words to decryption circuitry 21.

The clusters (and thus the inputs to the above-mentioned table in the receiver) can be a partition of the full set of code words (e.g., the $2^N$ space of FIG. 7), so that the union of the clusters covers the whole space of code words (e.g., the entire $2^N$ space of FIG. 7) and the clusters are mutually disjoint. However, when the probability that one of the code words in the full set will be received in response to transmission of one golden word is very small or negligible, then such code word can be excluded from all of the clusters (and dropped from the table). In the latter case, the union of the clusters does not cover the whole space of code words (e.g., the entire $2^N$ space of FIG. 7).

For convenience, in the claims, we use the expression "to map each code word of a cluster to the input data (or source data) value determined by the cluster's preferred word set (or golden set)," or variations on this expression, to denote the mapping of each code word of a cluster directly to the source data (input data) value determined by the cluster's preferred word set (golden set), or the mapping of each code word of a cluster to a golden word (or preferred word) of the cluster's golden set (or preferred word set) optionally followed by conventional mapping of the golden word (or preferred word) to the source data (input data) value determined by the cluster's golden set (or preferred word set), or the mapping of a decoded version of each code word of a cluster to the source data (input data) value determined by the cluster's golden set (or preferred word set), or the mapping of a decoded version of each code word of a cluster to a single decoded code word optionally followed by conventional mapping of the decoded code word to a source data (input data) value determined by the cluster's golden set (or preferred word set).

The mapping of words in each cluster to a golden code can be performed in a manner that is in some sense "on the fly," for example using clocked logic to substitute a golden code for each received word that belongs to a predetermined cluster that contains the golden code. For example, in some embodiments, the receiver includes logic (e.g., in circuitry 20 of FIG. 14) that applies rules to determine which one of the bits of a received code word is likely to be erroneous, and then "map" the received code word to a golden code by flipping each bit that it determines to be likely to be errored. Alternatively, the mapping of words in each cluster to a golden code is performed using a look-up table which outputs a golden code in response to each word of a cluster that contains the golden code.

In general, an algorithm can be implemented (e.g., by software or logic circuitry) to determine which bits (to be referred to as "vulnerable" bits) in a golden word are most vulnerable to error, a process is then implemented wherein vulnerable bits of golden words are replaced by errored versions thereof to determine "likely error-containing code words," and a process is then implemented to compare all (or a subset of all) of the "likely error-containing code words" to the actual received code words and thereby to map each received code word that is a "likely error-containing code word" to the corresponding golden word. The algorithm for identifying vulnerable bits preferably identifies bits that are most susceptible to inter-symbol interference. Single '0' bits within a stream a '1' bits would qualify.

Once the vulnerable bits are found, they are flipped in the golden words, thereby producing "likely error-containing code words". Either a single vulnerable bit could be flipped or more than one, depending upon how vulnerable to error each of them is. An alternative approach is to determine manually which bit patterns include vulnerable bits and store a series of masks with each bit pattern that the designer wishes to address, along with the golden words. Logic would then only need to flip the relevant bits in the golden words to generate the "likely error-containing code words."

The process of choosing which code words to include in each cluster can be automated using logic circuitry (or software). For example, it can be systematically determined using software (or logic circuitry) which bits of a set of golden words are likely to be inverted (or dropped) as a result of error in transmission and/or recovery, and the most likely error-containing versions of each golden word then included in a cluster with the golden word. For another example, for each code word already included in a cluster, four additional code words can be automatically added to the cluster: two left-shifted versions of the code word (one with "0" in the opened spot; the other with "1" in the opened spot); and two right-shifted versions of the code word (one with "0" in the opened spot; the other with "1" in the opened spot), subject to application of rules to avoid assigning the same code word to two different clusters.

Although the clusters should strictly be disjoint, two or more clusters can conditionally include the same code word (to be denoted as a "multi-value" code word for convenience), where a multi-value code word is "conditionally included" in a cluster in the sense that it is mapped to the cluster's golden word only provided that a predetermined condition is met. The conditions associated with the multi-value code word in the different clusters should differ from each other, and should be chosen such that only one of the conditions can be met in any particular case, so that a receiver will be able to map the multi-value code word to one specific cluster's golden word in each particular case. In such embodiments, the receiver would apply predetermined rules to pre-existing information to determine which of the conditions is met in each particular case. For example, assume that a received error-containing word "A" was most likely transmitted as word "B" under condition "X," and was most likely transmitted as word "C" under a different condition "Y." A first cluster includes word "B" and conditionally includes word "A" (subject to condition "X"). A second cluster includes word "C" and conditionally includes word "A" (subject to condition "Y"). In this example, the receiver would apply an algorithm to pre-existing information to determine which of conditions X and Y is met during transmission of the code words. For instance, the receiver could determine whether the bit pattern of a stream of the "Z" most recently inventive code words (where Z is a number) is DC balanced, and determine that condition X (but not condition Y) is met if the bit pattern is DC-unbalanced in the positive direction, and that otherwise condition Y (but not condition X) is met. In this example, the pre-existing information is the DC-balance level of the specified bit pattern. Alternatively, the pre-existing information could be a history of types of errors, or the pixel clock frequency, or a type of jitter, or other information.

Since a large number of possible errors can occur, it is possible that predicted errors that are likely to affect transmission of two different golden words (of two different golden sets) will produce the same received code. This could undesirably cause an overlap in the clusters including the two golden sets, unless one of the clusters is predetermined to exclude the received code (or unless the received code is conditionally included in two or more clusters, as described in the previous paragraph). To avoid such overlap between clusters, the received code that is less likely to occur is preferably excluded from the relevant cluster. For example, if a first cluster includes a first golden word, a second cluster includes a second golden word, a received code word (that is not a golden word) is expected (with probability P1) to result from transmission of the first golden word, and the same received code word is expected (with probability P2, where P2 is less than P1) to result from transmission of the second golden word, then the first cluster should include the received code word, but the received code word should not be included in the second cluster.

Consider for example the case that a received error-containing word "A" is most likely to have been transmitted as golden word "B" and slightly less likely to have been transmitted as word "C" (where word "B" differs from word "C" by only one bit). In a class of preferred embodiments, two disjoint clusters containing code words A, B, and C are determined as follows: a first cluster including golden word B and word A (and typically other words similar to B); and a second cluster including golden word C and one or more other words similar to C that are not included in the first cluster. With the clusters determined in this way, only a single bit error would result from transmission of word C, reception of word A (as a result of error in transmission and/or reception of the transmitted word C), and mapping of the received word A to golden word B. Preferably, the receiver includes error correction circuitry (ECC), and the receiver is configured to assert to the ECC the code words that result from mapping of received words (belonging to the clusters) to golden words. In the appropriate cases, the ECC would replace a word B in a block of code words by the word C. For example, if the ECC determines that such a word B has a bad bit, and the word B would be transformed to word C by flipping this bit, then if the bit is the only bad bit for the entire ECC block, the ECC could correct the error by flipping the bad bit and thereby transform the word B to the word C.

As noted, some implementations of the inventive receiver are configured to perform a two-stage mapping of received versions of the golden words to source data values: a first stage in which each received code word in a cluster is mapped to a golden word of the cluster's golden set; and a second stage in which the golden words determined during the first stage is mapped to the source word determined by the cluster's golden set. In some such implementations, an additional block of error correction code is transmitted with each set of golden words, and the receiver is configured to perform the first stage of mapping before performing error correction using the error correction code (to correct error-containing received code words that are not members of any of the clusters, to replace them with golden words to the extent possible). In the latter implementations, the inventive golden words and clusters are preferably chosen so as to implement mappings that exploit the degree of freedom provided by the performance of error correction. For example, the golden words can be selected to satisfy the criteria that the Hamming distance between any two golden words in different clusters is minimized to the extent practical (or otherwise not maximized), and that the clusters are mutually disjoint. With clusters including such golden words, the number of erroneous bits detected by the error correction circuitry in the receiver can be minimized and hence, the overhead of the error correction code can be minimized.

For example, receiver 200 of FIG. 14 includes decryption circuit 21 which receives and decrypts 8-bit decoded words from "mapping and decoding" circuitry 20, and error correction circuitry 22 coupled to receive the decrypted, decoded words output from circuit 21. Circuitry 20 is configured to perform a first stage of mapping to generate (and assert to circuit 21) a golden word in response to each recovered code word that is a member of one of the inventive clusters, but errors in some recovered words may prevent circuitry 20 from mapping the error-containing recovered words to golden words. Decrypted versions of the golden words determined by circuitry 20, the error-containing recovered words, and error correction code recovered with the code words are asserted to error correction circuitry 22. Circuitry 22 can pass through the decrypted golden words that it receives, and perform error correction using the error correction code to correct error-containing code words that are not members of any of the inventive clusters, thereby replacing such error-containing code words with golden words to the extent possible. In variations on the described implementation of receiver 200, error correction is not performed and circuitry 22 is omitted.

With reference to FIG. 4, we next describe a specific example of a set of seventeen golden words and a set of code word clusters (each including one of the golden words) employed in a class of preferred embodiments of the invention. In FIG. 4, the third column (from the left) shows the seventeen golden words, which have been described above. Sixteen of the golden words are used to encode sixteen different 8-bit source data words (each 8-bit source data word being indicative of four bits of raw source data), and the other golden word (the word "1100110010" in the first row) is used only as a guard band word. Each of the golden words is a 10-bit TMDS encoded word. The fourth column (from the left) shows some possible error cases for each 10-bit golden word, the fifth column shows the 8-bit word resulting from decoding of the corresponding 10-bit word in the fourth column in accordance with the conventional TMDS decoding algorithm, and the sixth column simply shows the hexadecimal representations of the corresponding elements in the fifth column. The seventh column (from the left) includes an indication as to whether each corresponding word in the fourth column is or is not a member of the cluster containing the corresponding golden word in the third column. Specifically, the term "IGNORE" in the seventh column indicates that the corresponding word in the fourth column is not a member of the cluster that contains the corresponding golden word in the third column.

There are seventeen clusters (separated by the horizontal bars in FIG. 4): a first cluster including the golden word "1100110010" and the code words "1110110010" and "1100010010" (all mapped to the "pre-data" auxiliary guard band word "01010101"); a second cluster (for encoding the source word AD0) including the golden word "0011100101" and the code words "1011100101," "0001100101," "0011110101," and "0011100001" (all mapped to the source word AD0); a third cluster (for encoding the source word AD1) including the golden word "0110001101" and the code words "0111001101" and "0110000101" (all mapped to the source word AD1); and the fourteen other indicated clusters (each including a different one of the fourteen other golden words, and consisting of words mapped to a different one of the source words AD2–AD15).

When the receiver recovers a code word (in the fourth column of FIG. 4) in one of the indicated clusters (there will be no "IGNORE" symbol in the seventh column corresponding to such recovered code word), the receiver will map the recovered code word to the source word (in the first column of FIG. 4) determined by the cluster's golden word (which is equivalent to mapping the recovered code word to the cluster's golden word in the third column).

Those code words in the fourth column marked with the term "IGNORE" in the seventh column are not members of the cluster that contains the corresponding golden word. For example, the code word "1100111010" in the third row of FIG. 4 is not a member of the first cluster (containing golden word "1100110010") because this code word is a member of the cluster that contains golden word "1000111010" and the clusters should be disjoint. Although the receiver would recover code word "1100111010" as a result of a single bit error (having relatively high probability) in transmission of golden word "1100110010" (in the first row of FIG. 4), and also as a result of a single bit error (also having relatively high probability) in transmission of golden word "1000111010" (in the $45^{th}$ row of FIG. 4), the receiver would map the received word to 8-bit source word "AD10" (which is equivalent to mapping the received word to the golden word "1000111010") rather than mapping to the source word ("01010101") determined by golden word "1100110010."

For another example, when the transmitter transmits the golden word "1100110010" (in the first row of FIG. 4), the receiver would recover the code word "1100110010" if the transmission is error-free (which has very high probability). The receiver would decode this recovered word in accordance with the conventional TMDS-decoding algorithm to determine decoded 8-bit word "01010101" and map the decoded 8-bit word to the source word "01010101" (which is the pre-data auxiliary guard band word). The receiver would recover the word "0011001111" (in the $52^{nd}$ row of FIG. 4) as a result of a single bit error (having relatively lower probability) in transmission of golden word "0011001101," and the receiver would decode this recovered word in accordance with the conventional TMDS-decoding algorithm (inverting its eight least-significant bits as a result of the value of its DC balancing bit) to determine the same decoded 8-bit word ("01010101"). The receiver would map this received word to the source word "01010101" (which is equivalent to mapping the received word to the golden word "1000111010").

We sometimes us the term "golden word" herein to denote a 8-bit word source word (e.g., a word in the left column of FIG. 4) determined by a 10-bit "golden" code word (e.g., a word in the third column from the left in FIG. 4).

With reference to the inventive guard band words described above, each guard band word can be a golden word (as in the FIG. 4 example) in which case there can be a cluster for each guard band word, each such cluster containing two or more code words (including a guard band word). Alternatively, the guard words are not golden words but they are reliably distinguishable from the golden words.

In each embodiment of the invention that employs at least one guard band word, each guard band word should have a bit pattern which allows the receiver to more reliably identify the relevant transition (indicated by the guard band word or words) between encoded control (or sync) word transmission and encoded data transmission. Thus, an additional factor in the selection of the inventive golden set is that the golden set should includes appropriate guard band words (i.e., the guard band words are golden words), or each golden word of the golden set should be reliably distinguishable from each guard band word to be employed. For example, the set of 17 golden words shown in FIG. 4 includes a special auxiliary guard band word (having bit pattern "1100110010," and shown in the third column of the first row of FIG. 4) that is used to identify the start of an auxiliary data burst. As shown in FIG. 5, two repetitions of this "pre-data" auxiliary guard band word are preferably transmitted at the start of each burst of encoded auxiliary data (i.e., just after each auxiliary preamble) in each of channels CH2 and CH1. Since the last bit of each specific encoded control word transmitted in channels CH2 and CH1 (during the auxiliary preamble) is "0" as explained above, the first transmitted bit of the code word chosen as the pre-data auxiliary guard band word is "1" to increase the reliability with which the receiver can identify the start of a transmitted burst of auxiliary data.

The set of 17 golden words shown in FIG. 4 also includes a word (the golden word "0011001101" that corresponds to input word AD11) that is used to identify the end of an auxiliary data burst, and is also used as a video guard band word. As shown in FIG. 5, two repetitions of this "post-data" auxiliary guard band word are preferably transmitted at the end of each burst of encoded auxiliary data (i.e., just before each video preamble) in each of channels CH2 and CH1.

The pre-data auxiliary guard band word need not be repeated (transmitted twice) at the start of each auxiliary data burst, and the post-data auxiliary guard band word need not be repeated at the end of each auxiliary data burst. In the preferred embodiment (indicated by FIG. 5), each is repeated in order to allow the receiver more easily to recognize and correct for data shift errors between channels that can occur during transmission and recovery of the data (e.g., error in the trace length of the received data on channel CH1 relative to that of the data received on channel CH2). In other embodiments of the invention, an auxiliary guard band word is repeated more than twice (or is transmitted only once) at the start of each auxiliary data burst and/or more than twice (or is transmitted only once) at the end of each auxiliary data burst.

With reference to FIG. 4, the golden word "0011001101" (that corresponds to input word AD11) is used as a video guard band word to identify the start of a video data burst, in addition to being used as a code word for encoding the four-bit quantity of auxiliary data indicated by input word AD11, and as a post-data auxiliary guard band word. As shown in FIG. 6, two repetitions of this video guard band word are preferably transmitted at the start of each burst of encoded video data (i.e., just after each video preamble). Since the last two bits of the encoded control or sync word transmitted in each of channels CH1 and CH2 (at the end of the video preamble) are likely to be "11" as explained above, the first two transmitted bits of the video guard band word are chosen to be "00" to increase the reliability with which the receiver can identify the start of a transmitted burst of video data.

The video guard band word need not be repeated (transmitted twice) at the start of each video data burst. In the embodiment shown in FIG. 6, it is repeated in order to ensure transmission (on each of channels CH0, CH1, and CH2) of code words indicative of an even number of pixels during the burst. In other embodiments, a video guard band word is repeated more than twice (or is transmitted only once) at the start of each video data burst.

In some embodiments of the invention, two (or more than two) streams of video data are transmitted (over one, two, or more than two channels). For example, two or more streams of video data can be transmitted in time-multiplexed fashion over each of one or more of Channels 0, 1, and 2 of FIG. 2. If bursts of different streams of video data are sequentially transmitted over one channel, different video guard band words can be transmitted at the start (and/or the end) of each burst, with each different stream being identified by a different video guard band word. Similarly, two (or more than two) streams of auxiliary data can be transmitted over one, two, or more than two channels). If bursts of different streams of auxiliary data are sequentially transmitted over one channel, different auxiliary guard band words can be transmitted at the start (and/or the end) of each burst, with each different stream being identified by a different guard band word.

Where encoded data are transmitted serially over multiple independent channels, DE shifts in individual channels can be corrected independently (in accordance with the invention) by using guard band words in each channel. Since there can be misalignment between the DE transitions indicated by the bits transmitted over multiple channels of a TMDS link (or TMDS-like link or other serial link) by one pixel clock cycle (or more than one pixel clock cycle) in either direction (due to ISI or other noise sources on the link), a set of identical guard band words (each a member of the set of inventive code words) is preferably transmitted in accordance with the invention at the start and/or end of each burst of data encoded using the inventive code words that is transmitted over each channel (e.g., at the end of each auxiliary preamble of each channel, and/or at the start of the video preamble of each channel, and/or at the end of the video preamble of each channel). This can improve the channel-to-channel alignment and data integrity. The need to have available the appropriate number of guard band words is a factor in the selection of the inventive set of code words.

The purpose of repeating the transmission of a guard band word (either at the transition between an expected bit pattern and a burst of data encoded in accordance with the invention following such pattern, or at the transition between a burst of data encoded in accordance with the invention and an expected bit pattern that follows such data) is to prevent two types of misidentification of transitions: identifying the transition too early and identifying the transition too late. By transmitting a repeating sequence of N guard band words, the invention prevents such pixel shift errors up to N pixels in either direction. For example, if a sequence of N post-data guard band words is appended to an encoded data burst, the invention ensures that when there is an N pixel shift to the left, the last data value is not lost (only the post-data guard band word is lost). Generally, a sequence of only N post-data guard band words is needed for use with a sequence of N pre-data guard band words.

In the preferred embodiment (indicated by FIG. 5), the auxiliary guard band words transmitted at the start and end of each auxiliary data burst on channels CH2 and CH1 are not transmitted at the start and end of each auxiliary data burst on channel CH0. Rather, special encoding is used to determine the first two and last two 10-bit inventive code words transmitted in each auxiliary data burst on channel CH0. Specifically, two bits of input auxiliary data are encoded and transmitted during each of the first two and last two pixel clock cycles of each auxiliary data burst (whereas four bits of input auxiliary data are encoded and transmitted during all the other pixel clock cycles of each auxiliary data burst as described above). The two bits of input auxiliary data to be transmitted during the first clock cycle are encoded as one of the words AD0, AD1, AD2, and AD3 in FIG. 4 and the two bits of input auxiliary data to be transmitted during the second clock cycle are encoded as another one of the words AD0, AD1, AD2, and AD3. Thus, the first two 10-bit words transmitted in the burst are versions of the inventive code word indicative of these two words AD0, AD1, AD2, and AD3 (and are thus indicative of the first four bits of input auxiliary data). Similarly, the two bits of input auxiliary data to be transmitted during the next to last clock cycle are encoded as one of the words AD0, AD1, AD2, and AD3 in FIG. 4 and the two bits of input auxiliary data to be transmitted during the last clock cycle are encoded as another one of the words AD0, AD1, AD2, and AD3. The last two 10-bit words transmitted in the burst are versions of the inventive code word indicative of these two words AD0, AD1, AD2, and AD3 (and are thus indicative of the last four bits of input auxiliary data). This encoding of 2-bit auxiliary data words using four 10-bit golden words is sometimes referred to herein as "TERC2" encoding, in contrast with the encoding of 4-bit auxiliary data words using sixteen 10-bit golden words which is sometimes referred to herein as "TERC4" encoding.

More generally, different control or synchronization bits (e.g., the 10-bit control characters indicative of bits CTL0:CTL1 or CTL2:CTL3 in the DVI specification) can produce different errors on video (or auxiliary) data bits that are transmitted just after the control characters, when ISI is present on the serial data transmission channel. This is preferably recognized and used as a factor in selecting the inventive code word set for use in transmitting the video (or auxiliary) data. Alternatively, the control codes sent just before the data (encoded in accordance with the invention) are controlled to reduce the ISI effect.

In other embodiments of the invention, bursts of encoded auxiliary data and bursts of encoded video data are transmitted over a serial link (which need not be a TMDS link), and the auxiliary data are encoded in accordance with the invention using a set of inventive code words. The set of inventive code words includes a "video" guard band word that is transmitted at the start of each encoded video data burst, and an "auxiliary" guard band word that is transmitted at the start of each encoded auxiliary data burst. In some implementations, the video guard band word is also used for a second purpose: to encode auxiliary data. In preferred implementations of such embodiments, the encoded video data are transmitted during active video periods in which a video data enable signal is high (e.g., control signal "DE" satisfies DE=1), and encoded control (or synchronization) signals and encoded auxiliary data are transmitted during blanking intervals (when the video data enable signal is low) between active video periods. A video guard band word is transmitted at the start of each active video period. Each blanking interval comprises an "auxiliary" preamble period (between the falling edge of the video data enable signal and the start of a burst of auxiliary data) in which control (or sync) signals of a specific type are transmitted, at least one auxiliary data period after the auxiliary preamble period (each auxiliary data period comprising an auxiliary guard band word followed by a burst of encoded auxiliary data), and a "video" preamble period between the last auxiliary data period and the next active video period. In general, the purpose of using guard band words in accordance with the invention is to guarantee that the receiver can recognize the transition between the first guard band word transmitted at the start of an encoded data burst and the last bit transmitted before such guard band word, and between the last guard band word transmitted at the end of an encoded data burst and the first bit transmitted after such guard band word.

In a class of embodiments of the invention, a conventional encoding algorithm is used to encode primary data (which can but need not be video data) for transmission in bursts over a serial link, and auxiliary data (e.g., audio data or data of another type that can be transmitted with a lower data rate than the primary data) are encoded in accordance with the invention for transmission in bursts (between bursts of the encoded primary data) over a serial link. The full set of code words used for encoding the primary data has at least one code word for each of $2^N$ different words of the primary data (sometimes referred to as source data words). The inventive subset of such full set has at least one code word for each of not more than $2^M$ different words (where M<N) of the auxiliary data (also referred to sometimes as source data words). The auxiliary data are buffered and packed into M-bit format (i.e., into words each consisting of M bits). Each possible value of the M-bit source data has a preselected code in the $2^M$ word space provided by the inventive code words. The M-bit words of auxiliary data are mapped to inventive code words in the $2^M$ word space which are then transmitted over the link.

In choosing which of the invention golden words to employ to transmit encoded data (e.g. auxiliary data distinct from video data) in accordance with the invention, it is important to consider that some bits (of multi-bit encoded words) present greater risks of error than other such bits. For example, when using TMDS-encoded golden words to transmit auxiliary data, the DC balancing bits and transition control bits (e.g., bits Q[9] and Q[8]) present greater error risks than do the other bits. Any bit error occurring during processing of the DC balancing and transition control bits can affect other bits of the multi-bit encoded words. Hence a one-bit error in one of the critical bits is translated into a burst error. This effect is preferably considered in selecting the inventive code words from a full set of TMDS-encoded words.

Figure 8:
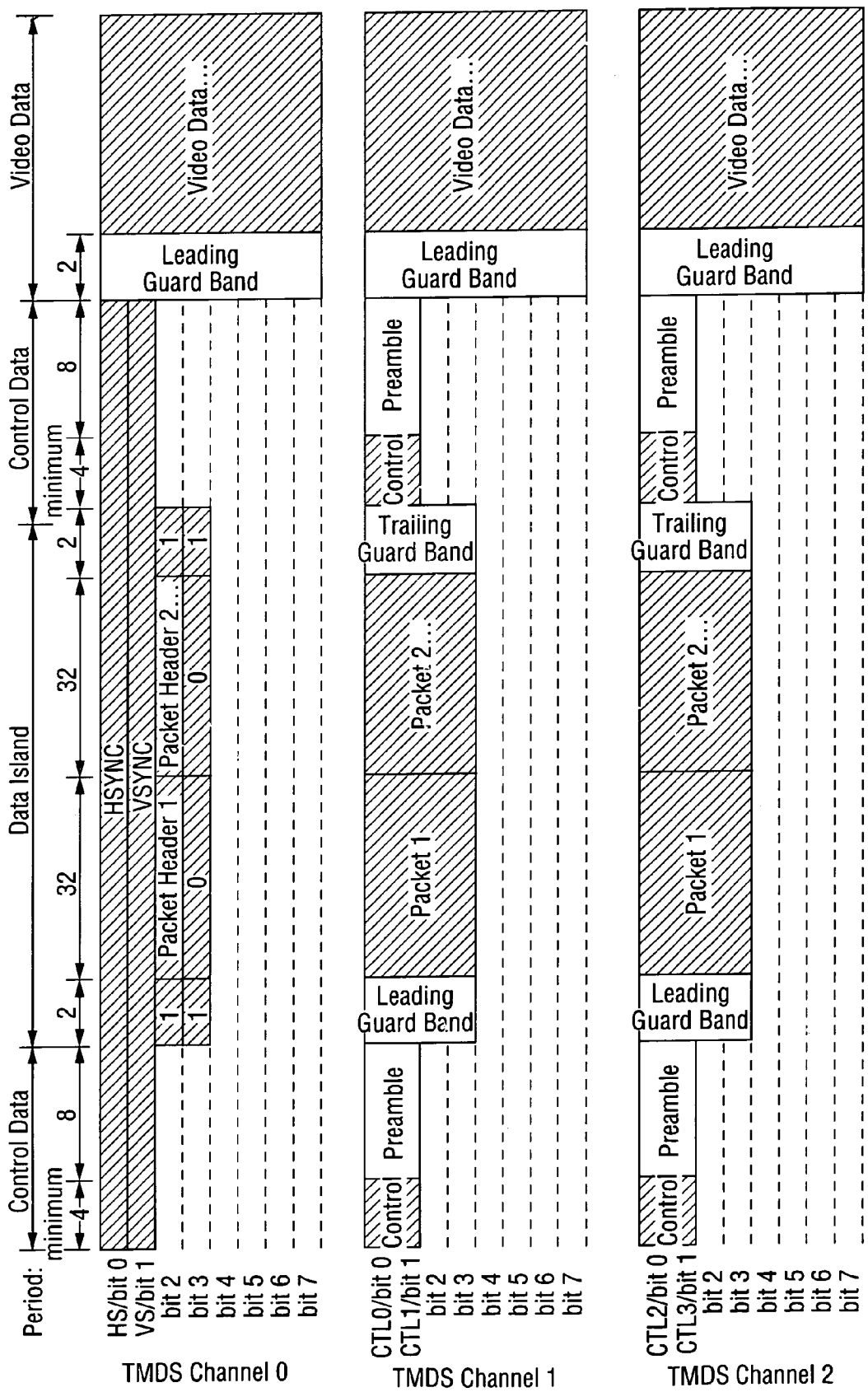
FIG. 8 is a diagram of the format in which video data (and guard bands) are transmitted in active video periods, packets of data (and guard bands) are transmitted during data islands, and preamble words and control words are transmitted in control data periods, in preferred embodiments of the invention.

With reference to FIGS. 2 and 8, we next describe the format and timing with which data are transmitted over a TMDS link in a class of preferred embodiments of the inventive system. In these embodiments, a transmitter (e.g., transmitter 1' of FIG. 2) sends 8-bit video data words (each encoded using the TMDS encoding algorithm as a 10-bit, transition-minimized code word) over the video channels (CH0, CH1, and CH2) of a TMDS link during active video periods in which a control signal (DE) is high. During data islands (in which DE is also high) between the active video periods, the transmitter sends packets containing 4-bit words (which typically include 4-bit audio data words), each encoded according to the TMDS encoding algorithm as a 10-bit, transition-minimized code word, and preferably as a 10-bit golden word, over the video channels. During "control data" periods (in which DE is low) between the active video periods and data islands, the transmitter sends control words (each encoded as a 10-bit, transition-maximized code word indicative of two control bits: CTL0 and CTL1, or CTL2 and CTL3) over channels CH1 and CH2, and sync words (each encoded as a 10-bit, transition-maximized code word indicative of two sync bits: HSYNC and VSYNC) over channel CH0. During each active video period, HSYNC, VSYNC, CTL0, CTL1, CTL2, and CTL3 are assumed by the receiver (e.g., receiver 2' of FIG. 2) to maintain the values that they had when the active video period started.

Each data island includes at least one packet, and each packet is transmitted over a period of 32 pixel clock cycles. As shown in FIG. 8, part of each packet is transmitted over each of channels CH0, CH1 and CH2 during the 32-pixel clock period. It should be understood that during each pixel clock cycle, the transmitter sends one serialized 10-bit TMDS code word over each of channels CH0, CH1, and CH2. Thus, each packet includes 96 (=3*32) TMDS code words, each code word indicative of a 4-bit source word.

During each data island, transition-minimized code words indicative of HSYNC and VSYNC bits are sent over channel CH0 (e.g., one code word, indicative of a HSYNC bit, a VSYNC bit, and two other bits, is sent per pixel clock cycle). Preferably, each packet sent during a data island includes a 32-bit packet header, and each code word indicative of HSYNC and VSYNC that is transmitted during a data island is also indicative of one bit of the packet header.

In a mode in which no data islands are transmitted, each control data period is an entire horizontal (or vertical) blanking interval between two consecutive active video periods. In other modes, the transmitter inserts one or more data islands in each horizontal blanking interval and vertical blanking interval (or in each of a subset of the blanking intervals).

In each of channels CH1 and CH2, a "data island" preamble word is transmitted repeatedly (in a control data period) just before each data island, and a video preamble word is transmitted repeatedly (in a control data period) just before each active video period. In each such channel, a burst of eight identical data island preamble words is preferably transmitted just before each data island, and a burst of eight identical video preamble words is preferably transmitted just before each active video period. Each data island preamble word transmitted over channel CH1 is a 10-bit TMDS code word indicative of CTL0=1 and CTL1=0, and each data island preamble word transmitted over channel CH2 is a 10-bit TMDS code word indicative of CTL2=1 and CTL3=0. Each video preamble word transmitted over channel CH1 is a 10-bit TMDS code word indicative of CTL0=1 and CTL1=0, and each video preamble word transmitted over channel CH2 is a 10-bit TMDS code word indicative of CTL2=0 and CTL3=0.

In the preferred embodiments being described with reference to FIGS. 2 and 8, each data island of each of channels CH1 and CH2 begins and ends with a burst of two identical guard band words (the above-mentioned data island guard band word "Data Island GB"=0b1100110010), each active video period begins with a burst of two identical guard band words (the above-mentioned word "Video GB(CH0,CH2)"=0b0011001101 in channels CH0 and CH2, and the above-mentioned word "Video GB (CH11)"=0b1100110010 in channel CH1). Such guard band words and the preamble words described in the preceding paragraph are chosen to have patterns such that a receiver can reliably identify each leading and trailing edge of each data island and each leading edge of an active video period. Each data island of channel CH0 begins and ends with a burst of two identical guard band words (a transition minimized TMDS 10-bit code word indicative of any of the values 0xC, 0xD, 0xE and 0xF, depending upon the values of HSYNC and VSYNC such that the receiver can reliably identify each leading and trailing edge of the data island).

In preferred embodiments, the following example of encoding (sometimes referred to as "TERC4 coding"), rather than the version described with reference to FIG. 4, is used to encode 4 bits of audio data (or other auxiliary data) into the indicated 10-bit, transition-minimized TMDS code words that are serialized and transmitted during each data island (the listed TMDS code words are "golden words"):

| Source word (bit3, bit2, bit1, bit0): | TMDS code word |
|---|---|
| 0000: | q_out[0:9] = 0b0011100101; |
| 0001: | q_out[0:9] = 0b1100011001; |
| 0010: | q_out[0:9] = 0b0010011101; |
| 0011: | q_out[0:9] = 0b0100011101; |
| 0100: | q_out[0:9] = 0b1000111101; |
| 0101: | q_out[0:9] = 0b0111100010; |
| 0110: | q_out[0:9] = 0b0111000110; |
| 0111: | q_out[0:9] = 0b0011110010; |
| 1000: | q_out[0:9] = 0b0001100101; |
| 1001: | q_out[0:9] = 0b1001110010; |
| 1010: | q_out[0:9] = 0b0011100110; |
| 1011: | q_out[0:9] = 0b0110001101; |
| 1100: | q_out[0:9] = 0b0111000101; |
| 1101: | q_out[0:9] = 0b1000111001; |
| 1110: | q_out[0:9] = 0b1100011010; |
| 1111: | q_out[0:9] = 0b1100001101; |
| Video GB: (CH1) | q_out[0:9] = 0b1100110010; |
| Video GB: (CH0,CH2) | q_out[0:9] = 0b0011001101; |
| Data Island GB: (CH1,CH2) | q_out[0:9] = 0b1100110010. |

In the foregoing list of TMDS code words, the least significant bit of each code word (q_out[0]) is the first bit to be transmitted, the most significant bit (q_out[9]) is the last to be transmitted, the word "Video GB(CH1)" is a video guard band word transmitted in channel CH1, the word "Video GB(CH0,CH2)" is a video guard band word transmitted in channels CH0 and CH2, and the word "Data Island GB (CH1,CH2)" is a data island guard band word transmitted in channels CH1 and CH2. In embodiments in which the above-listed golden words are transmitted during data islands over channels CH0, CH1, and CH2 of a TMDS link, the video words transmitted over channels CH0, CH1, and CH2 during active video periods can encoded using the full set of transition-minimized TMDS code words.

When the foregoing list of code words are used, a video preamble is determined by repetitions (preferably 8 repetitions) of a 10-bit transition-maximized TMDS code word (transmitted in CH1) indicative of the control bit values CTL0,CTL1=1,0, and a 10-bit transition-maximized TMDS code word (transmitted in CH2) indicative of the control bit values CTL2,CTL3=0,0, and a data island preamble is determined by repetitions (preferably 8 repetitions) of a 10-bit transition-maximized TMDS code word (transmitted in CH1) indicative of the control bit values CTL0,CTL1=1, 0, and a 10-bit transition-maximized TMDS code word (transmitted in CH2) indicative of the control bit values CTL2,CTL3=1,0. Such combination of guard band words and preambles enables the receiver to reliably identify the beginning of each active video period and the beginning and end of each data island.

When using the list of code words and the preamble words discussed in the two preceding paragraphs, special encoding is preferably used to determine the first two and last two 10-bit inventive code words transmitted in each data island on channel CH0. Specifically, two bits of input auxiliary data are preferably encoded and transmitted on channel CH0 during each of the first two and last two pixel clock cycles of each data island (whereas four bits of input auxiliary data are encoded and transmitted on channel CH0 during all the other pixel clock cycles of each data island as described above). The two bits of input auxiliary data to be transmitted on CH0 during each of the first, second, next to last, and last pixel clock cycles of each data island are preferably encoded as one of the above-listed code words 0b0111000101, 0b1000111001, 0b1100011010, and 0b1100001101.

In preferred embodiments of the inventive system to be described with reference to FIGS. 2 and 8, each data island contains at least one packet (limiting its minimum duration to 36 pixel clock cycles, including two pixel clock cycles for leading guard bands and two pixel clock cycles for trailing guard bands). Each data island must contain an integer number of packets, and preferably (in order to assure the reliability of the data within the data island) the maximum number of packets in each data island is fourteen. Error detection and correction (preferably BCH error detection and correction, a well-known error detection and correction technique named after the developers Bose, Chauduri, and Hocquenghem) is applied each packet sent during each data island.

Figure 9:
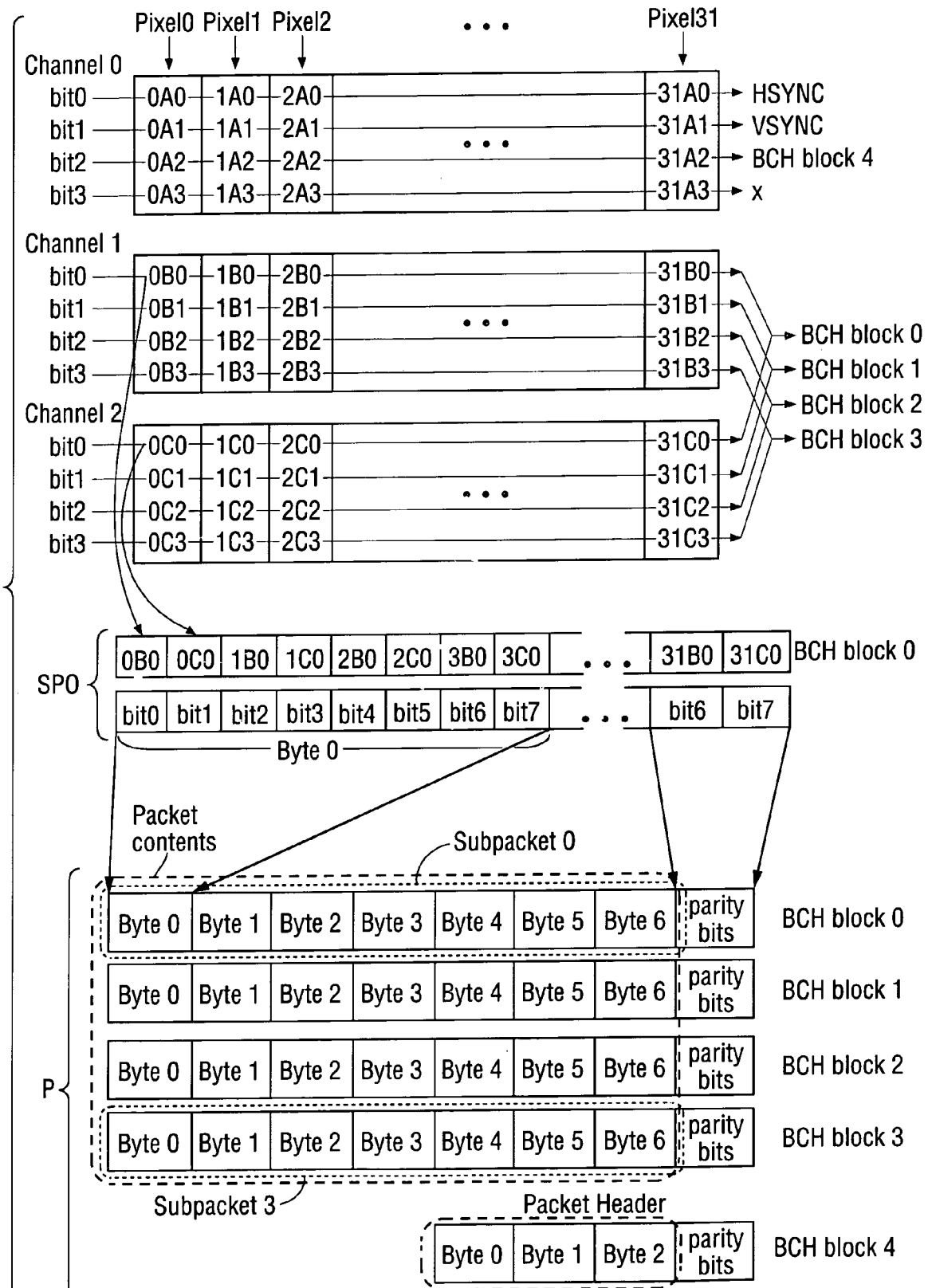
FIG. 9 is diagram of the format in which data are transmitted in packets (during data islands) in preferred embodiments of the invention.

A preferred format for each packet will be described with reference to FIG. 9. Each packet has a 32-bit (4-byte) packet header and four sub-packets (each consisting of 64 bits=8 bytes), as does packet "P" at the bottom of FIG. 9. In FIG. 9, the subpackets are labeled Subpacket 0 (or "SP0"), Subpacket 1, Subpacket 2, and Subpacket 3. Each subpacket includes 56 data bits (i.e., 7 bytes, each byte corresponding to one 10-bit TMDS code word) followed by 8 BCH parity bits. Nine data bits of a packet are transmitted per pixel clock cycle. Of these, one data bit (a header bit) is transmitted (in the form of one 10-bit TMDS code word, which also encodes HSYNC and VSYNC bits) on channel CH0 per pixel clock cycle, and four data bits are transmitted (in the form of one TMDS code word) on each of channels CH1 and CH2 per pixel clock cycle. During each pixel clock cycle, the TMDS decoding circuitry in the receiver recovers four bits of data from channel CH0 (i.e., from one TMDS code word), four more bits of the data from channel CH1, and four more bits of the data from channel CH2.

In FIG. 9, the data and parity bits of Subpacket 0 are identified as "BCH block 0," the data and parity bits of Subpacket 1 are identified as "BCH block 1," the data and parity bits of Subpacket 2 are identified as "BCH block 2," and the data and parity bits of Subpacket 3 are identified as "BCH block 3." The packet header includes 24 data bits (3 bytes of data) followed by 8 BCH parity bits (these data and parity bits are identified in FIG. 9 as "BCH block 4").

Preferably, the BCH parity bits for each packet header are BCH(32,24) bits that are generated using the polynomial $G(x)=1+x^6+x^7+x^8$ (with a 127 count repetition cycle) by the generator shown in FIG. 9A. Preferably, the BCH parity bits for the sub-packets are BCH(64,56) bits that are generated using the polynomial $G(x)=1+x^6+x^7+x^8$ (with a 127 count repetition cycle) by the generator shown in FIG. 9B. Preferred embodiments of the inventive transmitter include the FIG. 9B circuit for generating BCH parity bits for the 56 data bits of each subpacket, and also the FIG. 9A circuit for generating BCH parity bits for the 24 data bits of each packet header.

Figure 9C:
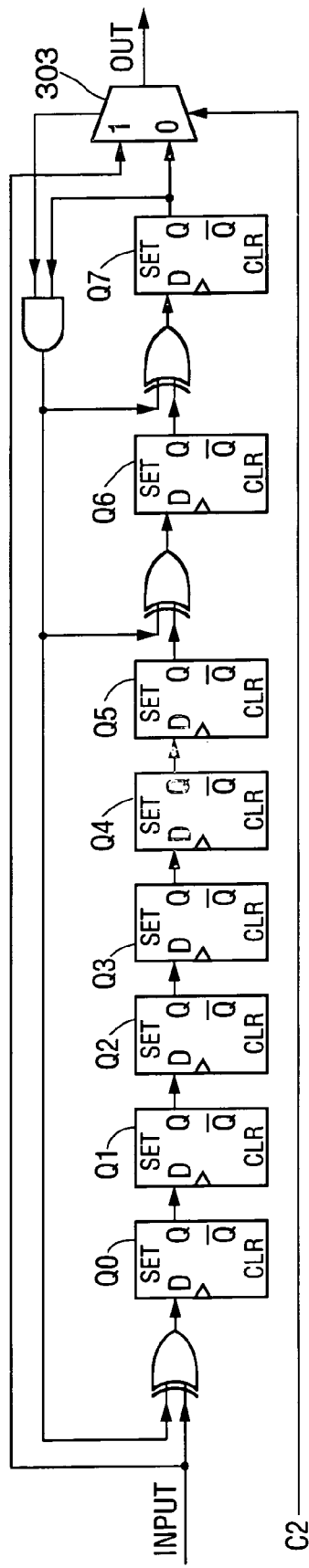
FIG. 9C is a schematic diagram of a circuit which is included in a class of preferred embodiments of the invention, for generating a syndrome from packetized data.
Figure 9D:
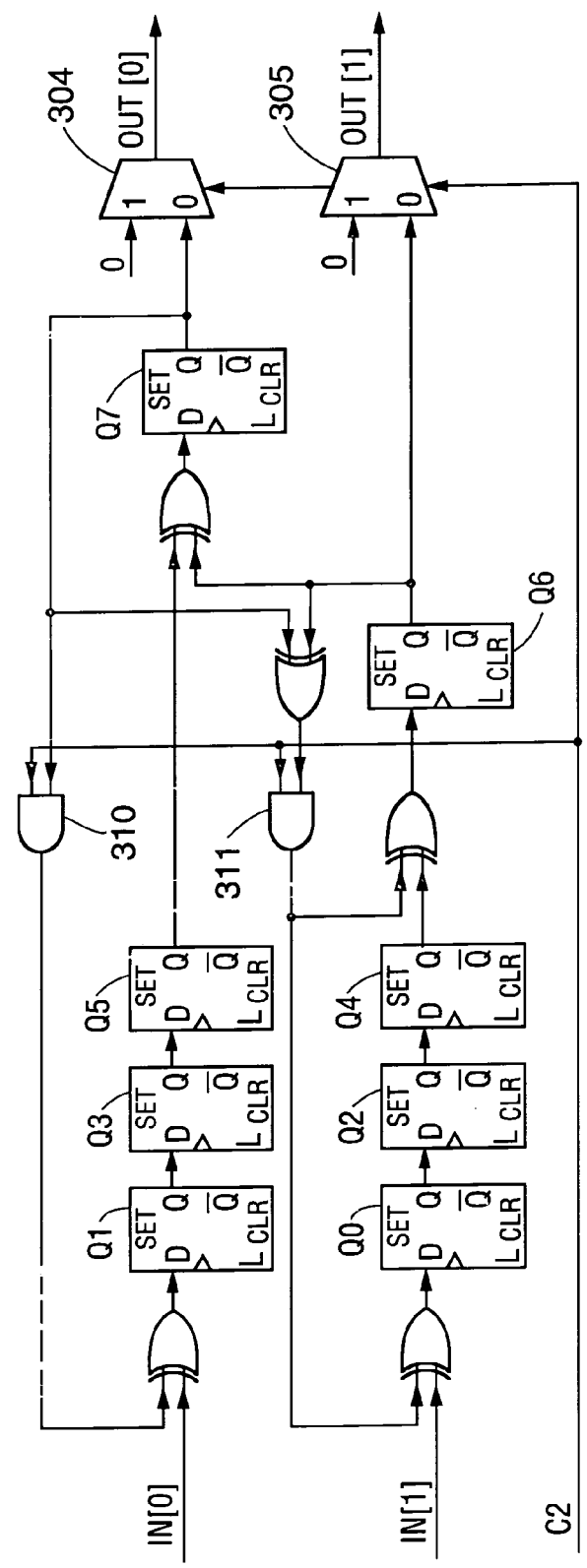
FIG. 9D is a schematic diagram of a circuit which is included in a class of preferred embodiments of the invention, for generating a syndrome from packetized data.

Preferred embodiments of the inventive receiver for receiving packets whose BCH parity bits have been generated using the FIGS. 9A and 9B circuits include the FIG. 9D circuit (for generating a BCH syndrome from the 64 bits of each subpacket) and also the FIG. 9C circuit (for generating a BCH syndrome from the 32 bits of each packet header).

More generally, the circuits of FIGS. 9B and 9D embody an aspect of the present invention that is useful in a variety of contexts for generating error correction code bits (e.g., parity bits or syndrome bits) from parallel streams of input data, for reducing the number of cycles needed to generate error correction bits from cyclic polynomials, such as BCH polynomials, and for reducing the number of cycles needed to calculate the syndromes of codes created by cyclic polynomials. This aspect of the invention is useful in a variety of systems in which error correction code (e.g., BCH parity bits, and syndromes generated from BCH parity bits and data) must be created for partially parallelized data streams, and in which a small number (e.g., two) of the input bits of the next block of input data are available during generation of the error correction code for the current block of input data. In such systems, the even bits of each block of input data can be processed simultaneously (in parallel) with the odd bits from each input data block in accordance with the invention, to generate the error correction code for each block in a reduced number of clock cycles. Without using the present invention, it would be necessary to employ a clock whose frequency is a multiple (e.g., 2×, 3×, or 4×) of the frequency of the system clock (the clock used by the system for purposes other than error correction code generation) in order to generate the same error correction code in the same time that the code could be generated (using the system clock) in accordance with the invention. Utilizing a multiple of a system clock is disadvantageous since it requires the clocked logic to run faster and requires the existence of the frequency-multiplied version of the system clock (generation of such a frequency-multiplied clock is usually expensive since it requires a clock multiplier circuit, which typically includes a PLL).

The error correction code generation circuitry of each of FIGS. 9A and 9B employs a control bit C1 which controls whether the circuitry passes through to its output(s) the input data received at its input(s), or whether the circuitry asserts error correction code at its output(s). With reference to FIG. 9A, during the first "z" clock cycles, the control bit C1 is high, allowing a z-bit block of the input data (INPUT) to feed into the shift register, to generate the error correction code, while the block also passes through multiplexer 300 to the output. When the FIG. 9A circuit is implemented in a preferred embodiment of the inventive transmitter (e.g., a preferred implementation of transmitter 100 of FIG. 13), a 24-bit block of packet header data is input (and passed through to the output) while C1 is high. Then C1 goes low, causing multiplexer 300 to pass through the output of register Q7 in place of the input data. While C1 is low, a sequence of eight BCH parity bits is shifted out of register Q7, during eight clock cycles. While C1 is low, the source of the input data should be quiescent.

The FIG. 9B circuit operates similarly to that of FIG. 9A, but includes a shift register having two input nodes and two output nodes, each input node receiving a different subset of the input bits (rather than a shift register having one input as in FIG. 9A), and requires only (N/2)+1 clock cycles to generate eight BCH parity bits (whereas the FIG. 9A circuit requires N+1 clock cycles to do so) and four additional clock cycles to shift out the eight BCH parity bits (by shifting four BCH parity bits from register Q6 while shifting four BCH parity bits from register Q7). Given the register values (in each of registers Q0–Q7 of FIG. 9B) at the end of assertion of a current block of input data and the first even bit ("IN[0]") and first odd bit ("IN[1]") of the next block of input data, the BCH parity bits (asserted from the two shift registers to multiplexers 301 and 302) for the current block of input data are always determined. When the FIG. 9B circuit is implemented in a preferred embodiment of the inventive transmitter (e.g., a preferred implementation of transmitter 100 of FIG. 13), the 56 data bits of a subpacket are received at the inputs (and passed through to the outputs) during 28 clock cycles while C1 is high, with a different pair of the subpacket bits, IN[0] and IN[1], being received per clock cycle. In general, variations on the FIG. 9B design that employ a shift register with "m" input nodes and receive "m" bits of the next block of input data (one of the "m" bits at each shift register input) while generating error correction code for the current block, can generate error correction code (e.g., BCH parity bits) for a current block of input data in "k/m+p" clock cycles and can shift out the error correction code in "n/m" cycles (e.g., when C1 is low), where "n," "p," and "k" are parameters determined by the size of each input block and the number of bits of error correction code to be generated for each input block.

In typical operation of the FIG. 9B circuit, the first even bit ("IN[0]") and first odd bit ("IN[1]") of the next block of input data are asserted at the inputs of the FIG. 9B circuit at the time when C1 undergoes a high-to-low transition, and these values of IN[0] and IN[1] continue to be asserted at the inputs while C1 remains low. We use the notation "Q0, Q1, Q2, Q3, Q4, Q5, Q6, or Q7" to denote the bit in register Q0, Q1, Q2, Q3, Q4, Q5, Q6, or Q7, respectively, at the time C1 undergoes the high-to-low transition. When C1 is low, the bits Q0, Q2, Q4, and Q6 are shifted out from one shift register output to multiplexer 301 (since the output of AND gate 308 is low during this process), and the bits Q1, Q3 Q5, and Q7 are shifted out of the other shift register output to multiplexer 302 (since the output of AND gate 309 is low during this process). The values of these bits are:

$$Q0 = ((Q7 \wedge IN[0]) \wedge (Q6 \wedge IN[1])) \& C1;$$
$$Q1 = (Q7 \wedge IN[0]) \& C1;$$
$$Q2 = Q0;$$
$$Q3 = Q1;$$
$$Q4 = Q2;$$
$$Q5 = Q3;$$
$$Q6 = Q4 \wedge (((Q7 \wedge IN[0]) \wedge (Q6 \wedge IN[1])) \& C1); \text{ and}$$
$$Q7 = Q5 \wedge ((Q6 \wedge IN[1]) \& C1),$$

where "$\wedge$" denotes an exclusive OR operation, and "&" denotes an AND operation.

The bits Q0, Q1, Q2, Q3, Q4, Q5, Q6, and Q7 are generated when C1 is high. When C1 is low, the FIG. 9B circuit functions as a simple shift register to shift out Q0, Q2, Q4, and Q6 through multiplexer 301, and Q1, Q3, Q5, and Q7 through multiplexer 302.

The same values of the bits Q0, Q1, Q2, Q3, Q4, Q5, Q6, and Q7 that are output from the FIG. 9B circuit would be output from the FIG. 9A circuit (assuming that the same input values were asserted to the circuits of FIGS. 9A and 9B before the high-to-low transition of the bit C1, and that the control bit C1 undergoes its high-to-low transition at the clock edge following assertion of the first odd bit IN[1] of the next block as an input value), but the FIG. 9A circuit requires eight clock cycles to shift them out to multiplexer 300 and the FIG. 9B circuit requires only four clock cycles to shift them out to multiplexers 301 and 302.

A syndrome is an indicator of whether a transmitted sequence with its error correction code has been corrupted. If there is not corruption, the syndrome should be zero. If any of the bits has been corrupted, the syndrome will likely become nonzero. Depending on the number of bits that have been corrupted and the Hamming distance of the encoded sequence, the syndrome can be used to correct the corrupted bits.

The syndrome generation circuitry of each of FIGS. 9C and 9D employs a control bit C2 which controls whether the circuitry passes through to its output(s) the input data received at its input(s), or whether the circuitry asserts syndrome bits at its output(s). With reference to FIG. 9C, during the first "z" clock cycles, the control bit C2 is high, allowing a z-bit block of the input data (INPUT) to feed into the shift register and also to pass through multiplexer 303 to the output. When the FIG. 9C circuit is implemented in a preferred embodiment of the inventive receiver (e.g., a preferred implementation of receiver 200 of FIG. 14), a 32-bit packet header is input (and passed through to the output) during each interval in which C2 is high. Then C2 goes low, causing multiplexer 303 to pass through the output of register Q7 in place of the input data. While C2 is low, a sequence of eight syndrome bits is shifted out of register Q7, during eight clock cycles.

The FIG. 9D circuit operates similarly to that of FIG. 9C, but includes a shift register having two input nodes and two output nodes, each input node receiving a different subset of the input bits (rather than a shift register having one input node as in FIG. 9C), and requires only requires only (N/2)+1 clock cycles to generate eight syndrome bits (whereas the FIG. 9C circuit requires N+1 clock cycles to do so) and four additional clock cycles to shift out the eight syndrome bits (by shifting four syndrome bits from register Q6 while shifting four syndrome bits from register Q7). Given the register values (in each of registers Q0–Q7 of FIG. 9D) at the end of assertion of a current block of input data and the first even bit ("IN[0]") and first odd bit ("IN[1]") of the next block of input data, the syndrome bits (asserted from registers Q6 and Q7 to multiplexers 304 and 305) for the current block of input data are always determined. When the FIG. 9D circuit is implemented in a preferred embodiment of the inventive receiver (e.g., a preferred implementation of receiver 200 of FIG. 14), the 64 bits of a subpacket are received at the inputs (and passed through to the outputs) during 32 clock cycles while C2 is high, with a different pair of the subpacket bits, IN[0] and IN[1], being received per clock cycle, and a different pair of the subpacket bits, OUT[0] and OUT[1], being output per clock cycle. In general, variations on the FIG. 9D design employ a shift register having "m" input nodes and receive "m" bits of the next block of input data (one of the "m" bits at each shift register input node) while generating a syndrome for the current block, and can generate syndrome bits for a current block of input data in "k/m+p" clock cycles and can shift out the syndrome bits in "n/m" cycles (e.g., when C2 is low), where "n," "p," and "k" are parameters determined by the size of each input block and the number of syndrome bits to be generated for each input block.

In typical operation of the FIG. 9D circuit, the first even bit ("IN[0]") and first odd bit ("IN[1]") of the next block of input data are asserted at the inputs of the FIG. 9B circuit at the time when C2 undergoes a high-to-low transition, and these values of IN[0] and IN[1] continue to be asserted at the inputs while C2 remains low. We use the notation "Q0, Q1, Q2, Q3, Q4, Q5, Q6, or Q7" to denote the bit in register Q0, Q1, Q2, Q3, Q4, Q5, Q6, or Q7, respectively, at the time C2 undergoes a high-to-low transition. When C2 is low, the bits Q0, Q2, Q4, and Q6 are shifted out of one shift register output to multiplexer 305 (since the output of AND gate 311 is low during this process), and the bits Q1, Q3 Q5, and Q7 are shifted out of the other shift register output to multiplexer 304 (since the output of AND gate 310 is low during this process). The values of these syndrome bits are:

$$Q0 = IN[1] \wedge ((Q6 \wedge Q7) \& C2);$$
$$Q1 = IN[0] \wedge (Q7 \& C2);$$
$$Q2 = Q0;$$
$$Q3 = Q1;$$
$$Q4 = Q2;$$
$$Q5 = Q3;$$
$$Q6 = Q4 \wedge ((Q6 \wedge Q7) \& C2); \text{ and}$$
$$Q7 = Q5 \wedge Q6,$$

where "^" denotes an exclusive OR operation, and "&" denotes an AND operation.

The bits Q0, Q1, Q2, Q3, Q4, Q5, Q6, and Q7 are generated when C2 is high. When C2 is low, the FIG. 9D circuit functions as a simple shift register to shift out Q0, Q2, Q4, and Q6 through multiplexer 305, and Q1, Q3, Q5, and Q7 through multiplexer 304.

The same values of the bits Q0, Q1, Q2, Q3, Q4, Q5, Q6, and Q7 that are output from the FIG. 9D circuit would be output from the FIG. 9C circuit (assuming that the same input values were asserted to the circuits of FIGS. 9C and 9D before the high-to-low transition of the bit C2, and that the control bit C2 undergoes its high-to-low transition at the clock edge following assertion of the first odd bit IN[1] of the next block bit as an input value), but the FIG. 9C circuit requires eight clock cycles to shift them out to multiplexer 303 and the FIG. 9D circuit requires only four clock cycles to shift them out to multiplexers 304 and 305.

Also preferably, in order to improve the reliability of BCH error detection in the inventive system, the transmitter is configured to automatically insert zero bits in the input data stream (when grouping the input data stream into subpackets) so that the inserted zero bits occur at known positions among the 56 slots of each subpacket that are available for data bits. The error detection circuitry in the receiver (to be used with such transmitter) should be configured to check for zeros in the expected slots of each recovered subpacket of data, and to use the resulting information to identify errors in each recovered subpacket of data.

The third bit ("bit 2" in FIG. 9), of each four-bit word determined by the 10-bit code word transmitted on CH0 during one of the 32 pixel clock cycles of a packet transmission, is one of the bits of the packet header. The four-bit words determined by the 10-bit code words transmitted on CH1 during the 32 pixel clock cycles of a packet transmission, are the even bits of the subpackets. The four-bit words determined by the 10-bit code words transmitted on CH2 during the 32 pixel clock cycles of a packet transmission, are the odd bits of the subpackets.

More specifically, as indicated by FIG. 9, each code word sent on CH1 during the "N"th pixel clock cycle determines an even bit of each of subpackets 0, 1, 2, and 3, and each code word sent on CH2 during the "N"th pixel clock cycle determines an odd bit of each of subpackets 0, 1, 2, and 3. Each code word sent on CH0 during the "N"th pixel clock cycle determines one bit of the packet header (as well as one HSYNC bit and one VSYNC bit). Each code word sent on CH1 during the "N+1"th pixel clock cycle determines the next even bit of each of subpackets 0, 1, 2, and 3, and each code word sent on CH2 during the "N+1"th pixel clock cycle determines the next odd bit of each of subpackets 0, 1, 2, and 3. Each code word sent on CH0 during the "N+1"th pixel clock cycle determines the next bit of the packet header (as well as the next HSYNC bit and the next VSYNC bit).

The BCH parity bits for the packet header (the last 8 bits of the packet header) are calculated over the packet header's 24 data bits, and are determined by the code words transmitted over CH0 during the last 8 pixel clock cycles of the packet. The BCH parity bits for each subpacket are calculated over the subpacket's 56 data bits, and are determined by the code words transmitted over CH1 and CH2 during the last four pixel clock cycles of the packet (the parity bits for each subpacket include bits transmitted over two channels: CH1 and CH2).

Thus, in preferred embodiments, the transmitter not only transmits each packet (during a data island) such that the packet is spread over three channels of a TMDS link (CH0, CH1, and CH2), and each subpacket of a packet is spread over two channels of the link (CH1 and CH2), but the transmitter separately generates BCH parity bits for each subpacket of a packet and transmits the BCH parity bits for each subpacket such that these BCH parity bits are spread over two channels of the link (CH1 and CH2).

Preferably, the first byte of each packet header is a "Packet Type" code, and each of the second and third bytes of each packet header indicates packet-specific data. Preferably, the transmitter can generate at least four types of packets: a null packet (indicated by packet type code 0x00=0b000000001); an audio clock regeneration ("ACR") packet (indicated by packet type code 0x01=0b0000001); an audio sample packet (indicated by packet type code 0x02=0b00000000); and an InfoFrame packet (indicated by packet type code 0x80+ InfoFrame Type=0b1xxxxxxx, where the seven LSBs indicate the type of InfoFrame as defined by the EIA/CEA-861B specification).

We next describe the format and usage of each of these four types of packets in a class of preferred embodiments.

A transmitter can transmit a null packet anytime, but the receiver does not recover data from a null packet. When the receiver identifies a null packet (by identifying a 0x00 value in the first byte of a packet header), the receiver ignores (treats as "undefined") all values in the null packet after the first byte of the packet header.

An audio clock regeneration (ACR) packet contains both the CTS (Cycle Time Stamp) value and N values (described below) that are used for audio clock regeneration. The four subpackets of an ACR packet are identical. Each subpacket contains a 20-bit "N" value and a 20-bit "CTS" value. A CTS value equal to zero indicates that there is no new value of CTS.

An audio sample packet can include one, two, three, or four pairs of audio samples (each sample pair determined by a different subpacket of the packet). These can be different samples, different partial samples (e.g., 2 of 6 channels), or repeated samples. Bits in the second and third bytes of an audio sample packet's header indicate the configuration of each subpacket of the packet, indicate whether each subpacket does or does not contain a sample, and indicate whether each subpacket contains a "flatline" sample (i.e., one whose magnitude is zero). Preferably, each of the four LSBs of the second byte of the packet header indicates whether the corresponding subpacket includes an audio sample, and each of the four LSBs of the third byte of the packet header indicates whether the corresponding subpacket includes a "flatline" sample, but a "1" value (indicating a flatline sample) of any of the LSBs of the third byte is valid only if the corresponding "present" bit of the second byte (one of the four LSBs of the second byte) indicates that the subpacket contains a sample. Each subpacket of an audio sample packet can contain channel status bits and parity bits as well as bits indicative of audio samples.

Preferably, the audio data of each subpacket (of an audio sample packet) are formatted as a structure that closely resembles an IEC_60958 or IEC_61937 frame, but with a "start" bit (in the packet header) replacing the multi-bit preamble of each sub-frame of an IEC_60958 or IEC_ 61937 frame. Each subpacket of an audio sample packet can include two 28-bit words (e.g., a 28-bit word of a left stereo stream and a 28-bit word of a right stereo stream), each 28-bit word corresponding to one of the two sub-frames of an IEC_60958 frame, and including 24 bits of audio data as well as a valid bit, a parity bit, a channel status bit, and a user data bit. All fields within each subpacket of an audio sample packet preferably follow corresponding rules specified in the IEC_60958 or IEC_61937 specification.

In preferred implementations, each of the four MSBs of the third byte of the packet header of an audio sample packet is a "start" bit indicating whether the corresponding subpacket contains the first frame of a block of IEC_60958 (or IEC_61937) frames of audio samples. The transmitter sets the start bit to "1" when the corresponding subpacket contains a first "B, W" frame of a block and clears the start bit to "0" when the corresponding subpacket contains a first "M, W" frame of a block.

Preferably, the inventive system can transmit an IEC_ 60958 or IEC_61937 audio stream having sample rate of 32 kHz, 44.1 kHz or 48 kHz (which can determine a stereo or compressed surround-sound stream), and can transmit as many as four streams of IEC_60958 or IEC_61937 data (e.g., 8 stereo channels) at sample rates of up to 96 KHz, or at least one stream of IEC_60958 or IEC_61937 data at a sample rate of 192 KHz.

An InfoFrame packet can include format information and related information regarding audio and/or video data being transmitted. The EIA/CEA-861B standard defines an "Info-Packet" data structure which consists of one or more "InfoFrames" containing format information and related information regarding transmitted digital audio and/or digital video data. In preferred implementations, each InfoFrame packet transmitted by the inventive system includes the information of an ELA/CEA-861B InfoPacket, with the following restrictions: the inventive InfoFrame packet can contain only the information of a single EIA/CEA-861B InfoFrame having a maximum size of 30 bytes (including the seven LSBs of the first byte of the packet header which indicate an InfoFrame type code, the second byte of the packet header which indicates a version number field, and the third byte of the packet header which indicates an InfoFrame length field); and type code must be within the range of 0 to 127 (since it is indicated by the seven LSBs of the first byte of the packet header). Examples of InfoFrame type codes are 0x02 (indicating that the InfoFrame packet includes the data of an Auxiliary Video information ("AVI") InfoFrame), 0x03 (indicating that the InfoFrame packet includes the data of an Audio InfoFrame), and 0x04 (indicating that the InfoFrame packet includes the data of a DVD control InfoFrame). Preferably, the InfoFrame length field indicates InfoFrame packet's length in bytes as per the EIA/CEA-861B standard, including the three bytes of the packet header and any valid bytes in the packet including the checksum (so that the maximum value of the length is "31").

An auxiliary video information ("AVI") InfoFrame packet indicates various aspects of the current video stream being transmitted (or to be transmitted) to the receiver, such as whether the video data are in RGB, YCbCr 4:2:2, YCbCr 4:4:4 format, whether the video data are overscanned or underscanned, the picture aspect ratio (and whether the picture has been horizontally or vertically scaled), the video component bit depth, the number of pixels per line and lines per frame, and the number of pixel repetitions (i.e., each pixel is not repeated, or is sent N times, where N is an integer greater than one). An Audio InfoFrame packet indicates various aspects of the audio data being transmitted (or to be transmitted), such as the number of streams of audio data, the sampling frequency for each stream, and the sample size (number of bits).

Preferably, the inventive system can employ video pixel replication as needed to provide adequate audio bandwidth. For example, when a frame of video consists of L lines (whose pixels are transmitted in non-repeated fashion at a first pixel clock frequency), and 2L data islands (each inserted in a blanking interval following a line of video) would be needed to transmit the audio bits that correspond to one frame of the video, the system is preferably operable in a mode in which transmission of each pixel is repeated. If the pixel clock frequency is not changed, repeated transmission of each pixel effectively halves the video transmission rate (since two lines of repeated pixels are needed to transmit all the pixels of each non-repeated line) but allows the audio bits for a full frame of the video non-repeated video to be transmitted in 2L data islands, each following one of the 2L active video periods in which pixels of the frame are transmitted repeatedly. Typically, the pixel clock frequency is increased (relative to the pixel clock frequency employed for non-repeated pixel transmission) during each mode in which pixels are transmitted repeatedly. For example, in a mode in which the pixel clock frequency is doubled and transmission of each pixel is repeated once, audio data can be transmitted at a doubled data rate (with time stamps based on the doubled pixel clock) between active video periods but the effective video pixel transmission rate is not changed. In some repeated pixel transmission modes, transmission of each pixel is repeated more than once (e.g., each is transmitted three times, using a frequency-tripled version of the pixel clock). When receiving video data transmitted in any repeated pixel transmission mode, the receiver drops all but one sample of each set of identical video samples received during each active video period (e.g., it drops all odd video samples, or all even video samples where each pixel is transmitted twice) but the receiver processes all samples of packetized data received during data islands between the active video periods.

The transmitter's use of pixel-repetition is preferably indicated by a Pixel_Repetition_Count field in a transmitted AVI InfoFrame packet. Such a field indicates to the receiver how many repetitions of each unique pixel are transmitted. In non-repeated pixel transmission modes, the value of the field is zero. In modes with pixel repetition, the value of the field indicates the number of pixels (of each set of consecutively received pixels) that should be discarded by the receiver. Preferably, the video samples transmitted during the first pixel clock cycle of each line are unique (and are not discarded) but each repetition of these samples is dropped in modes with pixel repetition.

Figure 10:
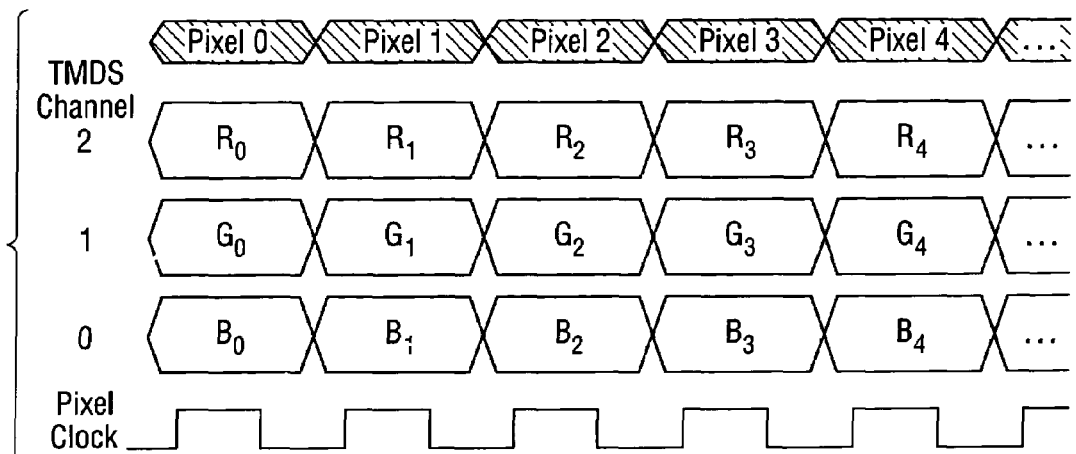
FIG. 10 is a timing diagram showing the format in which RGB video data are transmitted over a TMDS link in some embodiments of the invention.

In preferred embodiments, the inventive system is configured to transmit video data in any of several different formats over a TMDS link, and the receiver is configured to recover the data in any of such formats. Preferably, the system can transmit video over the CH0, CH1, and CH2 channels of such a link in any of YCbCr 4:4:4 format, YCbCr 4:2:2, or RGB format, with or without pixel repetition. In all cases, up to 24 bits can be transmitted over these channels per pixel clock cycle. As shown in FIG. 10, during transmission of RGB video, an 8-bit red color component can be transmitted over channel CH2, an 8-bit green color component can be transmitted over channel CH1, and an 8-bit blue color component can be transmitted over channel CH0, during each pixel clock cycle. The R,G, and B components of the first pixel of each line are transferred during the first pixel clock cycle after a video guard band (e.g., after the second of two consecutively transmitted video guard band codes).

Figure 11:
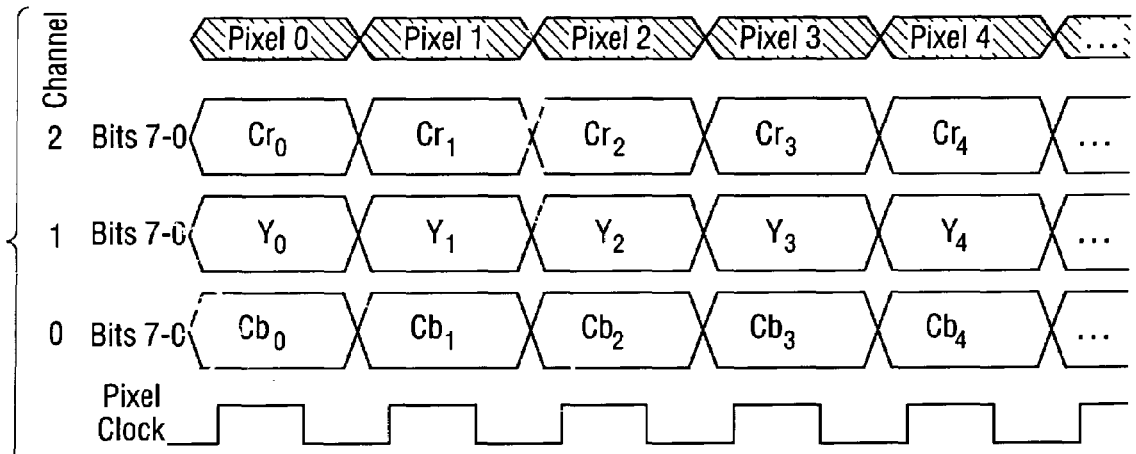
FIG. 11 is a timing diagram showing the format in which YCbCr 4:4:4 video data are transmitted over a TMDS link in some embodiments of the invention.

As shown in FIG. 11, during transmission of YCbCr 4:4:4 video, an 8-bit "Cr" sample can be transmitted over channel CH2, an 8-bit luminance ("Y") sample transmitted over channel CH1, and an 8-bit "Cb" sample transmitted over channel CH0 during each pixel clock cycle.

Figure 12:
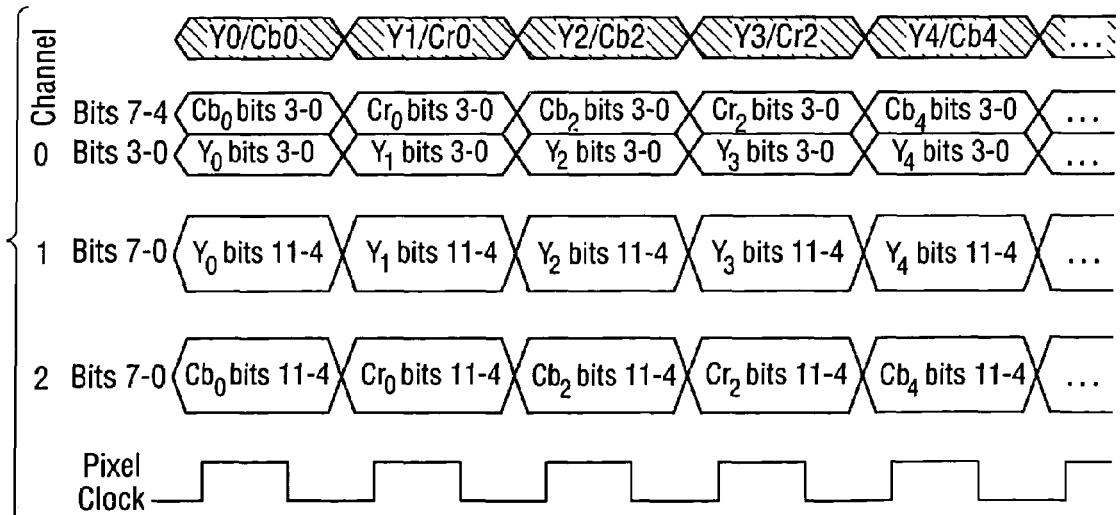
FIG. 12 is a timing diagram showing the format in which YCbCr 4:2:2 video data are transmitted over a TMDS link in some embodiments of the invention.

Because 4:2:2 data only requires transmission of two components (Y and Cr, or Y and Cb) per pixel clock cycle, more bits are allocated per component. The available 24 bits are split into 12 bits for the Y component and 12 bits for the C components. As shown in FIG. 12, during the Nth pixel clock cycle of transmission of YCbCr 4:2:2 video, a 12-bit luminance ("Y") sample can be transmitted over channels CH0 and CH1 and a 12-bit Cb sample can be transmitted over channels CH0 and CH2. The four least significant bits of the Y sample and the four least significant bits of the Cb sample are determined by the TMDS code word transmitted over CH0. Then, during the next ("N+1"th) pixel clock cycle, the next 12-bit Y sample can be transmitted over channels CH0 and CH1, and a 12-bit Cr sample can be transmitted over channels CH0 and CH2. The four least significant bits of this Y sample and the four least significant bits of the Cr sample are determined by the TMDS code word transmitted over CH0. The bits of the Cb sample transmitted during the Nth clock cycle are for the pixel that includes the Y sample transmitted during the same clock cycle. The bits of the Cr sample transmitted during the "N+1"th clock cycle are for the pixel that includes the Y sample transmitted during the same ("N+1"th) clock cycle. If each Y, Cr, and Cb sample consists of fewer than 12 bits, the valid bits should be left-justified (the most significant valid bits should be aligned) and zeroes should pad the bits below the least significant bit.

During video transmission modes with pixel-doubling, all of the data sent during the Nth pixel clock cycle are sent again during the next ("N+1"th) pixel clock cycle, the next set of data are sent during the next ("N+2"th) pixel clock cycle, and so on.

In preferred embodiments, the inventive transmitter includes a processor (e.g., microcontroller 15 of FIG. 2) programmed to support HDCP encryption of data and to communicate with the receiver (e.g., over the DDC channel of a TMDS link) to initiate an HDCP authentication exchange with the receiver and to query registers in the receiver as appropriate in connection with implementation of HDCP content protection. The processor is preferably programmed with system software for setting up the transmitter (e.g., via interface 101 of FIG. 13) and the receiver (e.g., via the DDC channel) for HDCP encryption during Data Island Mode operation (explained below). Specifically, the system software causes the transmitter to enter the Data Island Mode and to trigger the receiver's entry into the Data Island Mode by sending a packet to the receiver (as explained below), and then (via the DDC interface) to query the appropriate registers in the receiver to verify that the receiver has indeed transitioned to Data Island mode. When both the receiver and transmitter are in the Data Island mode, the processor in the transmitter executes HDCP authentication software and (upon successful completion of an authentication exchange) causes the transmitter to encrypt data to be transmitted during active video periods and data islands.

In preferred implementations of the Data Island mode, all video data transmitted over channels CH0, CH1, and CH2 of a TMDS link during active video periods are HDCP encrypted (except that video guard band words are not encrypted), and during each data island, only the code words transmitted over channels CH1 and CH2 are HDCP encrypted (but neither leading data island guard band words nor trailing data island guard band words are encrypted).

In the DVI mode (with HDCP encryption enabled), a high value of DE indicates that video data are being transmitted (or optionally, that auxiliary data are being transferred between active video periods), and all data transferred while DE is high are encrypted. In addition, HDCP rekeying is triggered by each high-to-low transition of DE. No actual "DE" signal is transmitted; rather transmission of transition-maximized code words indicates that DE is low and transmission of transition-minimized code words indicates that DE is high.

In preferred implementations of the Data Island mode, instead of a single DE value indicating that transmitted data are being encrypted, two binary encryption mode values effectively determine whether data are being encrypted. Effectively, a high value of a first encryption mode signal (M1) indicates that video data pixels are being encrypted, and a high value of a second encryption mode signal (M2) indicates that auxiliary data (transmitted during a data island) are being encrypted. Neither of the values of M1 and M2, nor the value of M1 logically "Ored" together with M2, corresponds to the DE value employed in the DVI mode. M1 is high only when transition-minimized code words indicative of video data (but not video guard bands) are transmitted over channels CH0, CH1, and CH2 of a TMDS link. M2 is high only when transition-minimized code words (but not leading data island guard band words or trailing data island guard band words) are transmitted over channels CH1 and CH2 during data islands. Thus, during transmission of a video guard band, DE is high but neither M1 nor M2 is high.

To encrypt 24-bit video pixels (when M1 is high), the HDCP cipher engine in the transmitter performs a bitwise XOR operation thereon using a stream of 24-bit pseudo-random values that are generated in a well known manner (as described above). To encrypt the 8 bits of audio data (when M2 is high) to be transmitted per pixel clock cycle in data islands in preferred embodiments of the invention (recalling that 4 bits of such audio data are to be encoded using a 10-bit TMDS golden word for transmission over CH1, and the other 4 bits of such audio data are to be encoded using a 10-bit TMDS golden word for transmission over CH2), the HDCP cipher engine in the transmitter performs a bitwise XOR operation on the eight audio data bits using a selected 8-bit subset of the bits of each 24-bit pseudo-random value of the conventionally generated pseudo-random value stream.

In preferred implementations of the Data Island mode, HDCP rekeying is performed in response to each high-to-low transition of M1 (i.e., at the end of each active video period). Preferably, the rekeying must be complete within Y pixel clock cycles (e.g., within 58 pixel clock cycles of the high-to-low transition of M1), and the transmitter is configured to place each data island only in time slots between active video periods in which its HDCP encryption circuitry has completed rekeying and is ready to encrypt the packetized data to be transmitted in the data island.

In preferred implementations of the Data Island mode, the inventive transmitter sends an HDCP encryption indicator (a specific set of values of all four control bits CTL0, CTL1, CTL2, and CTL3, preferably CTL3=1, CTL2=0, CTL1=0, and CTL0=1) to the receiver to indicate that the receiver's HDCP cipher engine should initiate a frame key calculation, and the receiver is configured to respond to such an HDCP encryption indicator by performing the frame key calculation. Preferably, the HDCP encryption indicator is indicated by two transition-maximized TMDS control words (indicative of the predetermined values of control bits CTL0, CTL1, CTL2, and CTL3) that are transmitted over channels CH1 and CH2 of a TMDS link during a blanking interval (other than during a data island or active video period), and preferably during a vertical blanking interval. In the second and third rows from the bottom of FIG. 3, such code words indicative of an HDCP encryption indicator are shown.

Use of such an HDCP encryption indicator (sometimes referred to herein as "key control" data or "decryption control" data) increases the reliability with which the receiver determines when to perform the frame key calculation (after successful completion of an HDCP authentication exchange by the transmitter and receiver). Since the encryption indicator depends on all four control bits (rather than just control bit CTL3), reliability is improved and future expandability is enabled.

Preferably, the receiver is configured to detect the HDCP encryption indicator only if code words indicative of the predetermined values of bits CTL0, CTL1, CTL2, and CTL3 (e.g., CTL3=1, CTL2=0, CTL1=0, and CTL0=1) are detected during each of a predetermined minimum number of consecutive pixel clock cycles (preferably 16 consecutive pixel clock cycles) during a window of opportunity ("WOO") having predetermined duration (preferably 72 pixel clock cycles) following an active edge of VSYNC (i.e., following detection of a code word indicative of a rising edge of VSYNC). Such constraints on the HDCP encryption indicator are added to improve the reliability with which the receiver detects the indicator when the indicator is transmitted by the transmitter and expected by the receiver.

As noted, in the preamble that precedes a data island or active video period, control characters (CTL0, CTL1, CTL2, and CTL3 set to specific values) preferably identify whether the upcoming DE-high period is a data island or active video period. Preferably, the first two code words (transmitted during the first two pixel clock cycles) of every data island and active video period are guard band codes designed to create a very robust DE rising edge. The transmitter should be configured never to encrypt guard band code words, and the receiver should be configured never to decrypt guard band code words.

In preferred embodiments, the transmitter and receiver of the inventive system are coupled by at least one TMDS link, and are operable in a digital visual interface ("DVI") mode or a "Data Island" mode. In the DVI mode, the receiver expects conventional transition maximized (out-of-band) code words indicative of HSYNC, VSYNC on TMDS channel CH0 from the transmitter, distinguishes blanking intervals from active video periods (and optionally also from bursts of auxiliary data in blanking intervals) by recognizing whether the incoming code words on channels CH0, CH1, and CH2 are out-of-band code words (in blanking intervals) or in-band code words (in active video periods and bursts of auxiliary data), and monitors the incoming data for an indication that it should enter the Data Island mode. In the Data Island mode, the receiver expects packets of audio data (or other auxiliary data) in data islands between active video periods, expects transition-minimized code words indicative of HSYNC, VSYNC, and packet header bits on channel CH0 during data islands, and identifies active video periods by detecting leading video guard bands. Preferably, the transmitter and receiver undergo synchronized (and nearly simultaneous) transitions from the DVI mode to the Data Island mode.

Preferably, each DVI-to-Data Island mode transition occurs when the transmitter enters the Data Island mode and sends a data island which is detected by the receiver. The data island is indicated by a preamble (sent over both CH1 and CH2, preferably by code words indicative of CTL3, CTL2=01 on CH2 and code words indicative of CTL1, CTL0=01 on CH1) indicating that a data island is to follow, and at least one distinctive guard band code (preferably two consecutive identical guard band codes, each having the value 0x55, on each of CH1 and CH2) following the preamble. In response to detecting a data island (e.g., by detecting the data island preamble, and then (in the first pixel clock cycle after the data island preamble) detecting the guard band word 0x55, and then (in the second pixel clock cycle after the data island preamble) detecting the guard band word 0x55) the receiver enters the Data Island mode. Preferably, upon entering the Data Island mode the receiver sets a bit (indicative of Data Island mode operation) in a register that is readable by the transmitter. For example, the receiver sets the bit in a register in the HDCP register space (e.g., registers 203 of FIG. 14) that is readable by the transmitter via the DDC channel. Preferably, this bit can be cleared only upon hardware reset of the receiver.

In the Data Island mode, circuitry in the receiver monitors the incoming data for each preamble/guard band combination indicative of an active video period, and each preamble/guard band combination indicative of a data island.

In preferred embodiments, the transmitter can determine the receiver mode status (i.e., whether the receiver is in the DVI or Data Island mode, and what type of HDCP decryption the receiver can perform) via the DDC channel. If the transmitter reads register bits (via the DDC channel) indicating that the receiver is in the Data Island mode and supports a particular type of HDCP, the transmitter will operate in the Data Island mode (including by sending VSYNC/HSYNC during data islands as bits determined by transition-minimized TMDS code words rather than by transition-maximized code words, and inserting video guard band codes in the video stream) and will employ the appropriate HDCP state machine to encrypt data to be transmitted (but will not encrypt any video guard band).

In the Data Island mode, the transmitter preferably uses the DDC channel to determine the capabilities and characteristics of the receiver by reading (e.g., from ROM 23 of FIG. 2) an EDID data structure (preferably including the EIA/CEA-861B-defined extensions to EDID). In addition, the transmitter can use the DDC channel to determine its own physical device address, for use in various cluster-wide control operations. The transmitter preferably determines what type of encryption to use in response to determining the decryption capabilities (if any) of the receiver, and informs the receiver of the encryption mode chosen.

In preferred embodiments, the following steps must be taken by the transmitter to initiate Data Island mode operation with HDCP encryption of transmitted data:

1. the transmitter's state is reset to an initial state;
2. the transmitter reads the EDID data of the receiver (e.g., EDID data stored in ROM 23 of FIG. 2 over the DDC channel) to determine whether the receiver is capable of Data Island mode operation;
3. if the receiver is capable of Data Island mode operation, the transmitter writes (in the transmitter's configuration register) a distinctive mode bit (e.g., Data Island Mode=1);
4. the transmitter sends a data island packet to the receiver (e.g., a Null packet);
5. the transmitter reads a distinctive mode bit in a register of the receiver (e.g., a Data Island Mode bit in a predetermined location in registers 203 of FIG. 14) via the DDC channel;
6. if the receiver's distinctive mode bit is set (e.g., if Data Island Mode bit=1), the transmitter and receiver proceed to step 7. Otherwise, they proceed to Step 4;
7. at this point, both the transmitter and receiver operate in the Data Island Mode, and the transmitter initiates an HDCP authentication procedure; and
8. after step 7, when the HDCP authentication is complete, the transmitter sets a bit (e.g., a bit "HDCP Authenticated") in the transmitter's configuration register, in response to which all the transmitter's HDCP engines are enabled.

Preferably during startup, the receiver disables its video and audio outputs, because there will be times during startup when the transmitter is in the Data Island mode, but the receiver is still in the DVI mode, which could cause undesirable video output from the receiver.

Figure 13:
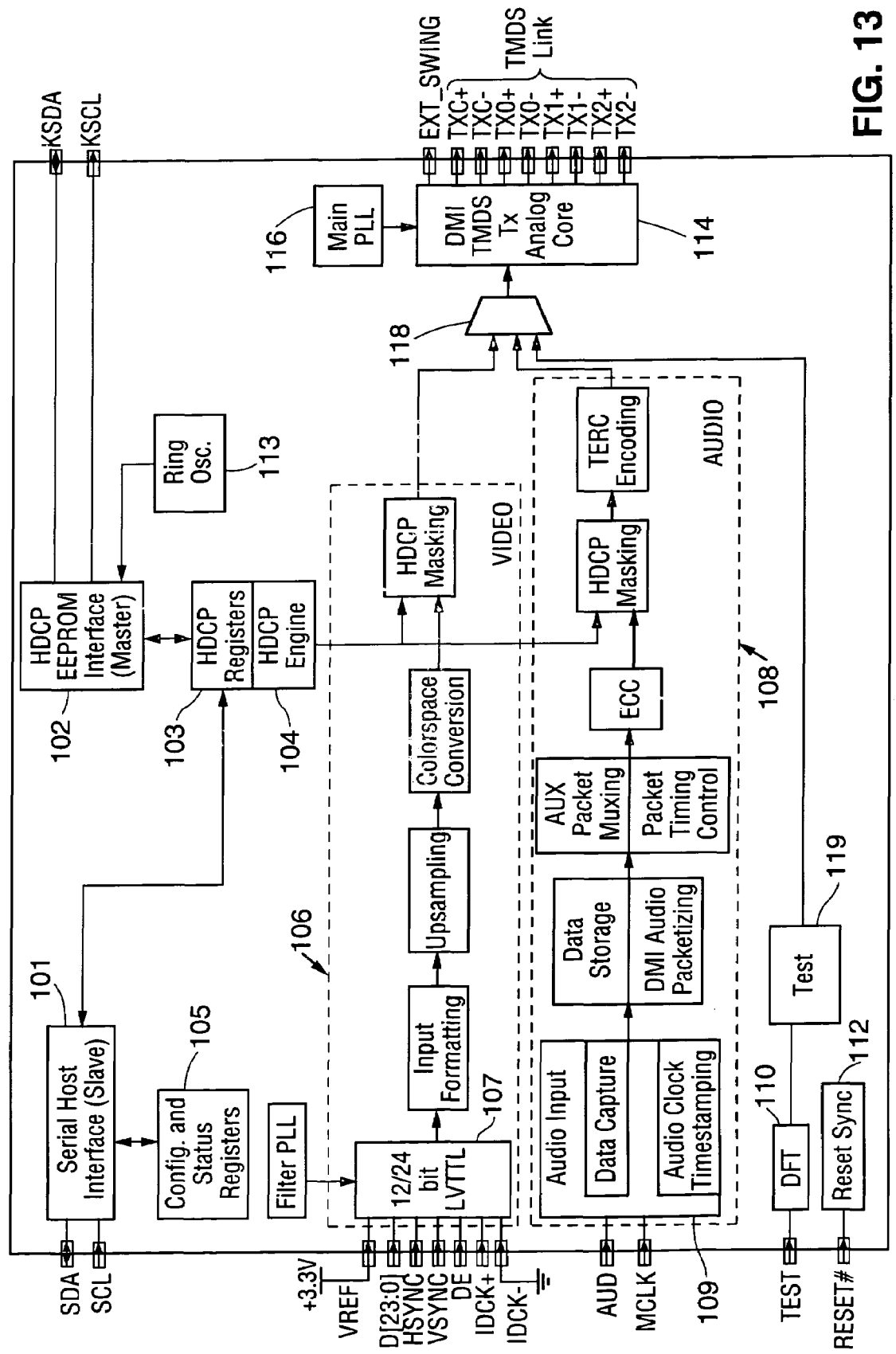
FIG. 13 is a block diagram of a preferred embodiment of the inventive transmitter.

FIG. 13 is a block diagram of transmitter 100 which is an embodiment of the inventive transmitter. Transmitter 100 includes video subsystem 106 which performs pipelined encryption and other pipelined processing (e.g., reformatting, upsampling, and/or color space conversion) on video data D[23:0] received from an external source. Typically, a video data clock (IDCK, referred to herein as a "pixel clock"), a video data enable signal (DE) and horizontal and vertical sync control signals (HSYNC and VSYNC) are received with the input video data from the external source. Transmitter 100 is typically configured to operate in response to a pixel clock having frequency in the range from 25 MHz to 112 MHz. Subsystem 106 encrypts the input video data (or a reformatted or otherwise processed version of the input video) using pseudo-random values from cipher engine 104 and asserts the encrypted video to a first input of multiplexer 118. During operation, cipher engine 104 uses bits in registers 103. Registers 103 can be loaded with values received via interface 101 and/or interface 102.

Typically, interface 101 is coupled for I2C communication with a microcontroller (e.g., microcontroller 15 of FIG. 2). The microcontroller is also coupled to the DDC channel of a TMDS link, and to an input data source (e.g., a video source). Interface 101 can implement an I2C slave protocol to receive information and configuration bits (e.g., InfoFrame bits) and other bits (e.g., key values received during an HDCP authentication procedure), and load such bits into registers 105 and 103.

Where transmitter 100 is implemented as an integrated circuit, an EEPROM preloaded with key values and identification bits (to be used for decryption) can be implemented as a separate chip in a secure multi-chip module ("MCM") that includes both transmitter 100 and the EEPROM. An example of such an EEPROM is EEPROM 14 of FIG. 2. Interface 102 provides the interface between transmitter 100 and the EEPROM. Interface 102 can retrieve values from the EEPROM at appropriate times, such as during an HDCP authentication exchange with a receiver. Interface 102 preferably uses the output of ring oscillator 113 (typically having frequency 64 MHz, or frequency in the range 51.2 MHz to 76.8 MHz) to generate a clock (e.g., a 100 KHz clock) for use for I2C communication with the EEPROM.

Transmitter 100 also includes audio subsystem 108 which performs pipelined formatting, packetizing, encryption, and other pipelined processing on audio data AUD received from an external source (although AUD can be auxiliary data other than audio data, we will refer to it as audio data for simplicity). In typical implementations, transmitter 100 can accept audio data AUD in S/PDIF format with sample rate Fs in the range from 32 kHz to 48 kHz, or in any of a number of other formats (e.g., 2-channel uncompressed PCM data or a compressed bitstream indicative of multi-channel data). An audio reference clock ("MCLK") is received with the input data AUD. The clock MCLK (also referred to as a master clock) has a frequency of at least 256*Fs (or 384*Fs) in preferred embodiments.

Main phase lock loop ("PLL") 116 generates a stabilized version of the pixel clock IDCK.

Reset circuitry 112 is coupled to a reset pin for receiving a reset bit from an external processor. Transmitter 100 is configured to reset itself to an initial state in response to a predetermined value of the reset bit. Test circuitry 110 is coupled to a test pin for receiving a test mode bit from an external source. Transmitter 100 is configured to operate in either a test mode or a normal operating mode depending on the value of the test mode bit.

Subsystem 108 can sample the audio data using the stabilized pixel clock (provided that the pixel clock frequency is greater than 2*128Fs), the clock MCLK, or a frequency-multiplied version of MCLK). Subsystem 108 generates packets that contain the sampled audio data, encrypts the data in the packets, and encodes the encrypted data using TERC2 or TERC4 encoding, and asserts the packets containing encoded, encrypted data to a second input of multiplexer 118. When performing TERC4 encoding, subsystem 108 encodes the four least-significant bits of each encrypted sample as one of sixteen "golden words" (e.g., the 8-bit words "AD0–AD15" in the left column of FIG. 4) and the four most significant bits of each encrypted sample as another golden word.

Subsystem 108 also determines the timing (relative to DE) with which data islands (each data island including one or more of the packets) are asserted to multiplexer 118. Subsystem 108 also time-division-multiplexes control words with the data islands, including control words indicative of: a data island preamble (e.g. subsystem 108 inserts eight pixel clock cycles of auxiliary data preamble words immediately before each data island), HSYNC and VSYNC (e.g., subsystem 108 inserts at least twelve pixel clock cycles of synchronization words before each burst of auxiliary data preamble words), leading and trailing data island guard bands (e.g., subsystem 108 inserts two pixel clock cycles of leading guard band words as the first two words of each data island and two pixel clock cycles of trailing guard band words as the last two words of each data island), a video preamble (e.g. subsystem 108 inserts video preamble words after each data island), and video guard bands (e.g., subsystem 108 inserts two pixel clock cycles of video guard band words after each video preamble).

In response to a control signal indicative of DE (the DE signal received at interface 107), multiplexer 118 passes either video data from subsystem 106 (when DE is high) or the output of subsystem 108 (when DE is low) to TMDS core processor 114.

Core processor 114 operates in response to the stabilized pixel clock (generated by PLL 116) and performs the above-described operations of encoding 8-bit data words as 10-bit TMDS code words, serializing the data, and transmitting the serialized encoded data (and the stabilized pixel clock) over a TMDS link to receiver 200 of FIG. 14 (an embodiment of the inventive receiver).

As shown in FIG. 14, receiver 200 includes core processor 214 which in operation is coupled to the TMDS link. Processor 214 recovers the pixel clock from the link's clock channel, and main PLL 216 generates a stabilized pixel clock in response to the recovered pixel clock. In response to the stabilized recovered pixel clock, processor 214 performs the above-described operations of de-serializing the data received over the link, decoding the de-serialized 10-bit TMDS code words to recover 8-bit code words, and asserting the 8-bit code words to splitting unit 218.

Unit 218 also receives a signal indicative of DE, and the stabilized recovered pixel clock, from processor 214. Unit 218 detects the beginning and end of each data island and each active video period in the code word stream from processor 214 (including by identifying guard bands and preamble code words of the above-mentioned types), routes each audio data packet (of each data island) to pipelined audio subsystem 208, and routes the remaining data (including all bursts of video data) to pipelined video subsystem 206. In some operating modes, the data asserted by unit 218 to subsystem 206 includes HSYNC and VSYNC code words.

Video subsystem 206 performs decryption and other processing (e.g., reformatting, upsampling or subsampling, and/or color space conversion) on the video data received from unit 218. Subsystem 206 decrypts the video data from unit 218 (to generate 8-bit decrypted words) using pseudo-random values from cipher engine 204 and asserts the decrypted video to the pipelined circuitry for performing other processing (e.g., reformatting, subsampling, and color space conversion) thereon. The latter circuitry outputs the decrypted, processed video bits Q[23:0], typically after final reformatting, and with corresponding DE, HSYNC, and VSYNC signals and a pixel clock. Optionally, subsystem 206 also includes a digital-to-analog converter that generates and outputs analog video signals (AnRPr, AnGY, and AnBPb), which can be red, green, and blue color component signals or luminance and chrominance signals, in response to 8-bit decrypted and processed video words. During operation, cipher engine 204 uses bits in registers 203. Registers 203 can be loaded with values received via interface 201 and/or interface 202.

Where receiver 200 is implemented as an integrated circuit, an EEPROM preloaded with key values and identification bits (to be used for decryption) can be implemented as a separate chip in a secure multi-chip module ("MCM") that includes both receiver 200 and the EEPROM. An example of such an EEPROM is EEPROM 24 of FIG. 2. Interface 202 provides the interface between receiver 200 and the EEPROM. Interface 202 can retrieve values from the EEPROM at appropriate times, such as during an HDCP authentication exchange with the transmitter. Interface 202 preferably uses the output of ring oscillator 213 (typically having frequency 64 MHz, or frequency in the range 51.2 MHz to 76.8 MHz) to generate a clock for use for I2C communication with the EEPROM.

Interface 201 can be coupled to the DDC channel of the TMDS link, and can implement an I2C slave protocol to communicate with the transmitter over the DDC channel (for example, to perform HDCP authentication including by loading key values received from the transmitter over the DDC channel into registers 203.

Optionally, when receiver 200 is a repeater (configured to operate as a transmitter that sends data to another receiver, in addition to being configured to receive data from transmitter 100), receiver 200 includes interface 207. Interface 207 can be coupled to a host device and can implement an I2C slave protocol to receive information and configuration bits and load such bits into registers 205 and 203. When appropriate (i.e., in response to predetermined status, information, or error conditions), interrupts ("INT") are asserted from registers 205 to a host device to request software attention.

Receiver 200 also includes pipelined audio subsystem 208 which receives and processes packets of audio data from unit 218. Subsystem 208 decodes the golden words in the packets to determine the 8-bit word indicated by each pair of golden words" (when the transmitter employed TERC4 encoding to encode the audio data), or the 4-bit word indicated by each pair of golden words (when the transmitter employed TERC2 encoding to encode the audio data). Subsystem 208 also decrypts the decoded audio samples (using pseudo-random bits from cipher engine 204), performs error correction on the decrypted, decoded samples, unpacks the error-corrected, decrypted, decoded samples from the packets (and routes configuration and status bits that are unpacked from the packets to appropriate registers), and performs other processing on the unpacked audio samples (for example, by organizing the audio data for S/PDIF and I$^2$S output engines and then processing the organized data in one or both of such engines to generate output data in one or both of S/PDIF or I$^2$S format). Typically, subsystem 208 can output audio data in any of a number of different formats (e.g., as 2-channel uncompressed PCM data or as a compressed bitstream indicative of multi-channel data). In different operating modes, subsystem 208 asserts (with the output audio data) one or more of a bit clock ("SCK") whose frequency is the audio bit rate, an audio reference clock ("MCLK") which is a recovered version of the MCLK clock employed by transmitter 100, a serial data output clock (SDO) for use in demultiplexing a time-division multiplexed output audio data stream indicative of two audio channels, and a word select clock ("WS").

Main PLL 216 generates a stabilized version of the pixel clock recovered from the clock channel of the TMDS link, for use by interface 214 and other elements of receiver 200.

Reset circuitry 212 is coupled to a reset pin for receiving a reset bit from an external processor. Receiver 200 is configured to reset itself to an initial state in response to a predetermined value of the reset bit. Test circuitry 210 is coupled to a test pin for receiving a test mode bit from an external source. Receiver 200 is configured to operate in either a test mode or a normal operating mode depending on the value of the test mode bit.

Typically, each transmitter and receiver for use in an embodiment of the inventive system is manufactured to meet a detailed specification. Preferably, each transmitter and receiver is manufactured in such a manner that it can be tested efficiently for compliance with the specification.

For example, in a class of preferred embodiments, the inventive transmitter includes a test pattern generator (e.g., test pattern generator 119 of transmitter 100 of FIG. 13) and the inventive receiver includes an identical test pattern generator (e.g., in test circuitry 210 of receiver 200 of FIG. 14). The test pattern generator in the receiver is preferably controllable by the transmitter in a test mode, or the test pattern generators in the transmitter and receiver are separately controllable (e.g., by a host device), to allow determination of error rates on the serial link between the transmitter and receiver. For example, in a test mode, transmitter 100's test pattern generator 119 asserts test data via multiplexer 118 to core processor 114, and processor 114 encodes the test data and transmits the encoded test data to receiver 200 over a TMDS link. In the test mode, receiver 200 receives and decodes the data and asserts the recovered data to test circuitry 210. Error detection and accumulation logic in test circuitry 210 compares the recovered data with the test data produced by the test pattern generator in circuitry 210. The test results, including the measured error rate of the recovered test data, can be sent back to transmitter 100 over the DDC channel of the link (e.g., via interface 201) and/or asserted to a host device (e.g., via interface 207). Preferably, the test pattern generator in the transmitter (e.g., pattern generator 119) and the identical pattern generator in the receiver includes a linear feedback shift register (LFSR) that generates a pseudo-random test pattern, and both pattern generators start from the same initial state (during test mode operation) so that they generate the same pseudo-random test pattern during test mode operation.

Use of the DDC channel as a back-channel during this test mode (or other test mode operations) allows the transmitter (e.g., microcontroller 15 of FIG. 2) to query the status of the receiver's test pattern generator and error detection and accumulation logic. The transmitter preferably also can control test mode operation of the receiver via the DDC channel or another channel. Use of the DDC channel (or another channel of a serial link) as an error-detection back-channel during test mode operation allows the transmitter (e.g., microcontroller 15 of FIG. 2) to change one or more parameters of the transmitter, and to determine the error rate (at the receiver) that results from each set of transmitter parameters. Thus, the transmitter can determine the reliability of the link as a function of various sets of operating parameters, and the transmitter can optimize its operating parameters to reduce or minimize the error rate at the receiver.

Preferably, each of the inventive receiver and the inventive transmitter is implemented to support a robust set of test features, enabled through the assertion of a test pin (the pin to which test circuit 110 is coupled in FIG. 13, or to which test circuit 210 is coupled in FIG. 14). Individual test modes can be selected through input-capable pins that are redesignated as test modifier pins during test mode operation, or through register bits. Alternatively, test mode enabling is accomplished by loading bits into registers (e.g., registers 205 of receiver 200 of FIG. 14, or registers 105 of transmitter 100 of FIG. 13), for example via an I2C interface (such as interface 207 of FIG. 14 or interface 101 of FIG. 13). While test mode enabling via the loading of register bits requires a larger set of vectors to enable a test mode, it can allow the transmitter or receiver to be designed with fewer input pins. An 8-bit test mode register would allow 64 different test modes.

Preferably, the test modes include a logic test (e.g., a full scan), EEPROM test (e.g., a checksum BIST, or built-in-self-test), a TMDS Core test (e.g., in which core 114 or 214 is isolated and then tested), a DAC test (e.g., in which the receiver DAC circuitry is isolated and then tested using test patterns), a PLL test, a ring oscillator test, and one or more debug tests (e.g., in which internal signals are multiplexed to input/output pins).

Typically a full scan logic test would require dedicated input and output pins, which are configured as test pins during logic test mode operation. Typically, a checksum-based BIST method is implemented to test an external key EEPROM (e.g., EEPROM 14 or EEPROM 24 of FIG. 2). Upon being enabled, test circuitry would read the contents of the EEPROM, perform a checksum calculation, and then compare with a checksum read from the EEPROM. Preferably, only a simple Pass/Fail indicator is asserted by the test circuitry, to maintain security.

In a typical TMDS Core test of the inventive receiver, the digital outputs of core 214 (of FIG. 14) are multiplexed directly to the outputs of circuitry 206 or 208. Preferably, the regenerated pixel clock can also be multiplexed to an output pin to allow eye diagram testing. In a typical DAC test of the inventive receiver, an input clock pin provides a test clock directly to the DAC (e.g., in circuitry 206 or 208) to be tested, so that an external device can directly control clocking of the DAC. Then, via counters and state machines, specific test patterns are applied to the DAC to provide well-controlled tests. In a typical PLL test, a LOCK indicator (from each PLL to be tested) is multiplexed to an output pin. In a typical ring oscillator test, the clock signal of the ring oscillator to be tested (e.g., ring oscillator 113 or 213) is multiplexed to an output pin.

As described, in a class of embodiments, the inventive receiver responds to control signals (including preamble code words) that are transmitted over a serial link (by the transmitter) during control data periods (i.e., other than during data islands and active video periods). Each such control signal is determined by a bit pattern (e.g., a 10-bit TMDS code word indicative of bits CTL0 and CTL1, or bits CTL2 and CTL3). In preferred embodiments, the receiver is configured to respond to a control signal only upon detecting a minimum number of repetitions of the bit pattern, or upon detecting the bit pattern (or a minimum number of repetitions thereof) in a predetermined region (time window) of the control data period. Typically, the receiver is configured to determine whether, within the past X pixel clock cycles, at least Y received bit patterns have matched a predetermined pattern Z. If so, the receiver responds to the control signal determined by the pattern Z. For example, the receiver preferably recognizes a video preamble only by determining that, within the past 8 pixel clock cycles, at least 8 received bit patterns on channel CH1 have matched the pattern of a 10-bit transition-maximized TMDS code word indicative of control bit values CTL0,CTL1=1,0, and at least 8 received bit patterns on channel CH2 have matched the pattern of a 10-bit transition-maximized TMDS code word indicative of control bit values CTL2,CTL3=0,0. For another example, the receiver preferably recognizes a data island preamble only by determining that, within the past 8 pixel clock cycles, at least 8 received bit patterns on channel CH1 have matched the pattern of a 10-bit transition-maximized TMDS code word indicative of control bit values CTL0,CTL1=1,0, and at least 8 received bit patterns on channel CH2 have matched the pattern of a 10-bit transition-maximized TMDS code word indicative of control bit values CTL2,CTL3=1,0

In preferred embodiments, the inventive receiver implements equalization by filtering the incoming signals on channels CH0, CH1, and CH2 of a TMDS link in a manner designed to compensate for the degradation that the signals suffer during propagation (typically over a long cable) from the transmitter to the receiver. For example, a preferred implementation of core processor 214 of receiver 200 of FIG. 14 includes such a filter. To design the equalization filter, the filtering effects of the cable are analyzed to determine what "cable filter" is effectively applied to the signals by the cable over which they propagate, and an inverted version of the cable filter is chosen as the equalization filter. Thus, the equalization filter compensates for (and preferably cancels) the cable filter.

Some preferred embodiments of the inventive system not only employ an equalization filter in a receiver during recovery of transmitted auxiliary and video data, but they use only "golden words" (the above-described subsets of full sets of code words) to encode the auxiliary data for transmission, Both techniques are effective to reduce error rates in the recovered data.

In preferred embodiments, the inventive receiver includes error correction circuitry (e.g., circuitry 22 of receiver 200 of FIG. 14), for correcting detected errors in at least the audio data (or other auxiliary data) transmitted during data islands and optionally also for correcting detected errors in video data transmitted during active video periods.

For example, each code word of a packet that is transmitted in a data island can be repeatedly transmitted. With triple repetition coding (in which each code word to be transmitted is transmitted three times during three consecutive clock cycles), the packetized data can be recovered reliably, e.g. using the same techniques employed conventionally in the video channels of TMDS links to identify the special out-of-band words that define the blanking intervals. Errors occurring during transmission of triple repetition encoded data can typically be corrected by implementing a "bubble correction" error correction scheme in the receiver.

Bubble correction is the removal and replacement of a suspect data value (having a single clock width) with reference to its neighboring data values. We next describe an example of bubble correction that assumes that one code word is transmitted per clock cycle, that triple repetition coding is employed (each different code word is transmitted three times), and that the receiver generates four sequences of single bits in response to each sequence of 10-bit TMDS code words (each 10-bit TMDS code word is decoded to a 4-bit word). In this example, if the receiver recognizes (in any of the four sequences of recovered single bits) that the Nth bit and the "N+2"th bits are identical are separated by a different bit (i.e., the "N+1"th bit is different than the Nth bit), error correction circuitry in the receiver replaces the center bit (the "N+1" bit) with one of the adjacent bits (i.e., the Nth bit) to accomplish bubble correction.

After bubble correction has been performed, a sampling point for each sequence of single recovered auxiliary data bits can be determined in essentially the same manner that is performed conventionally by a digital PLL of a TMDS receiver to identify blanking intervals of a TMDS-encoded stream of video data. However, the circuitry for determining the sampling point for the auxiliary data typically will not need to operate as fast as the digital PLL of a TMDS receiver during identification of blanking intervals of a TMDS-encoded video data stream. However, it is not necessary to employ a digital PLL to select optimum sampling points during recovery of the auxiliary data. Rather, the inventors have recognized that it is typically adequate simply to select the second sample (of each sequence of single recovered auxiliary data bits) after any transition (e.g., the start of a data island) and every third sample thereafter until the next transition.

In other embodiments, the inventive receiver includes error correction circuitry that employs interpolation to conceal detected errors in recovered data. Any of a variety of interpolation techniques can be implemented, including linear interpolation techniques and those which employ higher-order curve-fitting.

In preferred embodiments, the inventive transmitter determines the temporal placement and duration of each data island transmitted between two active video periods such that the data island does not collide with transmission of other signals (e.g., signals employed for re-keying cipher engines) and such that encryption protocol (e.g., HDCP) requirements are taken into account. In preferred embodiments, the transmitter does so according to the following constraints on data island format: a data island must contain at least one packet (thus its minimum duration is 36 pixel clock cycles); each island must contain an integer number of packets; and (in order to assure the reliability of data within a data island) no data island can contain more than 14 packets.

Preferably, the transmitter is configured to determine automatically, from previous lines or frames, where the active video periods and blanking periods of a sequence of video frames (to be encoded for transmission) occur, so that the transmitter will know when these periods will occur in subsequent frames and lines to be transmitted and when other events (such as HDCP re-keying events) will need to occur within the subsequent frames and lines. Such automatic detection of blanking periods allows the transmitter to decide whether to initiate a data island (which will require a minimum of 44 pixel clock cycles before the next active video period or next HDCP re-keying or other required event: 32 clock cycles for the packet plus 4 clock cycles for data island guard band words plus 8 pixel clock cycles for video preamble code words, assuming that any required synchronization signals have been transmitted) or to continue a data island with another packet (which would require at least 42 pixel clock cycles: 32 clock cycles for the packet plus 2 pixel clock cycles for trailing guard band words plus 8 pixel clock cycles for video preamble code words). The transmitter would typically postpone transmission of a data island (or transmission of another packet within a data island) if it expects another active video period (or other required event) to begin before transmission of the data island (or additional packet) can be completed. If the transmitter were transmitting a data island when a new line of video data were asserted to the transmitter from a video source, then it would need to ignore the incoming video pixels from the source until it could complete the data island, transmit the mandatory synchronization signals (which requires 12 pixel clock cycles in a control data period, in preferred embodiments), then transmit the video leading guard band, and only then start to transmit encoded video pixels. Of course, it would be undesirable for the transmitter to drop pixels that were intended to be displayed.

In other preferred embodiments, the transmitter is configured to initiate data island transmission based on register indication of blanking interval duration. In such embodiments, the transmitter includes registers (e.g., registers 105 of FIG. 13) that can store bits indicating when the active video and blanking periods of a sequence of video frames will occur (in subsequent frames and lines to be transmitted) and when other required events (such as HDCP re-keying events) must occur during transmission of the subsequent frames and lines. A host device (e.g., the video source) can load bits indicative of the critical values into the registers. This eliminates the need for the transmitter to include circuitry for determining automatically, from previous lines or frames, when the active video and blanking periods and critical events of a sequence of video frames will occur (as in the embodiments described in the previous paragraph). The critical values indicated by the bits in the registers need to be tied to some event whose timing is known to the transmitter, for example, to the occurrence of HSYNC or assertion (to the transmitter) of a rising edge of Video DE (the start of an active video period) from a video source. For example, the transmitter could include registers that store bits indicating that a rising edge of Video DE will occur X pixels after a rising edge of HSYNC (or a rising or falling edge of Video DE). When the transmitter sees the next rising edge of HSYNC (or the next rising or falling edge of video DE), a counter in the transmitter starts to count. When the transmitter decides that it wants to send a data island, it checks the counter and determines from the current count whether or not there are enough pixel clock cycles between the present time and the next expected rising edge of video DE (or the next other required event) for transmission of a whole data island.

Figure 13A:
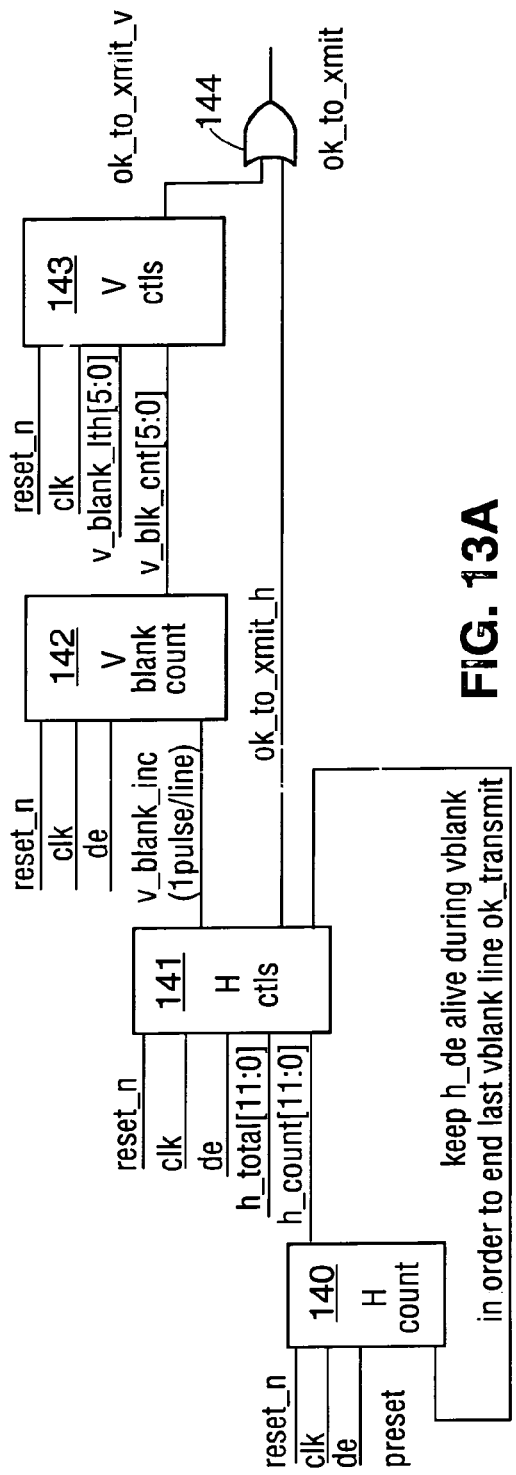
FIG. 13A is a block diagram of circuitry employed in some embodiments of the inventive transmitter for determining whether to insert a data island between active video periods.
Figure 13B:
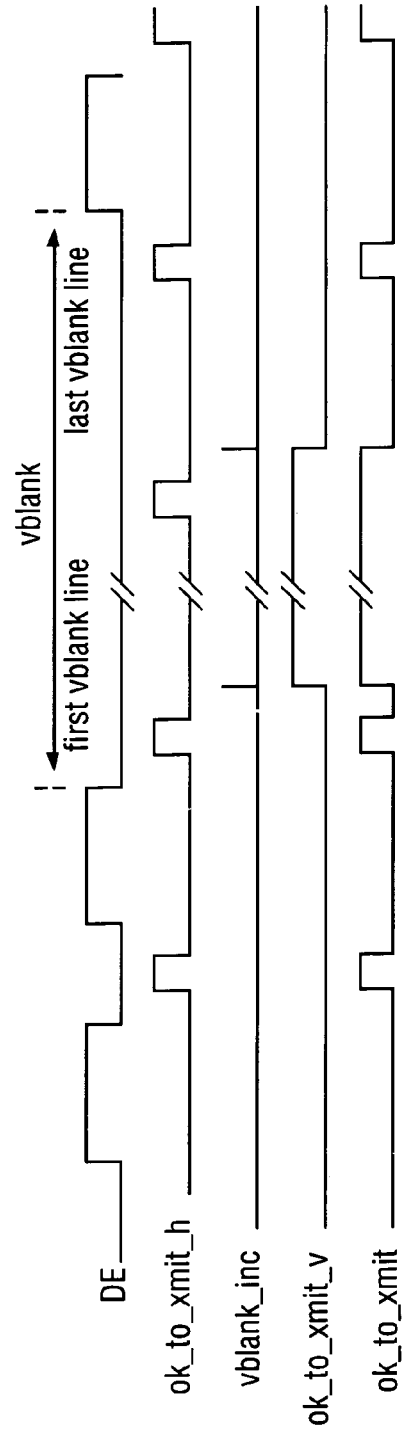
FIG. 13B is a timing diagram of some of the signals received and generated by the FIG. 13A circuitry during operation.
Figure 13C:
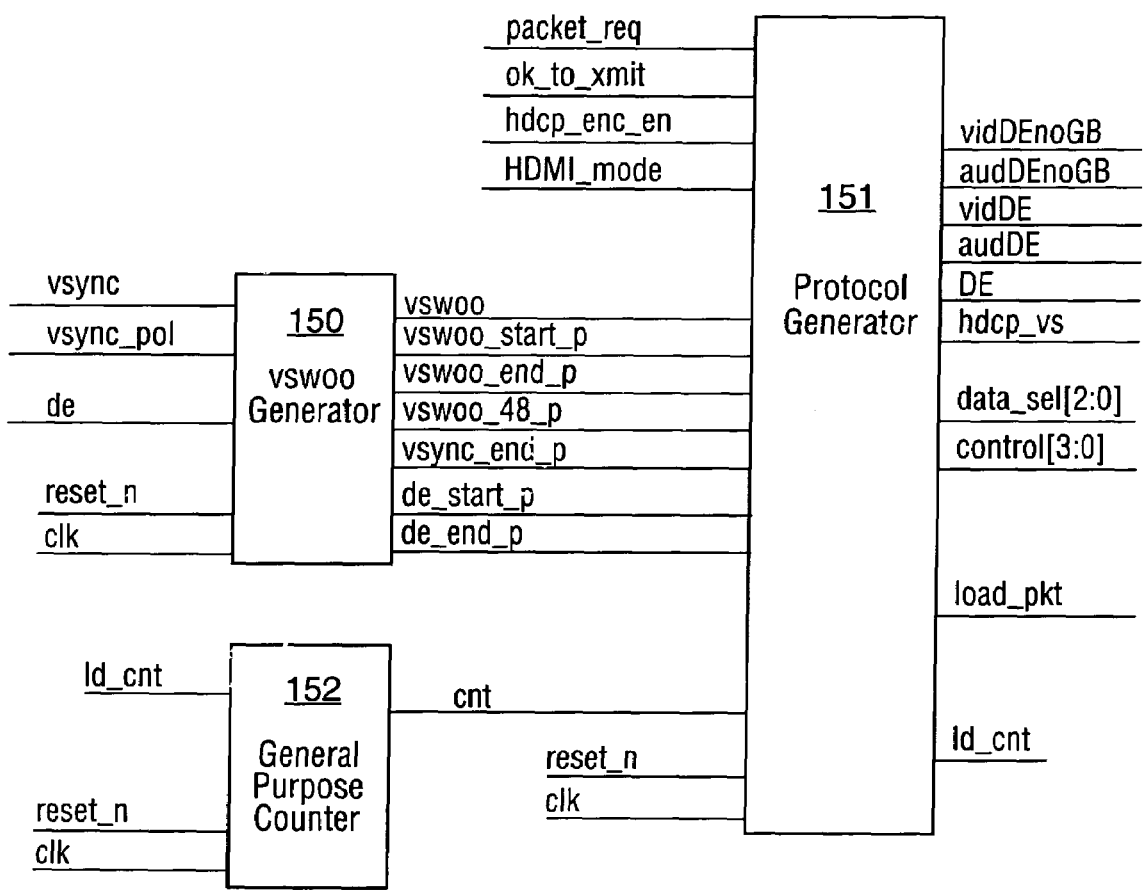
FIG. 13C is a block diagram of circuitry employed in some embodiments of the inventive transmitter for inserting a data island between active video periods.

The circuitry of FIGS. 13A and 13C is implemented in preferred embodiments of the inventive transmitter to determine whether to insert a data island between two active video periods, determine the temporal placement and duration of each data island to be inserted, and insert each data island in the appropriate time slot. The circuitry of FIGS. 13A and 13C is coupled to multiplexer 118, core 114, and subsystems 106 and 108 in preferred implementations of transmitter 100 of FIG. 13.

The FIG. 13A circuitry generates a signal ("ok_to_xmit") indicative of whether enough time remains in the current blanking interval for the transmitter to insert a data island (or to add another packet to a data island already inserted) in the blanking interval. Each of counters 140 and 142 and logic units 141 and 143 of FIG. 13A receives the pixel clock and the data enable signal "DE" asserted to the transmitter, and a reset signal. FIG. 13B is a timing diagram of signals v_blk_inc, ok_to_xmit_h, ok_to_xmit_v, and ok_to_xmit generated by, and signal DE received by, the FIG. 13A circuitry during operation.

During each vertical blanking interval, unit 141 asserts timing signal "v_blank inc" (a sequence of pulses whose rising edges occur once per line of the input video asserted to the transmitter, in phase with the rising edges of DE) to counters 140 and 142.

During each vertical blanking interval, counter 142 generates a count ("v_blk_count[5:0]") indicative of the number of pixel clock cycles elapsed since the start of the vertical blanking interval, in response to signals "v_blank_inc," DE, and the pixel clock ("clk"). Counter 140 generates a count ("h_count[11:0]") indicative of the number of pixel clock cycles elapsed since the last rising edge of DE or the last rising edge of "v_blank_inc." whichever edge occurs later. Thus, counter 140 continues to generate the h_count[11:0]) count even during vertical blanking intervals. Logic unit 143 receives the "v_blk_count[5:0]" value from counter 142, and a value "v_blank_lth[5:0]" (typically from a configuration register in the transmitter) that indicates the predetermined length of each vertical blanking interval of the input video asserted to the transmitter. In response, unit 143 generates the output signal "ok_to_xmit_v." The rising edge of output signal "ok_xmit_v" coincides with an edge of the first pulse of "v_blank_inc" received in a vertical blanking interval, and the falling edge of "ok_to_xmit_v" occurs when there is no longer enough time remaining in the vertical blanking interval to insert a data island therein. Logic unit 141 receives the "h_count" value from counter 140, and a value "h_total[11:0]" (typically from a configuration register in the transmitter) that indicates the predetermined length of each horizontal line of the input video asserted to the transmitter. In response, unit 141 generates the output signal "ok_to_xmit_h." The output signal "ok_to_xmit_h" has a rising edge when a predetermined number of pixel clock cycles have elapsed since the end of the last horizontal blanking interval (or the last pulse of "v_blank_inc") and a falling edge when there is no longer enough time remaining in a horizontal blanking interval to insert a data island therein.

One input of OR gate 144 receives the signal "ok_to_xmit_h," the other input of OR gate 144 receives the signal "ok_to_xmit_v," and OR gate 144 asserts the signal "ok_to_xmit" at its output.

Logic unit 151 of the FIG. 13C circuitry receives the signal "ok_to_xmit" from OR gate 144. Logic unit 151 also receives the output of VSWOO ("VSYNC window of opportunity") generator 150, and signals "packet_req" (which indicates whether the transmitter is ready to send a packet in a data island), "HDMI_mode" (which indicates whether the transmitter is operating in a mode in which it asserts packets in data islands to a serial link), and "hdcp_enc_en" (which indicates whether the transmitter's HDCP cipher engine is enabled). Logic unit 151 is configured to generate the timing and control signals required for inserting a data island between active video periods and transmitting each guard band and packet to be transmitter in the data island. Preferably, unit 151 outputs the following signals: vidDEnoGB and audDEnoGB (which are asserted to the HDCP cipher engine to indicate, respectively, a portion of an active video period containing no video guard band and a portion of a data island containing no data island guard band), vidDE and audDE(which indicate respectively an active video period and a data island), DE (vidDE logically "Ored" with audDE), hdcp_vs (indicating the time interval in which the transmitter can transmit code words indicative of the above-described HDCP encryption indicator on channels CH1 and Ch2), data_sel[2:0] (which indicates whether video data, a video guard band, a leading or trailing data island guard band, or packetized data island data are to be transmitted at times other than during control data periods), control [3:0] (which indicates values of CTL0, CTL1, CTL2, and CTL3 to be encoded for transmission during control data periods), and load_pkt (which indicates that data island data are to be packetized for transmission). Unit 151 operates in response to a count (cnt) from general purpose counter 152, and asserts control bits (ld_cnt) to counter 152 that determine the value to which counter 152 should count. Counter 152 is coupled to receive these control bits, the pixel clock, and a reset signal.

VSWOO generator 150 receives the data enable (DE), pixel clock ("clk"), and VSYNC signals input to the transmitter, and a reset signal, and generates signals indicative of the above-described window of opportunity ("WOO") having predetermined duration following each active edge of VSYNC, in which the transmitter should transmit the above-described HDCP encryption indicator. Preferably, generator 150 is configured to set the duration of the WOO to be 72 pixel clock cycles, and generator 150 outputs the following signals: vswoo (which is high during the WOO), vswoo_startp and vswoo_end_p (which indicate the beginning and end of the WOO), vswoo_48_p (which indicates the 48$^{th}$ pixel clock cycle after the end of assertion of a VSYNC pulse to the transmitter), vsync end_p (which indicates the end of assertion of a VSYNC pulse to the transmitter), and de_start_p and de_end_p (which indicate the beginning and end of each blanking interval).

Preferably, the timing signals asserted by unit 151 cause transmission of each data island preamble as of (and not earlier than) 48 pixel clock cycles after each falling edge of vidDEnoGB. As noted above, preferred embodiments of the inventive transmitter send a burst of eight identical data island preamble code words just before each data island and a burst of eight identical video preamble code words just before each active video period, over each of channels CH1 and CH2 of a TMDS link. In preferred embodiments, the transmitter sends default ("idle") control words over each of channels CH1 and CH2 during control data periods prior to assertion of each burst of data island preamble code words.

A pixel clock rate change will frequently cause the inventive system to lose synchronization between the transmitter and receiver. By causing the transmitter and receiver to enter a "mute" state (before changing the pixel clock rate) in accordance with an embodiment of the invention, the encryption and decryption circuitry in the transmitter and receiver can respond to a pixel clock rate change without losing synchronization. This is preferably accomplished by sending a warning (typically indicated by a control bit) to the transmitter. In response to the warning, the transmitter enters a mute state, includes a receiver warning (typically indicated by one or more mute state control bits) in a packet, and transmits the packet to the receiver during a data island. In response to the receiver warning, the receiver enters a mute state.

Typically, the warning causes the transmitter to set a flag (an "AVMUTE" flag), and the receiver warning causes the receiver to set an AVMUTE flag. In response to the AVMUTE flag in the transmitter, the encryption circuitry (e.g., cipher engine 104 in transmitter 100) transitions to an idle state after completing processing of the current frame of video. In response to the AVMUTE flag in the receiver, the decryption circuitry (e.g., cipher engine 204 in receiver 200) transitions to an idle state after completing processing of the current frame of video.

In a preferred embodiment of the inventive transmitter, operation of the encryption circuitry freezes (and enters an idle state) at the end of a window of opportunity (the above-described "WOO") following the active edge of VSYNC in the next vertical blanking interval that occurs after entry into the mute state. At this time, the transmitter stops transmitting useful auxiliary data (e.g., audio data) in packets and stops sending useful video information (e.g., the transmitter's video and audio output does not change in response to the input audio and video asserted thereto). The transmitter then sends the receiver warning to the receiver during a data island.

In a preferred embodiment of the inventive receiver, operation of the decryption circuitry freezes (and enters an idle state) at the end of a window of opportunity (the above-described "WOO") following the active edge of VSYNC in the next vertical blanking interval that occurs after entry into the mute state. At this time, the receiver stops asserting useful auxiliary data (e.g., audio data) from packets at its outputs and stops asserting useful video information at its outputs. Thus, even if the transmitter does not cease sending useful information (e.g., video and/or audio) to the receiver over the link during mute state operation, the receiver will prevent any useful information from being seen, heard, or re-transmitted from any of its outputs.

When the encryption circuitry in the transmitter and the decryption circuitry in the receiver have entered their idle states, a pixel clock rate change can occur. After the pixel clock settles and any PLLs in the receiver have settled, a message is preferably sent permitting the transmitter and receiver to leave the mute state (in response to a "mute off" command), thus resuming encryption and decryption and "unmuting" the audio and video. During a pixel clock rate change, typical embodiments of the inventive receiver lose the ability to reliably decode received data. During this time, all sorts of spurious signals may come out of the decoder in the receiver. For this reason, the pixel clock rate change preferably occurs while the receiver is in the mute state, and the output of the receiver is muted during the mute state.

Exit from the mute state is preferably accomplished by sending a "mute off" signal (typically indicated by a control bit) to the transmitter. In response to the mute off signal, the transmitter leaves the mute state, includes "receiver mute off" data (typically indicated by one or more mute state control bits) in a packet, and transmits the packet to the receiver during a data island. In response to the receiver mute off data, the receiver exits the mute state.

Typically, the mute off signal causes the transmitter to clear the above-mentioned AVMUTE flag and the "receiver mute off" data causes the receiver to clear its AVMUTE flag. In response to clearing of the AVMUTE flag in the transmitter, the encryption circuitry (e.g., cipher engine 104) in the transmitter is free to leave the idle state in response to an encryption indicator that may be asserted thereto following the active edge of VSYNC in the next vertical blanking interval occurring after the AVMUTE flag is cleared. In response to clearing of the AVMUTE flag in the receiver, the decryption circuitry (e.g., cipher engine 204) in the receiver is free to leave the idle state in response to an encryption indicator (e.g., the above-mentioned HDCP encryption indicator) that may be received in a window of opportunity following the active edge of VSYNC in the next vertical blanking interval that occurs after the AVMUTE flag is cleared.

In some preferred embodiments, the invention is a multichip module ("MCM") that includes at least a first chip that includes most or all of the required circuitry for recovering and processing transmitted data (e.g., receiver 2' of FIG. 2, or receiver 2' of FIG. 2 excluding EEPROM 24), and another chip that includes an Enhanced Display Identification Data (EDID) ROM (typically implemented as an EPROM). At the factory, the EDID PROM chip can be programmed with data indicative of the receiver's configuration and/or capabilities, and optionally also with the keys and identification data used for decryption (e.g., HDCP keys). Alternatively, such an MCM can include a third chip that includes an EEPROM (e.g., EEPROM 24 of FIG. 2) that securely stores the keys and identification data used for decryption.

In other preferred embodiments, the inventive transmitter includes a PROM (e.g., EEPROM 14 of FIG. 2) that securely stores the keys and identification data used for encryption, and also stores InfoFrame data. As noted above, the EIA/CEA-861B standard defines an InfoPacket data structure which consists of one or more InfoFrames containing format information and related information regarding digital audio and/or digital video data. The InfoFrame data stored in the PROM would preferably be indicative of such format information and related information. In some embodiments, the PROM is implemented as a separate chip in an MCM, and the MCM also includes at least one other chip that implements most or all of the required circuitry for encoding and transmitting data (e.g., circuitry 1' of FIG. 2). Such a separate PROM chip could be programmed at the factory with the InfoFrame data as well as HDCP or other encryption key data, and then securely embedded in the MCOM.

In other embodiments, the inventive transmitter or receiver is an MCM that includes a chip including a ROM that has selectable host micro-accessible regions (e.g., regions accessible by a host device during test mode operation, for example to read test results or configure the transmitter or receiver for testing), and also non-host accessible regions (that can be used, for example, to securely store keys and identification data used for encryption or decryption). For example, EEPROM 14 of FIG. 2 can be implemented as such a chip, transmitter 1' of FIG. 2 can be implemented as another chip, and both chips can be included in an MCM. The non-host accessible regions of such an integrated circuit implementation of EEPROM 14 can store HDCP keys and/or other encryption key data (and optionally also other data) that are accessible only by the integrated circuit implementation of transmitter 1' and not by any device other than transmitter 1'.

In other embodiments, the inventive transmitter or receiver is implemented as an integrated circuit that includes at least one PROM for storing keys and identification data used for encryption or decryption (e.g., HDCP keys) and/or Enhanced Display Identification Data. A PROM of such an integrated circuit implementation of the inventive transmitter could be programmed at the factory with HDCP or other encryption keys. A PROM of such an integrated circuit implementation of the inventive receiver could be programmed at the factory with HDCP or other decryption keys and/or with EDID data indicative of the receiver's configuration and/or capabilities.

In a class of embodiments, the inventive transmitter is configured to send packets (in data islands) in any of a variety of formats, preferably including the above-mentioned InfoFrame packet format and information packets having other formats. If a receiver is configured to receive packets in a special format, it is preferably configured to store data indicative of such format (e.g., in an EDID ROM) and the transmitter is preferably configured to access this data (e.g., via a DDC channel of a TMDS link) and respond thereto by sending packets to the receiver in such format. Alternatively, the receiver can otherwise signal the transmitter to define the format to be used by the transmitter to send packets to the receiver.

Implementing the transmitter in this way allows for future definitions of packet formats (e.g., information packet formats), either for one-time transmission to a receiver or for repeated transmission to a receiver.

Preferably, the transmitter and receiver are configured to use a 2-bit semaphore (or alternatively, some other signaling scheme) to control the automatic transmission of packets (e.g., modifiable packets). For example, the transmitter and receiver are configured to send two-bit codes to each other to control the transmission of InfoFrame packets or information packets having other format. One bit is a "send" bit. The receiver sends the send bit to the transmitter to cause the transmitter to transmit or stop transmission of a packet. The second bit is a "repeat" bit. The transmitter could be configured to respond to a send bit from a receiver by overwriting the "repeat" bit with a value indicating that the transmitter is sending repeated packets, and then to send a two-bit code including such a "repeat" bit to the receiver. The receiver could then respond by asserting another send bit to the transmitter. In some embodiments, the 2-bit codes are sent over a DDC link (or other bidirectional channel between the transmitter and receiver) to cause packet transmission over one or more other channels (e.g., channels CH0, CH1, and CH2 of a TMDS link).

Preferably, the inventive transmitter and/or the inventive receiver includes register space accessible by an external device (e.g., via a I$^2$C link) for storing data extracted from (or to be included in) InfoFrame packets (or information packets having other format), such as audio and/or video format information and related information regarding audio and/or video data transmitted or to be transmitted. For example, an external source can load such data into such registers in the transmitter (e.g., registers 105 of FIG. 13), and the transmitter can then read the registers to obtain data to be included in packets for transmission during data islands to the receiver. Preferably, the transmitter is configured with a mapping of the register space to specific time slots of an InfoFrame packet (or other information packet), for example by including circuitry configured to read bits (received from an external source and loaded into the registers) from the registers and to insert the bits in specific predetermined time slots of a data stream being assembled for transmission as an InfoFrame packet. Preferably, the receiver can extract data from packets transmitted to the receiver (e.g., over CH0, CH1, and CH2 of a TMDS link during data islands) and load the extracted data into accessible registers (e.g., registers 205 of FIG. 14). An external device can then access the registers in the receiver, preferably over an $I^2C$ link. For example, the transmitter could access the registers in the receiver via the DDC channel of a TMDS link, or a host device could access such registers in the receiver via an $I^2C$ link other than a DDC channel of a TMDS link.

Preferably, the receiver is configured to store unrecognized information packets (received over a TMDS or other serial link), so that a host (e.g., a CPU or other processor coupled to the receiver) can access the stored packets. This would allow a host programmed with appropriate software to parse each such stored packet, and preferably to load registers in the receiver with bits that configure the receiver to process audio and/or video data to be transmitted over the link in the manner specified by the parsed packet.

Preferably, the inventive receiver is configured with hardware that parses received Auxiliary Video information (AVI) InfoFrame packets (or other information packets) received over a TMDS link (or other serial link), and to auto-configure color space conversion (CSC) circuitry, chroma up/down sampling circuitry, and optionally also other video processing circuitry in the receiver in the manner determined by the packets. Thus, if an AVI InfoFrame packet is transmitted to the receiver (e.g., in a data island) in conjunction with video, the receiver can respond to the data in the AVI InfoFrame packet by appropriately configuring its video processing circuitry to process the video.

Preferably, the inventive receiver is configured with hardware that parses received Audio InfoFrame (AI) packets (or other information packets) received over a TMDS link (or other serial link), and to auto-configure audio data processing circuitry in the receiver in the manner determined by the packets. Thus, if an AI packet is transmitted in a data island in conjunction with audio, the receiver can respond to the data in the AI packet by appropriately configuring its audio data processing circuitry to process the audio. An AI packet can indicate various information such as whether or not the audio is compressed.

In preferred embodiments, the inventive transmitter has an input interface (e.g., a preferred implementation of interface 109 of FIG. 13) configured to receive audio or other auxiliary data over at least one $I^2S$ link, and is configured to format the input data received over each $I^2S$ link for transmission over a serial link in packets (preferably for transmission over the CH0, CH1, and CH2 channels of a TMDS link during data islands in Audio Sample Packets having the above-described format). The expression "$I^2S$" is used in a broad sense herein to denote a three-conductor link including a first conductor for data (typically audio data), a second conductor for a bit clock, and a third conductor for a word clock (e.g., a Left/Right word select clock identifying the channel of the data being sent over the first conductor). Preferably, the receiver has at least one $I^2S$ output port and is configured to extract the audio data from the transmitted packets (e.g., Audio Sample Packets), to reformat the extracted data as necessary for assertion over at least one $I^2S$ link, and to assert the extracted data in $I^2S$ format to the at least one $I^2S$ output port.

Preferably, the inventive transmitter has an input interface configured to accept PCM input data from an $I^2S$ link (i.e., non-compressed $I^2S$ data) and in response thereto to reformat the data for transmission in Audio Sample packets having the same format as used in the above-described preferred embodiments of the inventive system to transmit S/PDIF audio data. Preferably, the transmitter employs register programmed Channel Status bits indicative of the input data format (from the input data source) to perform the necessary reformatting. For example, in a first cycle of the $I^2S$ data word clock, the transmitter can sample the input data on the selected edge of the $I^2S$ data bit clock and insert the samples (via a FIFO) into the time slots of a subpacket for a "Left" channel S/PDIF sample, and then in the next cycle of the $I^2S$ data word clock, continue to sample the input data on the selected edge of the $I^2S$ data bit clock but insert the samples (via the FIFO) into the time slots of the subpacket for a "Right" channel S/PDIF sample. Along with the audio data samples, appropriate channel status, valid, user data, and parity bits would preferably be inserted (via the FIFO) into the appropriate time slots of the subpacket, and a start bit would be inserted (via the FIFO) to the packet header with appropriate timing.

In preferred embodiments, the inventive transmitter has an input interface capable of accepting input audio data from one to four $I^2S$ links. In some such embodiments, the transmitter is capable of accepting input audio data from a multichannel system on one, two, three, or four $I^2S$ links, in which the $I^2S$ links all use the same bit and word clocks (so that all the information in the three, six, nine, or twelve input $I^2S$ conductors is included in three, four, five, or six of the input $I^2S$ conductors: one bit clock conductor; one data clock conductor, and one, two, three, or four data conductors) and formatting the data for transmission as packets (preferably as Audio Sample Packets having the above-described format). In other such embodiments, the transmitter has an input interface capable of accepting input audio data from one to four $I^2S$ inputs, even when each $I^2S$ input has an independent clock (so that the bits received on all of the input $I^2S$ conductors must be packetized), and formatting the data for transmission as packets (preferably as Audio Sample Packets having the above-described format).

In preferred embodiments, the inventive transmitter includes multiplexer circuitry (e.g., in the data capture block of interface 109 of FIG. 13) that can reconfigure the stream/channel mapping of input audio data to fit within constraints imposed by available Channel/Speaker allocations for packetizing the data for transmission. Thus, such a transmitter can accept input audio data (e.g., input audio from one or more $I^2S$ links) in any of a set of formats (each with a unique stream/channel mapping) and reformat the data into one of different set of allowed formats for transmission as packets (preferably as Audio Sample Packets having the above-described format).

A stream of S/PDIF data has its own clock (embedded among the data samples). In some embodiments, the inventive transmitter is configured to sample an input stream of S/PDIF data (typically, S/PDIF audio data) with a pixel clock having no known phase relationship with the clock embedded among the input data, and then to transmit the pixel-clock-sampled data. In other embodiments, the transmitter is configured to sample an input stream of S/PDIF data with an audio reference clock (sometimes referred to herein as "MCLK" or master clock) having frequency of at least 256*Fs (or 384*Fs in preferred embodiments), where Fs is the sample rate of the S/PDIF data, where there is no known phase relationship with the clock embedded among the input data.

In some embodiments, the inventive transmitter is configured to accept and synchronize multiple independent, synchronizable S/PDIF streams.

Preferably, the inventive transmitter is configured to translate a flatline S/PDIF input (consisting entirely of zeroes) to a format for efficient transmission by packets. For example, the transmitter is configured to set four bits of a packet header to indicate whether a corresponding subpacket includes a "flatline" sample (i.e., a sample consisting entirely of zeroes). For example, the transmitter is configured to set the four LSBs of the third byte of the packet header (as described above) to indicate whether a corresponding subpacket includes a "flatline" sample, in which case the receiver is preferably configured to treat a "1" value of any of these LSBs as valid only if a corresponding "present" bit of the second byte (one of the four LSBs of the second byte) of the header indicates that the corresponding subpacket contains a sample.

In preferred embodiments, the inventive transmitter is configured to accept DSD (Direct Stream Digital) input data and format this input data for transmission in IEC60958-type packets during data islands. Audio data in the conventional DSD (Direct Stream Digital) format (e.g., SACD or "Super Audio CD" data) are transmitted on a three-conductor link: one conductor for a bit clock; and two conductors each for a different channel (i.e. one left channel conductor and one right channel conductor). Preferably, the receiver has at least one DSD output port and is configured to extract the audio data from the transmitted packets (e.g., Audio Sample Packets), to reformat the extracted data as necessary for assertion as a DSD output stream, and to assert the extracted data in DSD format to the at least one DSD output port.

Preferably, the inventive transmitter has an input interface configured to accept DSD input data and in response thereto to reformat the data for transmission in Audio Sample packets having the same format as used in the above-described preferred embodiments of the inventive system to transmit S/PDIF audio data. Preferably, the transmitter employs register programmed Channel Status bits indicative of the input data format (from the input data source) to perform the necessary reformatting.

In preferred embodiments, the inventive transmitter has an input interface capable of accepting multiple streams of DSD format input audio. In some such embodiments, the transmitter has an input interface capable of accepting DSD format input audio data from multiple DSD links, even when each DSD stream has an independent clock (so that the bits received on all of the input DSD conductors must be packetized), and formatting the data for transmission as packets (preferably as Audio Sample Packets having the above-described format).

Where the transmitter is configured to accept input audio data in I²S format (on three-conductors: one conductor for a bit clock; one for a L/R clock; and another for data) as described above, it preferably also is configured to accept and transmit audio data in DSD format at the same 3-conductor input port. Such a transmitter would preferably include multiplexers that map the three input streams appropriately to the circuitry for formatting the input data for transmission in Audio Sample Packets having the above-described format.

In preferred embodiments, the inventive receiver has at least one I²S output interface, and is configured to recover PCM data from Audio Sample packets and translate the recovered data to I²S format (e.g., using register programmed channel status bits that are transmitted in an Audio InfoFrame (AI) packet sent by the transmitter to the receiver with the Audio Sample Packets).

In preferred embodiments, the receiver is configured to output audio data (recovered from Audio Sample packets) in I²S format on from one to four I²S outputs (each output configured for connection to a 3-conductor I²S link);

In preferred embodiments, the inventive receiver is configured to output audio data (recovered from Audio Sample packets) in I²S format on from one to four I²S outputs (including by asserting different I²S data streams, having different and independent clocks, to different outputs).

In preferred embodiments, the inventive receiver includes multiplexer circuitry that can reconfigure the stream/channel mapping of audio data extracted from packets in a format within constraints imposed by available Channel/Speaker allocations for packetizing the data. Thus, such a receiver can output audio data (e.g., on one or more I²S links) in any of a set of formats (each with a unique stream/channel mapping) after having extracted the data from packets (preferably Audio Sample Packets having the above-described format) and reformatted the extracted data from one of different set of allowed formats in which it was packetized.

In preferred embodiments, the inventive receiver is configured to output S/PDIF format data. Preferably, the receiver is configured to translate packetized codes indicative of flatline S/PDIF data (consisting entirely of zeroes) into flatline S/PDIF format output data. In some embodiments, the receiver is configured to recognize four bits of a packet header as being indicative of whether a corresponding subpacket includes a "flatline" sample (i.e., a sample consisting entirely of zeroes). For example, the receiver is configured to recognize the four LSBs of the third byte of the packet header (as described above) as being indicative of whether a corresponding subpacket includes a "flatline" sample, and to treat a "1" value of any of these LSBs as valid only if a corresponding "present" bit of the second byte (one of the four LSBs of the second byte) of the header indicates that the corresponding subpacket contains a sample.

Preferably, the inventive receiver is configured to output data in DSD format in response to audio sample packets including an encoded version of the DSD data. Preferably, the receiver is configured to output multiple DSD data streams with independent clocks, in response to Audio Sample Packets that include an encoded version of the DSD data. Where the receiver is configured to output audio data in I²S format at an output port (for connection to a three-conductor link comprising one conductor for a bit clock; one for a L/R clock; and another for data) in response to Audio Sample packets, it preferably also is configured to output audio data in DSD format at the same output port (e.g., the receiver includes multiplexers that map the three input streams recovered from the Audio Sample Packets to appropriate conductors of the output port).

In a class of preferred embodiments of the invention, transmission of audio data over a serial link is driven by a pixel clock only, so that the original audio sample clock must be regenerated at the receiver in an operation known as Audio Clock Regeneration ("ACR"). We next describe several embodiments of the invention in which ACR is accomplished in a preferred manner.

As noted above, preferred embodiments of the inventive system transmit time stamps ("CTS" values) indicative of the audio clock (for audio data being transmitted in data islands over a TMDS or other serial link) and preferably transmit "audio clock regeneration" packets that contain both the "CTS" values and "N" values used for audio clock regeneration. The "N" value is a "numerator" value, indicative of the numerator of a fraction by which the receiver is to multiply the frequency of the pixel clock to regenerate the audio clock.

There are a variety of clock regeneration methods that can be implemented in the receiver of the inventive system. In many video source devices, the audio and video clocks are generated from a common clock. In this situation, there exists a rational (integer divided by integer) relationship between the audio and video clocks. The clock regeneration architecture can take advantage of this rational relationship and can also work in an environment where there is no such relationship between these two clocks, that is, where the two clocks are truly asynchronous or where their relationship is unknown.

Figure 15:
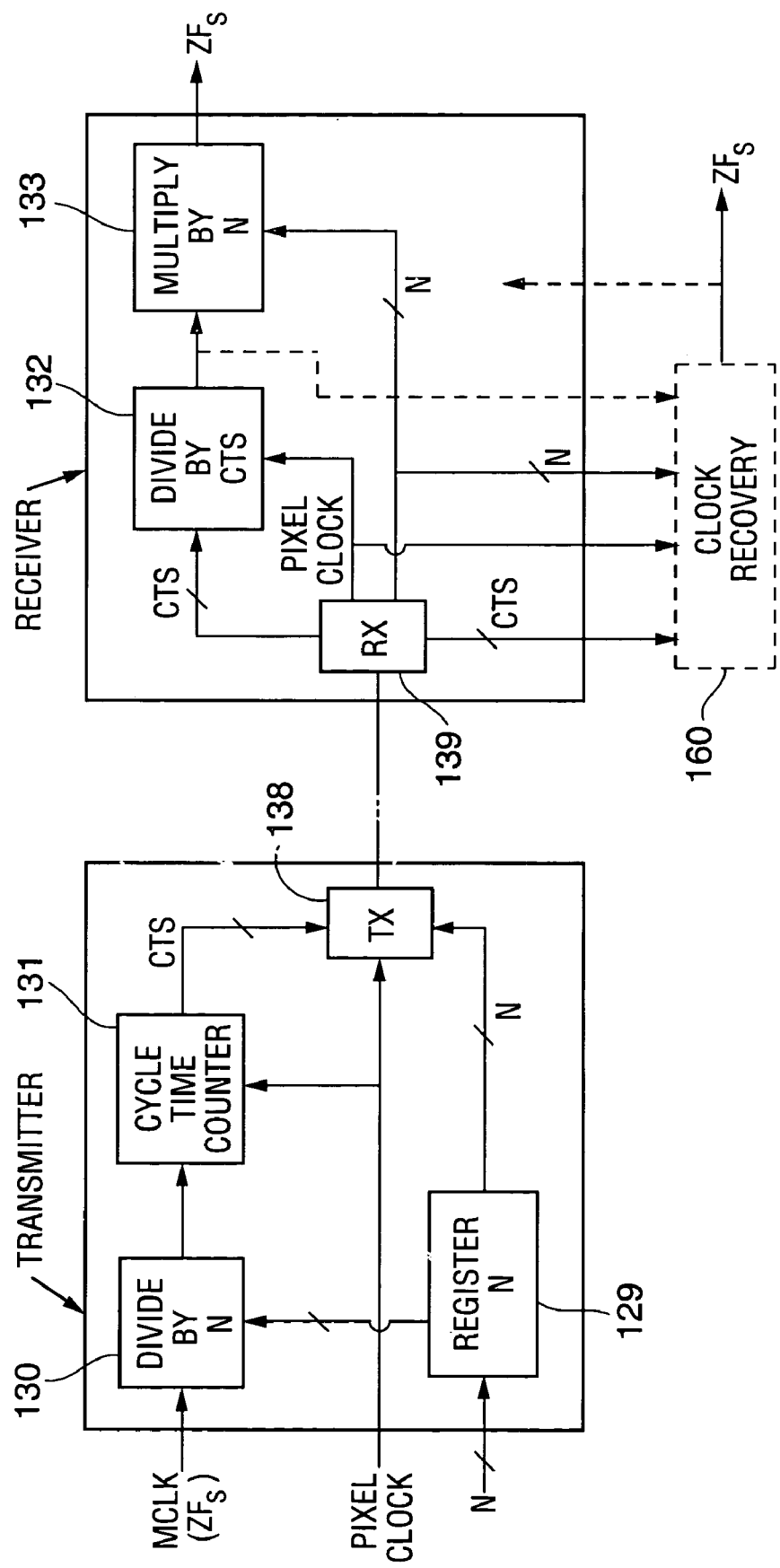
FIG. 15 is a block diagram of the auxiliary data clock transmission and regeneration circuitry employed in typical embodiments of the inventive system.
Figure 16:
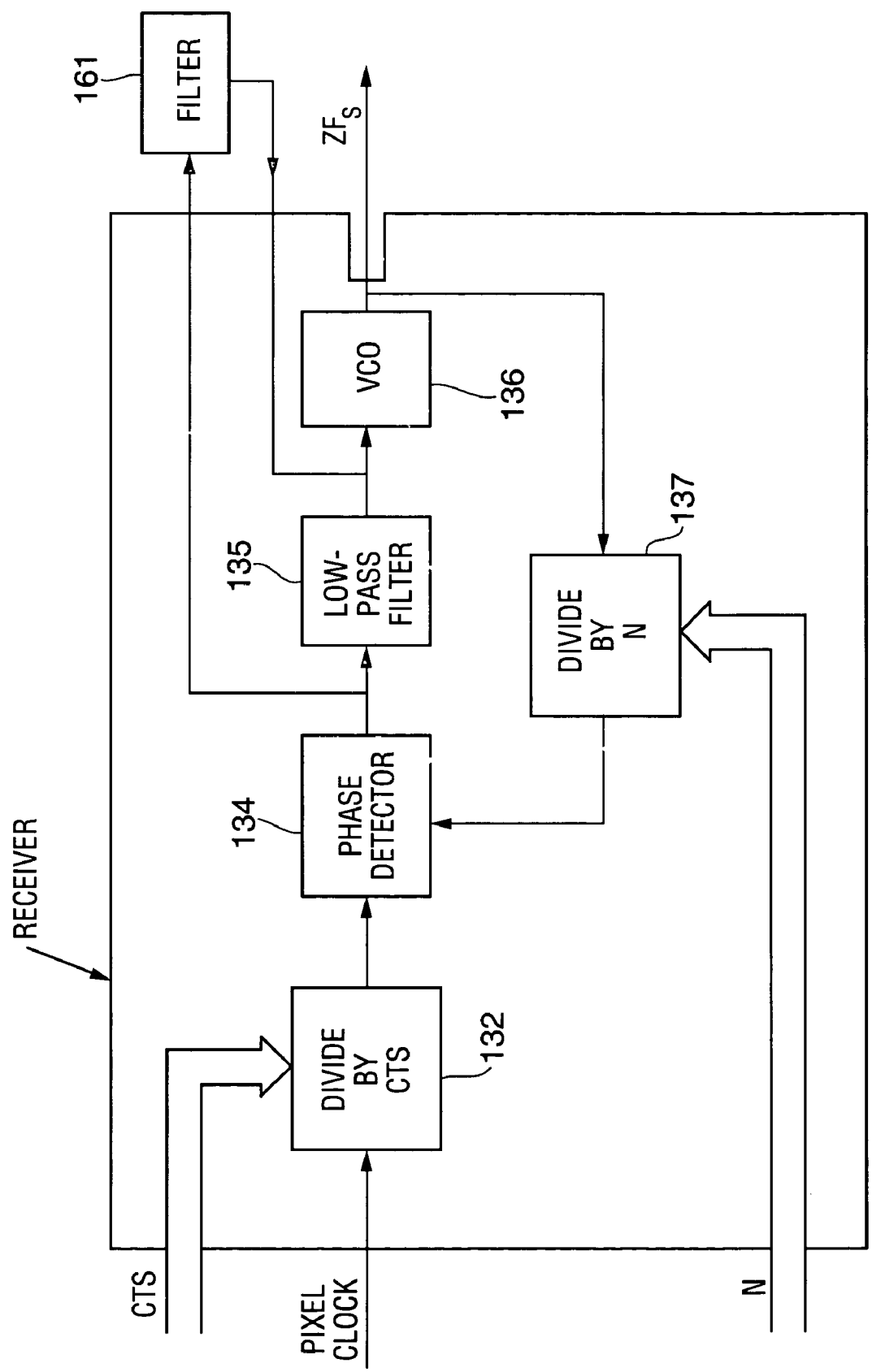
FIG. 16 is a block diagram of the auxiliary data clock regeneration circuitry employed in typical embodiments of the inventive receiver.

FIG. 15 is a block diagram of the overall system architecture model used by preferred embodiments of the inventive system for audio clock regeneration. The transmitter determines the fractional relationship between the pixel clock (the video clock) and an audio reference clock (known as "MCLK" or master clock, where MCLK has frequency equal to Z*Fs, where Fs is the audio sample rate, and Z is typically equal to Y*128, wherein Y is a small integer such as 1, 2, or 3). The transmitter passes the numerator ("N") and denominator ("CTS") for this fraction, and the pixel clock, to the receiver across the serial link (via the transmitter's formatting, encoding, and transmitting circuitry 138). Receiving and decoding circuitry 139 in the receiver then recovers the pixel clock and data indicative of the N and CTS values, and the receiver recreates the MCLK clock from the pixel clock (whose frequency is denoted "PixelClock") by using clock divider 132 and clock multiplier 133. Clock multiplier 133 is typically implemented as a PLL including a phase detector 134, low-pass filter 135, voltage-controlled oscillator 136, and frequency divider 137, connected as shown in FIG. 16. The exact relationship between the frequencies of MCLK and the pixel clock is Z*Fs=PixelClock*N/CTS.

The transmitter determines the value of the numerator "N" (which is typically input thereto by the input data source) and stores data indicative of "N" in register 129, as shown in FIG. 15. The value N is used in clock divider 130, which also receives the MCLK (having frequency Z*Fs) to generate an intermediate clock that is slower than the MCLK clock by the factor N. The pixel clock and intermediate clock are asserted to counter 131. Counter 131 generates a CTS (Cycle Time Stamp) count by counting the number of pixel clock cycles that have elapsed (since assertion of the last CTS value) during each cycle of the intermediate clock.

Data indicative of the values of N and CTS are transmitted to the receiver (preferably in each Audio Clock Regeneration Packet transmitted by formatting, encoding, and transmitting circuitry 138 over a TMDS link during a data island), and the pixel clock is asserted to the receiver. The pixel clock is preferably transmitted (e.g., by circuitry 138 of FIG. 15) to the receiver on the clock channel of a TMDS link (e.g., channel CHC of FIG. 2).

If there is a constant fractional relationship between MCLK and the pixel clock, and the two clocks are exactly synchronous, then the successive CTS values will quickly converge to a constant value. If the MCLK and pixel clocks are asynchronous, or there is some amount of jitter between them, then the successive CTS values will typically alternate between two or possibly three different values.

In preferred embodiments, the inventive transmitter is configured to accept an MCLK having frequency equal to any of several multiples of 128*Fs (not just an MCLK having frequency 128*Fs), and to frequency divide each such MCLK using the same numerator value "N."

In other preferred embodiments (in which several types of audio data may be input to the transmitter, each with a different sample rate, such as data with Fs=32 kHz, data with Fs=44.1 kHz, and data with Fs=48 kHz), the inventive transmitter is configured to accept an audio clock that is based on a "divided down" version of the audio clock (whose frequency is the greatest common factor of all the possible audio sample frequencies). The frequency of such audio clock is Z*Fs/M, where Z and M are integers, Fs is the audio sample frequency, and Fs/M is the greatest common factor of all the possible audio sample frequencies. For use with such a transmitter, the receiver is configured to regenerate the "divided down" version of the audio clock from transmitted time stamps, and preferably also to generate the original audio clock from the regenerated clock by frequency multiplying the regenerated clock by an appropriate factor. This factor is communicated to the receiver, preferably in an "audio clock regeneration" packet.

When a communication link is required to support data at several clock frequencies which are multiples of a small set of lowest frequencies (referred to as the "base frequencies"), only the base frequency corresponding to the desired frequency is required to be transmitted, and at the receiver the desired frequency can be regenerated by multiplying the base frequency by the appropriate factor. This has the benefit of allowing the receiver to be implemented with a simpler and possibly more reliable clock regeneration PLL.

For example, in commonly used audio formats, the data rates are multiples of 32 kHz or 48 kHz. A PLL designed to support both of these frequencies requires a reference frequency range from 32 kHz to 48 kHz. If the data are transmitted using a divided-down audio clock (whose frequency is the greatest common factor, 16 kHz), the clock regeneration PLL can be implemented so that the reference frequency is 16 kHz (although the receiver would also need to be configured to include frequency multiplication circuitry, with multiplication factors of 2 and 3, to regenerate any of the original audio clocks.

An alternative, more complicated, implementation would be to use 32 kHz as the transmitted clock frequency. For the case of transmitting audio data whose rate is 48 kHz, this has two drawbacks that make the implementation inefficient. First, on the transmitter side, the 48 kHz clock would have to be resynthesized to 32 kHz clock using a ⅔ multiplication circuit, which would require a complex PLL on the transmitter side, whereas the implementation described in the previous paragraph would only require a divider (counter) on the transmitter side which is more efficiently implementable in hardware. Also, the receiver side would require a ½ clock regeneration circuit to resynthesize the received 32 kHz clock into the desired 48 kHz clock. This requires complex clock regeneration circuitry in the receiver, with two possible implementations: one including a frequency divider (that halves the frequency of the regenerated 32 kHz clock) before the phase detector (e.g., before phase detector 134 of FIG. 16) of a PLL, and a divide-by three frequency divider in the PLL (an implementation of frequency divider 137 of FIG. 16 with N=3); or one including a PLL with a divide-by-three frequency divider (an implementation of frequency divider 137 of FIG. 16 with N=3), followed by a frequency divider that halves the frequency of the 96 kHz clock produced in the PLL. Depending on factors such as process technology and reuse of previous designs, one of these PLL designs will be most efficient, although in general the second implementation suffers from requiring the VCO output (96 kHz) to be higher than the highest actually desired frequency (48 kHz), which will unnecessarily increase the difficulty of the PLL VCO design.

The above example assumes audio clock frequencies of 32 kHz and 48 kHz, but only for the purpose of example. In fact the commonly used audio frequencies are presently x1, x2, and x4 multiples of 32 kHz, 44.1 kHz, and 48 kHz, with extensions to both higher and lower (/2, /4) multiples being under development.

Even for the three commonly used frequencies of 32 kHz, 44.1 kHz, and 48 kHz, a receiver implementation simplification is achieved in accordance with the invention by asserting to the transmitter an audio clock having a base frequency (B) equal to 16 kHz(=32 kHz/2=48 kHz/3) or 22.05 kHz (=44.1 kHz/2), or a multiple of either base frequency (MB), and operating the transmitter to assert time stamps (CTS values), numerator values "N" and "L," denominator values "D," and a pixel clock to the receiver in response to such audio clock. The receiver is implemented with a frequency divider (an implementation of circuit 132 of FIG. 15) that regenerates an intermediate clock (having the frequency B/N) from the time stamps and pixel clock, and regeneration circuit (an implementation of circuit 133 of FIG. 15) that includes a PLL and accomplishes frequency multiplication of the intermediate clock appropriately to regenerate an audio clock having any of the desired frequencies BL=32 kHz, BL=44.1 kHz, or BL=48 kHz from the "N" and "L" values. This relaxes the design requirements because the reference frequency range of the PLL in the receiver's regeneration circuit is reduced from 32 kHz–48 kHz to 16 kHz–22.05 kHz. In this embodiment, no PLL is required in the transmitter, and the PLL implementation requirements in the receiver are reduced. For a greater range of input audio frequencies to be supported, the implementation simplification in the receiver is correspondingly greater.

More generally, in preferred embodiments of the invention, the transmitter is configured to accept an audio clock that is based on a "divided down" version of an input audio clock (whose frequency, B, is the greatest common factor of all the possible input audio clock frequencies), and to assert time stamps (CTS values), numerator values "N" and "L," denominator values "D," and a pixel clock to the receiver in response to such audio clock. The receiver is implemented with a frequency divider (an implementation of circuit 132 of FIG. 15) that regenerates an intermediate clock (having the frequency B/N) from the time stamps and pixel clock, and regeneration circuit (an implementation of circuit 133 of FIG. 15) that includes a PLL and accomplishes frequency multiplication of the intermediate clock appropriately to regenerate an audio clock having frequency BL (where BL is equal to any of the possible audio sample frequencies) from the intermediate clock and the "N" and "L" values. Optionally, the transmitter does not assert the "L" values and the regeneration circuit in the receiver regenerates only the "divided down" version of the input audio clock (having frequency equal to B) from the intermediate clock and the "N" values.

In preferred embodiments of the inventive system in which the audio clock is transmitted by sending time stamp values ("CTS" values) and a pixel clock to the receiver, the transmitter is configured to implement auto-phase adjustment for synchronizing the audio clock (e.g., the MCLK asserted to the transmitter of FIG. 15) and the pixel clock, when these clocks are coherent in the sense that both are derived from a common clock. This ensures that the time stamp values do not vary over time.

When the pixel clock (also referred to below as the "video clock") and audio clock are synchronous or nearly synchronous, the audio clock information can be sent across the link by counting the number of video clock periods per audio clock period. If the audio and video is synchronized, this number should be a constant. However, if the rising edge of the audio clock occurs very near the rising edge of the video clock, then a small amount of jitter can move the audio clock edge back and forth across the video clock edge. This would result in variation over time of the counts of "video clock periods per audio clock period" (the "CTS values). This jitter in the CTS values can potentially affect the quality of the regenerated audio clock, even to a degree such that a small amount of jitter in the original audio clock is amplified (in the sense that the regenerated audio clock has worse quality than the original audio clock).

To address the problem of jitter in CTS due to jitter in the audio clock, preferred embodiments of the invention use an oversampling technique at the clock domain "boundary" (the boundary between the audio and video clocks) to automatically select delays which result in maximized setup and hold timing. In other words, multiple phase-shifted versions of the audio clock are generated (e.g., by "oversampling" the audio clock using multiple versions of the video clock, such as the video clock itself and the inverse of the video clock), and the one of the resulting streams of samples that results in the least CTS jitter is selected. This can prevent any "CTS jitter" as long as the input audio and video clocks are synchronized and reasonably stable. An important benefit of this design is to simplify the system level design (since the invention eliminates the need to worry about the audio to video clock skew).

In some embodiments, the transmitter is implemented to generate two sets of CTS values, using both the video clock (VCLK) and an inverted video clock (VCLK_bar) to count the audio clock edges, and to compare the two sets of CTS values to determine which shows less variation over time. The VCLK-based output could be selected (as the CTS values to be transmitted to the receiver) initially, with the option to switch to the VCLK_bar-based output if it shows less CTS value variation over time. These embodiments have the advantage of having a purely digital design, so that the circuitry for accomplishing it can be implemented (placed and routed) in an integrated circuit automatically, and easily transitioned to newer integrated circuit manufacturing processes.

Other embodiments generate multiple sets of CTS values by employing several delay cells to generate multiphase versions of the video clock, and generating a set of CTS values using each different version of the video clock. The transmitter than monitors the sets of CTS values for transitions and selects the set having the fewest transitions. This method would use little area on a transmitter chip, but would require hand design and layout for the timing critical sections.

The rate at which the "autoaligning" is done (the switching between different sets of CTS values) should be kept fairly low (on the time scale of seconds, or only at startup and when the audio or video frequency changes). This is because the audio clock and video clock timing is not expected to vary much in a particular design if coherent audio and video is being sent, unless there is some slow (i.e. temperature related) phase shift between the audio and video clocks. If relative timing of the video and audio clocks is changing fairly often (i.e. in the case of noncoherent audio and video), then the CTS value sent across the link should change since that is the purpose of the CTS counting method.

If the autoaligning were done continuously, then additional logic would be needed to ensure that the CTS values sent are accurate for the case where the audio and video clock are not quite synchronous (i.e. a slow drift between the two clock signals). This can be seen by inspecting FIG. 22.

With reference to FIG. 22, first assume that the audio clock to VCLK timing is as shown in Case 1, and the falling edge of VCLK is used as a reference, and that the nominal CTS count is 27,000 for both rising edge and falling edge VCLK counters (i.e., one CTS count based on VCLK and another based on the inverse of VCLK). Then, if the audio clock edge drifts to the right as shown in case 2, it crosses over the VCLK falling edge, so that the "rising edge VCLK" CTS value remains a constant, while the "falling edge VCLK" CTS value is increased by one when the audio clk edge crosses the VCLK falling edge (if there is jitter between the clocks the falling edge CTS value would bounce +1 and −1 below the nominal value, but the integrated count would remain 1 below that of the rising edge VCLK when it finally settled down on the right side of the edge). By this time, the autoalignment circuit in the inventive transmitter should have selected the "rising edge VLCK" CTS value. For the sake of argument, assume that the changeover (to the rising edge VLCK" CTS value) was made after the audio clock bounced over the falling edge and then returned. In that case, the CTS values sent would have bounced around the average value of 27,000 but the overall average value would still be 27,000. Thereafter, the "rising edge VCLK" CTS value is used which is a constant value of 27,000. Later on, in case 3, the timing has drifted even further, so the audio clock edge has passed the rising edge of VCLK again. We again assume that the same thing has happened, the audio clock edge jittered back and forth near the rising edge of VCLK before the autoalignment circuitry switched VCLK clock edges, and that it switched when the audio clock edge was still on the left side of the VLCK rising edge. Again, the average CTS value sent by the rising edge CTS counter is 27,000. The transmitter then switches over to the "falling edge VLCK" CTS counter, which delivers a constant value of 27,000. So, the CTS value sent always remains 27,000 but in reality the integrated CTS value should have been 1 higher. To work around this effect, preferred implementations of the transmitter would count the difference between the accumulated CTS values and the "rising and falling edge VCLK" CTS values, and when the autoalignment circuitry switches over to a new VLCK edge, the difference count (between the accumulated count of the CTS values sent and the accumulated count based on the new VCLK edge selected) should be sent to the receiver to avoid this error.

Another way to reduce amplified jitter in the regenerated audio clock (regenerated using transmitted CTS values) due to jitter in the audio clock (resulting from the above-described phase alignment in the audio and pixel clocks), which is an alternative to above-described autoalignment technique (of selecting different CTS values based on different versions of the pixel clock employed to sample the audio clock), is to implement the transmitter so that it samples the audio clock with a clock having higher frequency than the pixel clock. As explained above, jitter in the original audio clock can cause jitter in the CTS values that can affect the quality of the regenerated audio clock, even to a degree such that a small amount of jitter in the original audio clock is amplified (in the sense that the regenerated audio clock has worse quality than the original audio clock). A worst-case situation would be if the audio clock edge was close to the video clock edge, but it moved back and forth over the edge. In this case a small amount of audio or video clock jitter (e.g., one nanosecond jitter) could produce a much larger jitter if the CTS value toggled back and forth (up to 40 ns if a 25 MHz pixel clock is being used). This CTS jitter could result in a lower quality recovered audio clock.

Another benefit of more precise measurement of the audio clock (by sampling it at a higher frequency) is to allow the actual jitter in the regenerated audio clock to be tracked more closely. More accurate measurement of the jitter could also reduce the frequency range that the MCLK regeneration circuit needs to cover, and under some circumstances can make that section of the receiver design easier to implement.

A simple oversampling method for producing a finer resolution measurement of the audio clock period is to use both the rising and the falling edge of the video clock to measure the audio clock period. If the video clock duty cycle is close to 50%, this would result in measurements with twice the resolution attainable using only the rising (or falling) edges of the video clock. Other oversampling methods are to use oversampled pixel clocks (which are typically generated for other purposes in a TMDS core processor, such as processor 114 of transmitter 100 of FIG. 13), which can produce 10× or even 30× improvements in the timing resolution, but would require more complex circuitry, and would require use of packets having format adequate to transport these finer resolution measurements across the link. Also, the receiver would need to be configured to use the additional information.

If the MCLK and pixel clock are coherent in the sense that both are derived from a common clock (so that CTS values, indicative of counts of "pixel clock periods per audio clock period," are not expected to change during transmission of a single stream or set of streams of the audio data), the inventive transmitter can be implemented to include a programmable CTS register (rather than circuitry, e.g., elements 130 and 131 of the FIG. 15 transmitter, for producing CTS values). An external device loads an updated CTS value into the CTS register from time to time (preferably periodically), and the transmitter is configured to include the current CTS value (in the CTS register) in each Audio Clock Regeneration Packet transmitted to the receiver.

In preferred implementations of the inventive receiver, the audio clock regeneration ("ACR") circuitry is configured to assert (at an output) a regenerated version audio clock (MCLK) having frequency equal to any of several multiples M*Z*Fs of a first frequency Z*Fs (where Z is typically equal to 128), in response to the pixel clock, a time stamp value CTS, and at least one other value from the transmitter (e.g., a single value of the above-described numerator value "N," and a frequency multiplication value "M" asserted with any of several different values from the transmitter). For example, the receiver outputs MCLK with frequency equal to 128*Fs in response to M=1, MCLK with frequency equal to 256*Fs in response to M=2, and MCLK with frequency equal to 384*Fs in response to M=3.

In preferred implementations, the inventive receiver is configured to operate in two modes: a first mode in which it employs internal audio clock regeneration (ACR) circuitry (including a PLL) to regenerate an audio clock (MCLK) and optionally also to generate one or more clocks having frequency equal to multiples of this audio clock; and a second mode in which the internal ACR circuitry is bypassed and instead the CTS and N values and pixel clock received from the transmitter are asserted to an external device (e.g., external PLL unit 160 of FIG. 15) for MCLK clock regeneration. The receiver in the second mode can use the regenerated MCLK from the external device (including by stabilizing it in an internal PLL circuitry having a VCO) and/or pass it through to another device. In some such preferred embodiments, the receiver of FIG. 15 is modified slightly so that it is configured to output the intermediate clock generated by clock divider 132 in the receiver's second mode of operation (this intermediate clock has frequency equal to Z*Fs/N) to drive an external ACR device (typically including a PLL), and to receive the regenerated MCLK from the external ACR device. Such a modified version the FIG. 15 receiver can either output the regenerated MCLK that it receives from the external device, or can further process the regenerated MCLK (e.g., by stabilizing it in a PLL implementation of clock multiplier 133, or other internal PLL circuitry having a VCO). In some embodiments, the external ACR device that provides the regenerated MCLK to the modified FIG. 15 receiver (in its second mode of operation) includes a PLL (e.g., one including a voltage controlled crystal oscillator or "VCXO") that provides a stable recovered MCLK but only within a relatively narrow frequency range. In such case, the receiver can be configured to support such an external PLL by performing automatic clock stretching or shrinking (i.e., to generate a reduced or increased frequency version of the regenerated MCLK signal from the external PLL when needed), or by automatic sample repetition or dropping (i.e., by using the regenerated MCLK signal from the external PLL to sample audio data recovered from packets, but inserting repeated samples into or omitting some samples from, the recovered audio sample stream that it outputs, to produce an output audio sample stream having a sample rate that differs from the frequency of the recovered MCLK signal).

In some preferred embodiments, the inventive receiver employs a "fractional-N" frequency synthesizer PLL for audio clock regeneration. For example, a PLL implementation of clock multiplier 133 of the FIG. 15 receiver is configured, effectively, to multiply the frequency of the clock signal from circuit 132 by a non-integer value of "N." For example, such a frequency synthesizer PLL could be implemented by elements 134, 135, 136, and 137 of FIG. 16, where frequency divider 137 is a dual-modulus frequency divider. In such a PLL, phase detector 134 receives the outputs of frequency dividers 132 and 137 and generates in response a signal indicative of their relative phase, loop filter 135 receives and low-pass filters the output of phase detector 134 to generate an error signal indicative of the relative phase of the outputs of dividers 134 and 137), and VCO 136 asserts an output clock (having frequency very nearly equal to Z*Fs) in response to the error signal from filter 135. Where "N" is a non-integer value that satisfies I<N<I+1, where I is an integer, frequency divider 137 receives the output clock and outputs a clock having frequency Z*Fs/I or Z*Fs/I+1 in response thereto. With divider 137 operating cyclically with both moduli (modulus I, followed by modulus I+1, followed by modulus I, and so on), control of the duty cycle with which divider 137 operates with modulus I and the duty cycle with which divider 137 operates with modulus I+1 results in the following time-averaged value of the output clock frequency:

$$(Z*F^S)_{av} = W*F_s, \text{ with } Z<W<(Z+1).$$

Divider 137 should be configured so that its duty cycle is set by the difference between N and the integer most nearly equal to N, such that the time averaged value of the output clock frequency differs by no more than an acceptable amount from Z*Fs.

In a class of preferred embodiments, the inventive receiver employs circuitry including a narrow-range PLL for audio clock recovery (e.g., a PLL implementation of clock multiplier 133 of the FIG. 15 receiver that is stable and accurate only when the frequency of the clock input thereto, from frequency divider 132, is within a narrow VCO frequency range). The ACR circuitry in such a receiver would multiply the frequency of the regenerated clock signal output from the narrow-range PLL by any of several different numbers, where the PLL is capable only of outputting a regenerated clock having frequency in a narrow range, and regenerated clocks having frequency outside this range are or may be needed. However, the frequency multiplication will itself typically require a PLL, so that these embodiments of the invention are typically useful only if the combination of the narrow-range PLL (for clock regeneration) together with one or more additional PLLs (for frequency multiplication) is simpler or less expensive than a wider-range PLL for clock regeneration.

In some embodiments, the inventive receiver consists of at least two chips. A first chip includes most or all of the required circuitry except for a PLL employed for audio clock regeneration, and a second chip includes the PLL. Such a multi-chip module (MCM) implementation could significantly reduce noise, relative to a single-chip implementation of the same circuitry. Alternatively, the second chip (e.g., circuit 161 of FIG. 16) implements only a low-pass filter employed in the PLL, and the rest of the PLL and other clock recovery circuitry is implemented in the first chip. In versions of FIG. 16 implemented in accordance with the latter embodiment, low-pass filter 135 could be omitted and its functions performed by external filter 161, or filter 135 could be included and the receiver configured to operate using either internal filter 135 or external filter 161.

In another class of embodiments, the inventive receiver includes audio clock regeneration circuitry that uses a stable clock (e.g., a crystal clock) to generate "stable" time stamps (CTSx) from the pixel clock at the same time that the transmitter generates time stamps (CTSv) from the same pixel clock. The receiver uses the stable time stamps (CTSx) in place of the normally transmitted time stamps (CTSv) from the receiver when appropriate, to reduce errors in the regenerated audio clock (the audio clock regenerated using either the CTSx or the CTSv time stamps) that would otherwise occur due to jitter in the pixel clock.

Preferred embodiments of the inventive system use a time-stamp method to transmit the audio clock (e.g., MCLK) between transmitter and receiver, in which digital cycle time stamp (CTS) values are determined by counting the number of pixel clock cycles (VCLK cycles) in each period of MCLK and the CTS values are transmitted to the receiver. In the receiver, MCLK is reconstructed by counting off "CTS" VCLK cycles per period of the regenerated MCLK. In this process, there can be many sources of jitter, such as jitter on the original MCLK as well as jitter due to phase alignment of the original MCLK and VCLK ("VLCK" denotes the pixel clock). Since MCLK and VCLK may have independent sources, the CTS value will, in general, vary with time and therefore introduce jitter into the reconstructed MCLK. While these and other sources of jitter are important and can affect the final audio quality, they can all, with the exception of the VCLK jitter, be managed by other techniques (disclosed herein) so as not to degrade the recovered audio quality.

The problem addressed by the embodiments to be described next is degradation of recovered audio quality due to VCLK jitter. Such degradation is clearly seen in the following situation. Assume that the MCLK frequency is 1 kHz (1 ms period) and VCLK has a 0.5 kHz (2 ms period) jitter component, and that the CTS value is measured during the first half cycle of the VCLK jitter (when the VCLK period is longer than average, for instance, resulting in a CTS count that is smaller than if the average period were used) and then this smaller-than-average CTS value is transmitted across the link and used to regenerate MCLK during the second half of the VCLK jitter cycle (when the VCLK period is shorter than average). Using this smaller-than-average CTS value to count out VCLK periods that are also shorter-than-average will result in a regenerated MCLK period being shorter than the ideal MCLK. In fact the MCLK jitter is an amplified (doubled) version of the VCLK jitter. This is a result of using VCLK on each side of the link. This is the worst case and could potentially degrade the audio quality significantly.

So to summarize, the problem of transferring VCLK jitter to MCLK occurs when the jitter on VCLK is in one phase during the measurement of CTS and in the other phase during MCLK regeneration. For the above-described worst case situation, the particular time interval between the CTS measurement and the MCLK regeneration is important only to the extent that it affects the maximum frequency of VLCK jitter that can be corrected in accordance with the present invention. Basically, if the VCLK jitter is changing quickly compared to the time needed to measure, transmit, and use a particular CTS value, then the VLCK jitter cannot be effectively filtered out. So, a longer delay in the CTS path means that instead of filtering out VCLK jitter up to 500 Hz (the best case for a 1 kHz CTS clock rate), for example, the filtering can only correct jitter having frequencies much lower than 500 Hz.

To overcome the VCLK jitter problem, a stable (negligible jitter) time base is used at the receiver, and "CTS" VCLK cycles are counted off in the receiver using the stable time base at the same time that the "CTS" VCLK cycles are counted off in the transmitter to measure the MCLK period. Once the count in the receiver using the stable time base is known, it can be used at any later time to regenerate MCLK without introducing jitter since it uses a stable time base.

The stable time base at the receiver is preferably implemented by using a crystal external to the receiver to provide a stable clock (XCLK).

The main difficulties in implementing the described scheme are two-fold. First, the procedure requires that the measurement of the number of VCLKs in a MCLK period in the transmitter side ("CTSv") occurs at the same time that the number of XCLK cycles for the same MCLK period are counted off in the receiver (the latter count is "CTSx"). That is, the counting must start at the same (or nearly same) time on both sides of the link. This will require a method of synchronizing the start of counting in the transmitter and receiver. The second difficulty is that the receiver needs to count (in XCLK cycles) the same CTSv number of VCLK cycles that is simultaneously being measured in the transmitter, and since the CTSv values can vary from measurement to measurement the receiver will not know exactly what value was measured in the transmitter until the packet containing the CTSv value is sent across the link. This will require a method for the receiver to anticipate the CTSv value currently being measured in the transmitter, such that the counting also stops at the same (or nearly same) time on both sides of the link.

Many different methods for synchronizing the counts by the transmitter and receiver counting is acceptable. In general the synchronization will require using a signal that is common to both the transmitter and receiver (such as VSYNC) as an origin from which to define the interval (such as some number of VCLK cycles) at which time the counting should start. By sending such a signal across the link, the CTSx counting in the receiver, which may have started earlier, can be delayed by the appropriate amount to synchronize the counting in the transmitter and receiver. Any resyncing process should be able to deal with the situation that the MCLK and video signal sources are independent.

The method by which the receiver anticipates the CTSv value currently being measured in the transmitter, such that the counting also stops at the same (or nearly same) time on both sides of the link can exploit the fact that the CTS values are typically not expected to vary widely over time (typically, the CTS values are expected to vary from a typical value by as little as plus or minus one). This then allows the receiver to count and store CTSx values for a small range of CTSv values, and then when the actual CTSv value is sent across the link, the receiver merely uses the actual CTSv value as a pointer to the correct value of CTSx. This method requires that the CTSx values be buffered to the extent of the worst case time delay of the CTSv packet being sent across the link before it can be used to regenerate a period of MCLK. This is typically feasible since the stable time base allows such latency without introducing jitter.

The timing diagram of FIG. 23 shows one example of how the transmitter and receiver counting can be resynchronized. The value of the CTSv counter in the transmitter is captured at the leading edge of VSYNC (this value is identified as "CTS_sync" in FIG. 23) and sent across the link with high priority. Using CTS_sync and the value of CTSv for the corresponding MCLK period (this value is identified as "CTSv_0" in FIG. 23), the delay between the transmitter counting and the receiver counting can be determined if the receiver counting initially started at the leading edge of VSYNC. Then the counting in the receiver is approximately synced to the transmitter counting, at which point the VCLK jitter will no longer affect the regenerated MCLK (because the receiver will use the appropriate CTSx values for MCLK regeneration).

In some variations, a time stamp for a reference clock (generated from MCLK) is sent across the link, instead of a timestamp for MCLK itself. The regenerated reference clock is then used to reproduce MCLK.

In preferred implementations, latency of the synchronizing signal between the transmitter and receiver is handled carefully. This latency could introduce a fixed offset between the transmitter and receiver counting since the receiver will actually sync to a delayed version of the VSYNC signal asserted to the transmitter. This can be acceptable if this offset is small, but the maximum latency would need to be controlled. Another option is to send the transmitter latency across the link in a packet so that the receiver can use it to determine how to make the appropriate adjustment.

Since the receiver only counts to some typical CTSv value, the starting point of the counting needs to be corrected in an ongoing manner as the actual CTSv values become available at the receiver. Since it is critical that neither VCLK cycles nor XCLK cycles are dropped or added in the counting (in order to prevent long term drift), if the start of counting is adjusted then the change will need to be accounted for by adjusting previous CTSx values.

In variations on the described embodiments, the CTS_sync value is sent once per video frame (assuming it is based on VSYNC). This allows the receiver to make small corrections on a frame basis that would prevent long term drift of the transmitter-receiver counting synchronization. In an alternate implementation, the receiver asserts an interrupt to the host when appropriate to indicate to the host that it needs to have the transmitter send a CTS_sync value in order to synchronize counting.

If the VCLK jitter is not excessively severe, it is possible in some cases to use the receiver without a crystal clock in a standard mode of operation in which VCLK jitter is not addressed (in accordance with the invention) for lower quality audio applications, while for higher audio quality applications the external crystal is provided and employed as described above to remove the effect of VCLK jitter.

The described technique for preventing the transfer of VCLK jitter to the regenerated MCLK can allow the support of spread spectrum clocking on the link (for which the frequency of the VCLK is purposely varied in order to reduce EMI). The implementation in the receiver would need to support the worst case frequency variation.

An alternative method to storing many values of CTSx and then using the value of CTSv to select the correct stored value is to implement the receiver to measure only the CTSx value corresponding to the typical CTSv value, then calculate the correction to CTSx when the CTSv value is available. The latter method is expected to be useful in situations where the CTSv variation is much larger than +/−1. This may be the case when using spread spectrum clocking on the link. Since there would be many clock cycles to do the calculation, a hardware implementation would likely not require a large area penalty. Synchronizing and adjusting the start of counting in the receiver would still be required.

Another class of preferred embodiments implements digital filtering (low pass filtering) of the CTS values sent to the receiver. During clock regeneration (e.g., audio clock regeneration) using transmitted CTS values (a time-stamp methodology), the actual CTS values that are transmitted can vary from their average value (averaged over a short period) due to quantization error as well as pixel clock jitter (jitter in the clock employed for sampling the clock to be regenerated). This variation produces jitter on the regenerated clock.

In some preferred embodiments, the CTS values are digitally filtered to reduce the regenerated clock jitter caused by quantization error and pixel clock jitter. The digital filter functions as a low-pass filter to suppress the higher frequency component of the time-stamp variation, and correspondingly suppress the higher frequency component of the regenerated clock jitter.

The required word length for the filter output can be larger than the original time-stamped value. In other words, the digitally filtered time-stamped value will have a fractional part in comparison to the original integer time-stamp (i.e. 74.25 instead of 74). If the longer time-stamp words are simply truncated to an integer, the filter will still function to attenuate the higher frequency jitter. However, the average of the truncated time-stamp values may not equal the average of the original sequence of time-stamp values, such that the regenerated clock frequency would not be accurate and the clock would have long term drift relative to the original clock. If there is also a constant stream of data being transmitted that will be clocked by the regenerated clock, such drift in the regenerate clock will cause a data-rate mismatch between the data source and sink and will produce gaps or dropped data on the sink side. In addition to long term drift, truncation of the filtered time-stamp values will result in a truncation error that will increase the regenerated clock jitter.

Therefore it is important that the fractional part of the filtered CTS value be retained when regenerating the clock. In some embodiments, a fractional-N type PLL is employed in the receiver (as described above) to preserve the longer words.

One important application of this class of embodiments is the transmission of a digital audio clock using the time-stamp method. In particular, when the time-stamp update rate is near or in the audio band, then jitter produced by time-stamp variation may be modulated into the final analog audio causing a degradation in audio quality. By using a digital filter to suppress jitter frequencies in the audio band, the effect of the jitter on the audio quality can be reduced or eliminated. To produce the same benefits using analog techniques requires very low bandwidth clock regeneration PLL's (e.g., PLLs with bandwidths of on the order of 100 Hz) which are difficult to integrate and require considerable effort to design, test, and manufacture (both at the IC level and at the board level). In contrast, a digital method, once properly designed, is expected to be very straightforward to manufacture and test, and easy to apply on a board level design.

In preferred embodiments, the inventive transmitter is configured to accept input video in ITU-BT.656 or YCbCr 4:2:2 format, and to convert input video in ITU-BT.656 format to YCbCr 4:2:2 format for transmission. Preferably, the transmitter can accept (on one channel) two streams (time-division-multiplexed together) of ITU-BT.656 or YCbCr 4:2:2 video (each stream comprising N-bit components), and convert the input video to YCbCr 4:2:2 format (comprising 2N-bit components, each 2N-bit component indicative of two components of the input video) for transmission.

In other preferred embodiments, the inventive transmitter is configured to accept input video in DDR YCbCr 4:4:4 format (DDR denotes "double data rate." DDR format video can be written to a DDR RAM, a type of synchronous DRAM, on falling clock edges as well as rising clock edges). The transmitter can put such input video into conventional (non-DDR) YCbCr 4:4:4 format for transmission. Alternatively, or additionally, the transmitter is configured to accept input video in DDR YCbCr 4:2:2 format and put the input video into conventional YCbCr 4:2:2 format for transmission. Preferably, the transmitter can accept (on one channel) two streams of input video (time-division-multiplexed together) in DDR ITU-BT.656 format and place the input video in conventional YCbCr 4:2:2 format for transmission.

In other preferred embodiments, the inventive transmitter is configured to accept input video in any of a variety of YCbCr formats, with sync bits embedded with the data or with separate HSYNC and VSYNC (to allow support for a large number of source devices), and is configured to reformat the input video into YCbCr 4:4:4 or YCbCr 4:2:2 format video for transmission.

In other preferred embodiments, the inventive transmitter is configured to accept input video in YCbCr 4:2:2 format and includes upconversion circuitry for converting the input data to data in YCbCr 4:4:4 format for transmission.

In other preferred embodiments, the inventive transmitter is configured to accept input video in any of a variety of YCbCr formats and includes YCbCr to RGB color space conversion circuitry (with programmable or fixed coefficients) and universal mapping circuitry for converting the input video to RGB format for transmission.

In preferred embodiments, the inventive receiver is configured to output a stream of video in ITU-BT.656 format and includes multiplexer circuitry for placing the Y, Cr, and Cb components of recovered video in YCbCr 4:2:2 format into the ITU-BT.656 format. Preferably the receiver can assert, with a stream of ITU-BT.656 output video, separate HSYNC and VSYNC signals (whose timing matches that of the sync bits embedded in the ITU-BT.656 stream). Preferably, the receiver is configured to output (on one channel) two streams (time-division-multiplexed together) of ITU-BT.656 video (each stream comprising N-bit components) in response to recovered YCbCr 4:2:2 video (comprising 2N-bit components, each 2N-bit component indicative of two components of the output video). More generally, the receiver is configured to put recovered video in YCbCr 4:2:2 format into a desired output format that can include sync bits embedded in a stream of output Y, Cr, and Cb components (for example, the ITU-BT.656 format), and/or HSYNC and VSYNC output separately from a stream of output Y, Cr, and Cb components.

In other preferred embodiments, the inventive receiver is configured to output video in DDR YCbCr 4:4:4, DDR YCbCr 4:2:2, or DDR ITU-BT.656 format (DDR denotes "double data rate") and includes circuitry for reformatting recovered video in conventional (non-DDR) YCbCr 4:4:4 or YCbCr 4:2:2 format into the DDR YCbCr 4:4:4, DDR YCbCr 4:2:2, or DDR ITU-BT.656 output format.

In other preferred embodiments, the inventive receiver is configured to output video in any of a variety of YCbCr formats and includes universal mapping circuitry that converts recovered video in conventional YCbCr 4:4:4 or YCbCr 4:2:2 format into any desired one of the output formats.

In other preferred embodiments, the inventive receiver includes circuitry for performing downconversion or upconversion on recovered video (e.g., to convert recovered video in YCbCr 4:4:4 format to output video in YCbCr 4:2:2 format or recovered video in YCbCr 4:2:2 format to output video in YCbCr 4:4:4 format).

In other preferred embodiments, the inventive receiver is configured to output video in any of a variety of YCbCr formats and includes RGB to YCbCr color space conversion circuitry (with programmable or fixed coefficients) and universal mapping circuitry for converting recovered video in RGB format into any desired one of the output formats.

We next describe a class of embodiments of the invention which implement an improved method for link integrity checking.

Content protection systems, including preferred embodiments of the inventive system which encrypt video data and/or packetized auxiliary data for transmission over a serial link, usually require some method to verify that the system is still operating properly. Proper operation of the system typically includes the requirement that data transmitted over the link are being encrypted by the transmitter and decrypted by the receiver, and that proper synchronization of the encryption and decryption operations is being maintained.

One verification method is to periodically read a "result" vector from each side of the link. If the vector is changing, and doing so in the expected sequence (usually with the same value at each side of the link), then this is a strong indication that the system is working properly. The conventional HDCP protocol employs such a method, known as a "link integrity check."

A link integrity check is not a foolproof method in all cases, however. Such a method by itself cannot sample both sides of the link at exactly the same moment in time. Further, the sampling rate may be different than the rate at which the result vectors change (indeed, the two events may be entirely asynchronous). These factors lead to anomalies in which the link may appear to be broken, when it is not. Even worse, the link may appear fine, when it is in fact broken.

Preferred embodiments of the inventive system implement an improved method for link integrity checking.

While the following discussion assumes that the HDCP content protection protocol being used, some embodiments of the inventive system that embody a link integrity checking aspect of the invention implement a content protection protocol other than HDCP. The inventive link integrity checking method and apparatus is also useful in systems which transmit encrypted video over a serial link, whether or not the systems are also configured to transmit packets of encrypted audio data (or other auxiliary data) over the link in data islands or otherwise between active video periods.

In some embodiments, the transmitter of the inventive system encrypts video and packets of audio data using HDCP, and performs a link integrity check function once every 128 video frames to capture a 16-bit result vector (called $R_i$) from both the transmitter and receiver, and to compare these values every two seconds or so to make sure that they match. This scheme has the following faults:

there is no guarantee that the cipher engines in the transmitter and receiver are exactly synchronized. If they are off only slightly, then the $R_i$ values will appear to match most of the time;

the rate at which "snapshots" (samples) of the $R_i$ values are taken is not related to the rate at which they are compared. The rates might be completely asynchronous, in which case the transmitter and receiver will occasionally show different values because the sample straddles a snapshot boundary; and conversely, the sample rate might be synchronous (or nearly so). This prevents the occasional straddling error. However, if integrity checks ever do straddle a snapshot boundary then the situation becomes pathological, and may never be resolved.

Figure 17:
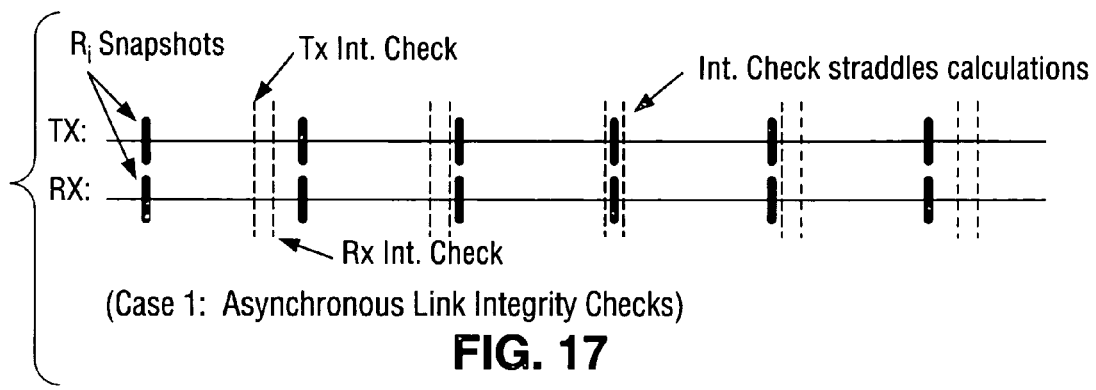

To illustrate these issues, first consider FIG. 17. As indicated in FIG. 17, the $R_i$ snapshots for the transmitter and receiver are exactly synchronized, as they should be. The link integrity checks occur at a similar, though slightly different rate. Most of the time both the transmitter integrity check and the receiver integrity check occur in the same "window" between Ri snapshots. This means that both $R_i$ values will match, and the link integrity check will succeed. In one case though, the transmitter and receiver parts of the integrity check straddles an $R_i$ snapshot. This means that the $R_i$ values seen will differ. Typically, systems that implement HDCP are configured to perform the integrity check again a short time later if such an event occurs.

Figure 18:
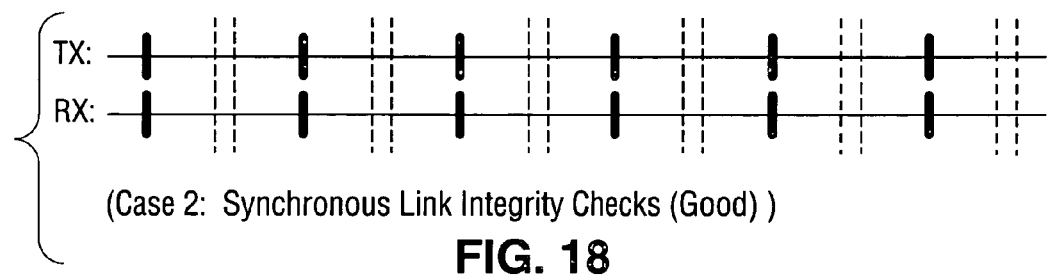
Figure 19:
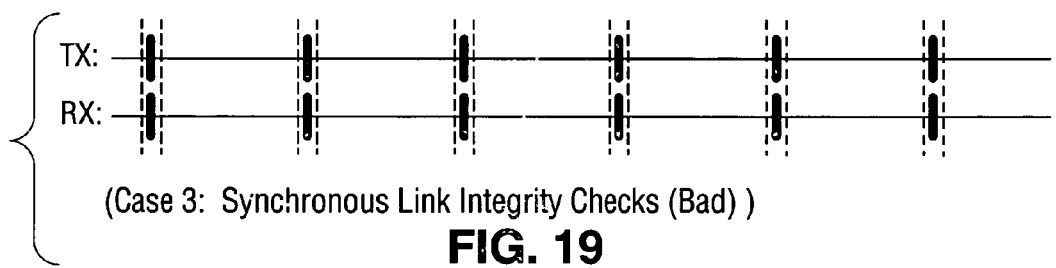

Next, with reference to FIGS. 18 and 19, consider the situation that the link integrity checks do occur at exactly the same rate as the $R_i$ snapshots. Typical conventional HDCP systems perform link integrity checks in this way. Usually, as shown in FIG. 18, because the link integrity checks will always occur at the same relative point in time, and the $R_i$ values will always match. However, as shown in FIG. 19, there is a pathological (hence very bad) case in which the link integrity check always straddles an $R_i$ snapshot, and so the $R_i$ values never match.

In all of the noted cases, redoing the link integrity check at the earliest opportunity (when one check results in $R_i$ values that do not match) provides a reliable mechanism for establishing the actual link integrity, though this adds complexity and an unpredictable additional burden.

Figure 20:
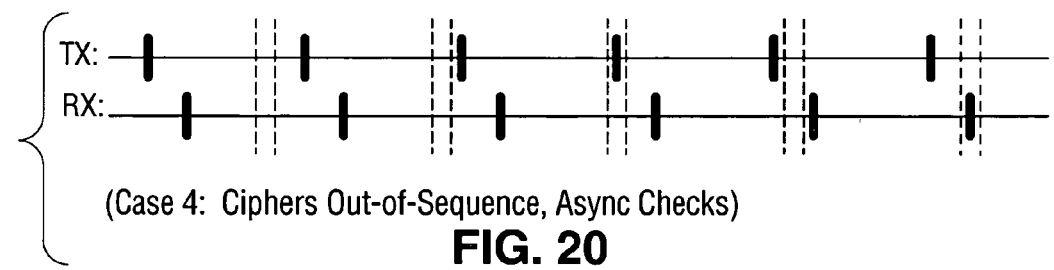
Figure 21:
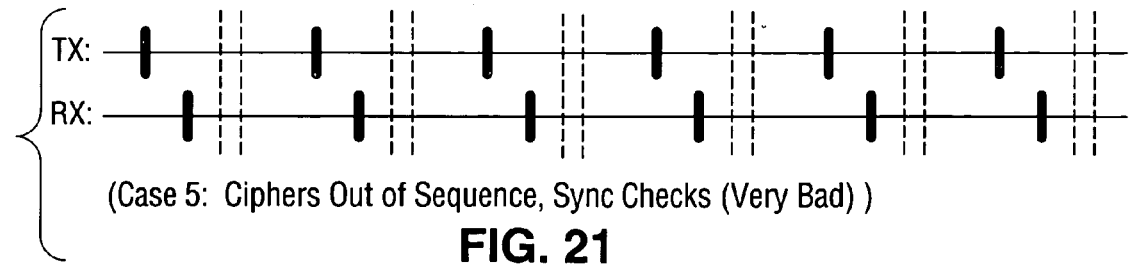

Next, with reference to FIGS. 20 and 21, we consider cases in which the transmitter and receiver cipher engines are not aligned properly. This can occur if there are VSYNC glitches, for example. In such cases, no usable video will be transmitted across the link. As shown in FIG. 20, however, it can occur that in many cases, the link integrity checks occur in the same window between snapshots, and so the $R_i$ values will appear to be correct. Thus, the system will appear to be operating normally although it is not.

Eventually, the integrity check may straddle an $R_i$ snapshot (as in the fourth integrity check from the left in FIG. 20, but there is no guarantee that this will occur in a timely fashion, or at all. The length of time that elapses between such lucky events is inversely proportional to the beat frequency formed by the $R_i$ snapshot interval and the link integrity interval, and this beat frequency may be zero.

This worst case scenario is shown in FIG. 21. Here, the link integrity frequency is synchronous (or nearly so) to the $R_i$ snapshots, but out-of-phase far enough that it is blind to the sequence errors in the cipher state machines. This system is not working properly, but the link integrity checks cannot recognize that fact until some external agent (e.g., a frustrated user) intervenes.

To prevent the noted problems, and guarantee that improper operation of the system is detected quickly and accurately, one or more of the following improvements are made in accordance with the present invention:

the transmitter and receiver are implemented so as to reduce or eliminate the errors that can cause the transmitter and receiver cipher engines to get out-of-phase;

the link integrity check is done in a manner that ensures that $R_i$ snapshots occur at the same time in both the receiver and transmitter, regardless of phase;

the link integrity checks occur with a known relationship to the $R_i$ snapshots. This does not mean they must be synchronous, only that they cannot be totally asynchronous. In particular, it must be possible to guarantee that the Link Integrity Check does not straddle an $R_i$ snapshot; and a method is implemented for directly checking the received, decrypted data for conditions indicative of improper system operation (e.g., "snow" conditions). For example, periodically (or from time to time), a known data pattern is input to the transmitter, encrypted, transmitted, received, decrypted, and then checked to see if the received decrypted pattern matches the known data pattern.

The transmitter and receiver cipher engines can get out of phase if certain control signals glitch. For example, if the receiver does not see a VSYNC signal it will fall behind. If the receiver gets an extra VSYNC signal it will get ahead. If this happens then the receiver will not be able to decrypt properly, and the screen will show "snow".

If the point where the receiver takes a "snapshot" of the $R_i$ value also moves in the same way (falls behind or gets ahead), then the receiver will continue to produce the correct $R_i$ values. This is because the $R_i$ sequence is a function only of constant values, and the frame sequence. It does not depend on the data in-between. This leads to a situation very like that in FIG. 20 or FIG. 21, where the link integrity check will be correct most of the time. Indeed, if the receiver is either one frame ahead or behind, then it's $R_i$ value will exactly match that in the transmitter on 127 out of 128 frames. This is a very large window, and so it may take quite a while before the error is discovered.

One way to reduce the likelihood of this scenario is to isolate the state machine that runs the cipher from the state machine that controls when the $R_i$ snapshots occur, by employing different signals to control the advance of each. In this way, a signal fault may cause one machine to get out of sync, but is less likely to affect the other. For example, VSYNC could be used to control the advance of the cipher engine, and CTL3 could be used to control the advance of the snapshot counter. If the snapshot occurs at a different relative point in the cipher engine's cycle, then the $R_i$ sequence will be very different, and this will become immediately obvious.

Another alternative is to provide either the transmitter or receiver with an "interrupt" capability that allows it to signal when a Link Integrity Check should occur. This function should generally be in the element of the system that initiates these checks (e.g., in the transmitter in a system that implements HDCP). This method works well if the interrupt latency time is always less than one video frame, because it guarantees that there will be no straddling, and that errors in which the receiver gets one or more frames ahead will be detected. It is expected that this will be the more common case, because it is more likely that a glitch will cause an additional VSYNC edge than that it will entirely eliminate a VSYNC. This method will not work well if the interrupt latency time spans multiple frames (unless it is unusually predictable), or if the receiver cipher engine gets one or more frames behind.

An even better approach is to design the receiver and/or transmitter to take a snapshot only when an external stimulus of some form is applied. In this way it can be guaranteed that the transmitter and receiver always take their snapshots at the same time (thus also highlighting any discrepancies in the cipher engine states). For example, a command is provided to the transmitter that causes the transmitter to send request for a snapshot to both its own cipher engine and that in the receiver. Then both the transmitter and receiver wait for an appropriate synchronizing event (such as the next leading edge of VSYNC) and then both take the snapshot. Then the transmitter and/or receiver signals completion of the original command. At this point the system (e.g., software or firmware implemented by the system) can take its time doing the Link Integrity Check, because a new snapshot cannot happen until the next time a command is issued.

This approach has a number of advantages. First, the snapshots always occur at the same time on both sides of the link. Second, the Link Integrity Check can be reliably completed before the next snapshot (due to the interlocks built into the protocol). Third, the Link Integrity Checks can be done as frequently or as rarely as necessary to suit the needs of the system. The rate can even vary from one moment to the next, as necessary. On this last point, it may be useful or desirable to include a "deadman timer" in the transmitter to verify that the Link Integrity Checks are performed at least as often as some minimally acceptable interval. Alternatively, the receiver could be configured to include the deadman timer, although it will typically be preferable for the transmitter to include it, since the transmitter is typically responsible for guaranteeing that protected content never leaves a system without suitable encryption, and so the transmitter is the logical candidate for ensuring the proper checks and balances are in place.

In another class of embodiments, a known data pattern is provided to the transmitter, or existing data is modified in a predetermined way, and the result is then encrypted and transmitted. Then when the receiver decrypts the data it can then check for the expected results. If the receiver finds the expected results then the decryption can be assumed to be working properly. Otherwise it should be assumed that the encryption/decryption function is not working properly. This approach has the advantage of being very direct: it does not rely on indirect evidence from result vectors such as $R_i$. This approach is also backward compatible with existing protocols, and can be added to conventional HDCP systems with a small amount of external or internal logic, and no other changes to the link's behavior. For example, suppose that one defines the first two pixels in every frame as "A" and "B" respectively. These pixels represent a very small portion of the upper left portion of the screen. They are often a background color, and also frequently the same color, or very nearly so. The transmitter can be configured to modify the least significant bits of pixels A and B such that they are always equal in pixels A and B, before encrypting and transmitting the modified video. For example, the transmitter can modify bit [0] in each of the three color components of pixel A and B such that A red[0]=B red[0], A green[0]=B green[0], and A blue[0]=B blue[0]. The exact algorithm employed can vary among implementations, and can even be adaptive (such that it has the least possible impact on the overall picture). The only requirement is that the end result is modified data have predetermined (known) form.

When the modified frame is encrypted, and then decrypted, the receiver can then check for predetermined pattern in the decrypted data. The receiver should do this in a way that accounts for a small number of bit errors in the link. It might do this by setting a threshold for the perceived result. For example, satisfying two of the three above-specified equations might be enough. Or it might average the results over some number of frames. In either case, the receiver should be configured to find the proper result only if it the encryption/decryption function is working properly. The receiver can then signal this result back to the host in some way. One method for doing so is the direct method of setting a bit in a register. Another method of signaling the result is to do so indirectly (e.g., by intentionally altering the $R_i$ value). The latter method has the advantage of working well in a repeater environment, in which a break in any link (the link between any transmitter-receiver pair) can readily be made to propagate upstream toward a host.

This approach described in the two previous paragraphs is backward compatible in the following ways: a "new" transmitter can implement this with no adverse affects on an "old" receiver; a "new" receiver can implement this, but cannot enable the check when being used with an "old" transmitter; and "old" transmitters and receivers can readily add this function in external logic, by simply tapping into the data path in the appropriate way.

If backward compatibility is not critical, the known data pattern can be implemented in other ways that do not affect the video picture in any way. For example, special "test" packets can be inserted into the data stream, or "test" data can be inserted in other packets or places. Video lines could also be stretched to accommodate the "test" data, and then shrunk back to original size in the receiver.

It should be understood that while certain forms of the present invention are illustrated and described herein, the invention is defined by the claims and is not to be limited to the specific embodiments described and shown.

What is claimed is:

1. A communication system, including:
    a receiver;
    a transmitter; and
    a serial link comprising at least one video channel between the transmitter and the receiver, wherein the transmitter is configured to receive video data and audio data, to generate encoded video data and encoded audio data by encoding the video data and audio data, to transmit code words indicative of the encoded video data over the video channel to the receiver in response to a pixel clock during active video periods, and to transmit packets including encoded auxiliary data to the receiver during data islands by transmitting code words indicative of the packets over the link in response to the pixel clock, wherein each of the data islands is a time interval that neither coincides with nor overlaps any of the active video periods,
    wherein the encoded auxiliary data include the encoded audio data, the transmitter is configured to include time code data in at least some of the packets, and the time code data together with the pixel clock are indicative of an audio clock for the audio data.

2. The system of claim 1, wherein the transmitter is configured to transmit control data to the receiver over the video channel during control data periods, wherein the control data periods neither coincide with nor overlap any of the data islands and neither coincide with nor overlap any of the active video periods.

3. The system of claim 1, wherein the link is a TMDS link having a clock channel, the code words indicative of the encoded video data and the code words indicative of the packets are TMDS code words, and the transmitter is configured to transmit the pixel clock over the clock channel.

4. The system of claim 1, wherein the link has a clock channel, the transmitter is configured to transmit the pixel clock to the receiver over the clock channel, the time code data are indicative of time stamps, each of at least some of the packets includes time code data indicative of one of the time stamps, and the receiver is configured to regenerate the audio clock in response to the pixel clock and the time code data.

5. The system of claim 4, wherein the transmitter includes:
    a frequency divider coupled to receive a master audio clock having frequency, F, and configured to generate an intermediate clock having frequency F/N in response to the master audio clock, where N is a denominator value; and
    a cycle time counter coupled to receive the intermediate clock and the pixel clock, and configured to generate the time stamps such that each of the time stamps is indicative of a number of pixel clock cycles that have elapsed during the most recent cycle of the intermediate clock.

6. The system of claim 5, wherein each of at least some of the packets includes time code data indicative of one of the time stamps and the denominator value N employed to generate said one of the time stamps.

7. The system of claim 1, wherein each of the packets has a header, at least two sub-packets, and a format selected from a number of predetermined formats, and the header of each packet is indicative of the format of the packet.

8. The system of claim 7, wherein the link has a clock channel, the transmitter is configured to transmit the pixel clock to the receiver over the clock channel, the time code data are indicative of time stamps, the packets include clock regeneration packets, at least one of the sub-packets of each of the clock regeneration packets includes time code data indicative of one of the time stamps, and the receiver is configured to regenerate the audio clock in response to the pixel clock and the time code data.

9. The system of claim 8, wherein the header of each of the clock regeneration packets includes a clock regeneration packet code in a predetermined time slot.

10. The system of claim 8, wherein the transmitter includes:
- a frequency divider coupled to receive a master audio clock having frequency F, and configured to generate an intermediate clock having frequency F/N in response to the master audio clock, where N is a denominator value; and
- a cycle time counter coupled to receive the intermediate clock and the pixel clock, and configured to generate the time stamps, wherein each of the time stamps is indicative of the number of pixel clock cycles that have elapsed during the most recent cycle of the intermediate clock.

11. The system of claim 10, wherein at least one of the sub-packets of each of the clock regeneration packets includes time code data indicative of one of the time stamps and time code data indicative of the denominator value N employed to generate said one of the time stamps.

12. A transmitter configured to be coupled to a serial link having at least one video channel and at least one video clock channel, said transmitter including:
- at least one input coupled to receive video data and at least one input coupled to receive audio data;
- at least two outputs configured to be coupled to the link, including a clock output configured to be coupled to the video clock channel; and
- circuitry, coupled between the outputs and each said input, and configured to generate encoded video data and encoded audio data by encoding the video data and audio data, to assert code words indicative of the encoded video data to at least one of the outputs in response to a pixel clock during active video periods, to assert packets including encoded auxiliary data to at least one of the outputs during data islands, and to assert the pixel clock to the clock output,
- wherein each of the data islands is a time interval that neither coincides with nor overlaps any of the active video periods, the encoded auxiliary data include the encoded audio data, the circuitry is configured to include time code data in at least some of the packets, the time code data are indicative of time stamps, and the time code data together with the pixel clock are indicative of an audio clock for the audio data.

13. The transmitter of claim 12, wherein the circuitry includes:
- a frequency divider coupled to receive a master audio clock having frequency F and configured to generate an intermediate clock having frequency F/N in response to the master audio clock, where N is a denominator value; and
- a cycle time counter, coupled to receive the intermediate clock and the pixel clock, and configured to generate data indicative of the time stamps such that each of the time stamps is indicative of a number of cycles of the pixel clock that have elapsed during the most recent cycle of the intermediate clock.

14. The transmitter of claim 13, wherein each of at least some of the packets includes time code data indicative of one of the time stamps and time code data indicative of the denominator value N employed to generate said one of the time stamps.

15. The transmitter of claim 13, wherein the frequency divider is configured to generate the intermediate clock when the frequency, F, of the master audio clock satisfies $F=Z*F_s$, where $F_s$ is an audio sample rate, $Z=Y*128$, and Y is any integer in a set of integers including at least the integer one and the integer two.

16. The transmitter of claim 13, wherein the circuitry is configured to encode audio data having sample rate $F_s$, where $F_s$ is any sample rate in a set of at least two different sample rates, and the frequency divider is configured to generate the intermediate clock when the frequency, F, of the master audio clock satisfies $F=Z*F_L$, where $F_L$ is the greatest common factor of the sample rates in said set, and Z is an integer.

17. The transmitter of claim 13, wherein the circuitry is coupled to receive an input master audio clock, and configured to generate the master audio clock from the input master audio clock by performing automatic phase adjustment such that the master audio clock is synchronized with the pixel clock.

18. The transmitter of claim 13, wherein the circuitry is coupled to receive an input master audio clock, and configured to generate the master audio clock from the input master audio clock by generating multiple phase-shifted versions of the input master audio clock, and automatically selecting as the master audio clock one of the phase-shifted versions that is likely to result in reduced or minimized jitter in a sequence of the time stamps to be generated in response to assertion of said one of the phase-shifted versions to the frequency divider.

19. The transmitter of claim 18, wherein the circuitry is configured to generate a first phase-shifted version of the input master audio clock by sampling the input master audio clock with the pixel clock, and to generate a second phase-shifted version of the input master audio clock by sampling the input master audio clock with an inverted version of the pixel clock.

20. The transmitter of claim 18, wherein the circuitry is configured to generate a first phase-shifted version of the input master audio clock by sampling the input master audio clock with a delayed or phase-shifted version of the pixel clock, and to generate a second phase-shifted version of the input master audio clock by sampling the input master audio clock with another delayed or phase-shifted version of the pixel clock.

21. The transmitter of claim 13, wherein the circuitry is coupled to receive an input master audio clock, and configured to generate the master audio clock from the input master audio clock by sampling the input master audio clock with a clock having frequency greater than the frequency of the pixel clock.

22. The transmitter of claim 21, wherein the circuitry is configured to generate the master audio clock from the input master audio clock by sampling the input master audio clock on both rising and falling edges of the pixel clock.

23. The transmitter of claim 12, wherein the circuitry includes:
- a programmable register which stores a time stamp value, and wherein the circuitry is configured to include time code data indicative of said time stamp value in each of at least some of the packets.

24. The transmitter of claim 23, wherein the time stamp value is indicative of the number of pixel clock cycles that occur during N consecutive cycles of a master audio clock, where N is a denominator value.

25. A receiver configured to be coupled to a serial link having at least one video channel and at least one video clock channel, said receiver including:

at least two inputs configured to be coupled to the link, including a clock input configured to be coupled to the video clock channel;

at least one video output for asserting video data recovered from the link and at least one audio output for asserting audio data recovered from the link; and circuitry, coupled between the inputs and each said output, and configured to receive a pixel clock from the clock input, to generate recovered video data including by decoding encoded video data received at at least one of the inputs during active video periods in response to the pixel clock, to assert the recovered video data to the at least one video output, to generate decoded data including by decoding code words of packets of encoded auxiliary data received at at least one of the inputs during data islands in response to the pixel clock, to generate at least one stream of audio data from the decoded data, and to assert each said stream of audio data to the at least one audio output, wherein each of the data islands is a time interval that neither coincides with nor overlaps any of the active video periods, wherein at least some of the decoded data are time code data indicative of time stamps, and the time code data together with the pixel clock are indicative of an audio clock for the audio data.

26. The receiver of claim 25, wherein at least some of the decoded data are indicative of a denominator value N that has been employed to generate the time stamps, and wherein the circuitry includes:

a frequency divider, coupled to receive the pixel clock and the time code data indicative of time stamps, and configured to generate an intermediate clock having frequency M/N in response thereto, where M is a master audio clock frequency; and a PLL, coupled to receive the intermediate clock and the decoded data indicative of the denominator value N, and configured to generate in response thereto a regenerated master audio clock having the frequency M.

27. The receiver of claim 26, wherein the frequency divider and the PLL are configured to generate the intermediate clock and the regenerated master audio clock such that the master audio clock frequency satisfies $M=Z*F_s$, where $F_s$, is an audio sample rate, $Z=Y*128$, and Y is any integer in a set of integers including at least the integer one and the integer two.

28. The receiver of claim 26, wherein the stream of audio data comprises audio data having sample rate $F_s$, where $F_s$ is any sample rate in a set of at least two different sample rates, the frequency divider and the PLL are configured to generate the intermediate clock and the regenerated master audio clock such that the master audio clock frequency satisfies $M=Z*F_L$, where $F_L$ is the greatest common factor of the sample rates in said set and Z is an integer, and wherein the circuitry is configured to generate a frequency-multiplied version of the regenerated master audio clock having frequency $X*M$, where X is a number greater than one, and $F_s=X*F_L$ is one of the at least two different sample rates.

29. The receiver of claim 26, wherein the receiver has at least one clock generation output configured to be coupled to an external clock regeneration device, the circuitry is configured to operate in at least a first mode and a second mode, the circuitry in the first mode employs the frequency divider and the PLL to generate the regenerated master audio clock, and the circuitry in the second mode asserts the pixel clock, and clock regeneration data indicative of at least some of the time stamps and the denominator value N, to the at least one clock generation output, whereby if an external clock regeneration device is coupled to the at least one clock generation output, the external clock regeneration device can employ the pixel clock and the clock regeneration data to generate an externally regenerated master audio clock.

30. The receiver of claim 26, wherein the receiver has at least one clock generation output and an external audio clock input, the circuitry is configured to operate in at least a first mode and a second mode, the circuitry in the first mode employs the frequency divider and the PLL to generate the regenerated master audio clock, and the circuitry in the second mode asserts the pixel clock, and clock regeneration data indicative of at least some of the time stamps and the denominator value N to the at least one clock generation output, wherein the receiver also includes:

an external clock regeneration device coupled to the least one clock generation output and configured to employ the pixel clock and the clock regeneration data to generate an externally regenerated master audio clock and to assert the externally regenerated master audio clock to the external audio clock input, wherein the circuitry is configured to perform, in the second mode, at least one of automatic clock stretching and shrinking, and automatic sample repetition and dropping, on the externally regenerated master audio clock.

31. The receiver of claim 26, wherein the receiver has at least one clock generation output configured to be coupled to an external clock regeneration device, the circuitry is configured to operate in at least a first mode and a second mode, the circuitry in the first mode employs the frequency divider and the PLL to generate the regenerated master audio clock, and the circuitry in the second mode asserts the intermediate clock, and clock regeneration data indicative of the denominator value N, to the at least one clock generation output, whereby if an external clock regeneration device is coupled to the at least one clock generation output, the external clock regeneration device can employ the intermediate clock and the clock regeneration data to generate an externally regenerated master audio clock.

32. The receiver of claim 26, wherein the receiver has at least one clock generation output and an external audio clock input, the circuitry is configured to operate in at least a first mode and a second mode, the circuitry in the first mode employs the frequency divider and the PLL to generate the regenerated master audio clock, and the circuitry in the second mode asserts the intermediate clock, and clock regeneration data indicative of the denominator value N to the at least one clock generation output, wherein the receiver also includes:

an external clock regeneration device coupled to the least one clock generation output and configured to employ the intermediate clock and the clock regeneration data to generate an externally regenerated master audio clock and to assert the externally regenerated master audio clock to the external audio clock input, wherein the circuitry is configured to perform, in the second mode, at least one of automatic clock stretching and shrinking, and automatic sample repetition and dropping, on the externally regenerated master audio clock.

33. The receiver of claim 26, wherein the denominator value N is a non-integer value, and the PLL is configured to generate the regenerated master audio clock in response to the intermediate clock and data indicative of said non-integer value.

34. The receiver of claim 26, wherein the circuitry is configured to generate a frequency-multiplied version of the regenerated master audio clock.

35. The receiver of claim 26, wherein the inputs, each said output, and elements of the circuitry other than the PLL are implemented as a first integrated circuit, and the PLL is implemented as a second integrated circuit coupled to the first integrated circuit.

36. The receiver of claim 26, wherein the PLL includes a phase detector having a first input coupled to receive the intermediate clock, a second input, and an output, a low-pass filter having a filter input coupled to the output of the phase detector and a filter output, a voltage-controlled oscillator having an oscillator input coupled to the filter output and an oscillator output, and a second frequency divider having an input coupled to receive the decoded data indicative of the denominator value N, a second input coupled to the oscillator output, and an output coupled to the second input of the phase detector, wherein all elements of the circuitry other than the low-pass filter are implemented as a first integrated circuit, and the low-pass filter is implemented as a second integrated circuit coupled to the first integrated circuit.

37. The receiver of claim 25, wherein the circuitry is configured to generate data indicative of stable time stamps in response to the pixel clock, and wherein the circuitry is operable in a mode in which it employs at least some of the data indicative of stable time stamps, rather than the time code data indicative of time stamps, with the pixel clock, for audio clock regeneration.

38. The receiver of claim 37, wherein at least some of the decoded data are indicative of a denominator value N that has been employed to generate the time stamps, the circuitry is configured to perform digital filtering on the data indicative of stable time stamps to generate filtered data indicative of low-pass filtered time stamp values.

39. The receiver of claim 38, wherein the circuitry includes:

a frequency divider, coupled to receive the pixel clock and the filtered data indicative of low-pass filtered time stamp values, and configured to generate an intermediate clock having frequency M/N in response thereto, where M is a master audio clock frequency; and a PLL, coupled to receive the intermediate clock and the decoded data indicative of the denominator value N, and configured to generate in response thereto a regenerated master audio clock having the frequency M.

40. The receiver of claim 25, wherein at least some of the decoded data are indicative of a denominator value N that has been employed to generate the time stamps, the circuitry is configured to perform digital filtering on the time code data indicative of time stamps to generate filtered data indicative of low-pass filtered time stamp values.

41. The receiver of claim 40, wherein the circuitry includes:

a frequency divider, coupled to receive the pixel clock and the filtered data indicative of low-pass filtered time stamp values, and configured to generate an intermediate clock having frequency M/N in response thereto, where M is a master audio clock frequency; and a PLL, coupled to receive the intermediate clock and the decoded data indicative of the denominator value N, and configured to generate in response thereto a regenerated master audio clock having the frequency M.

42. A method for transmitting data indicative of an audio clock over a serial link having video channels and a video clock channel, while transmitting encoded video data over the video channels during active video periods, transmitting packets including encoded auxiliary data over the video channels during data islands, and transmitting a pixel clock over the video clock channel, wherein each of the data islands is a time interval that neither coincides with nor overlaps any of the active video periods, and the encoded auxiliary data include encoded audio data, said method including the steps of:

generating time code data, wherein the time code data together with the pixel clock are indicative of an audio clock for the audio data; and including the time code data in at least some of the packets that are transmitted over the video channels during the data islands.

43. A method for recovering an audio clock from data and a video clock that have been transmitted over a serial link having video channels and a video clock channel, wherein the data include encoded video data received on the video channels during active video periods, and packets including encoded auxiliary data received on the video channels during data islands, wherein each of the data islands is a time interval that neither coincides with nor overlaps any of the active video periods, and the encoded auxiliary data include encoded audio data, said method including the steps of:

recovering time code data from at least some of the packets;

receiving the video clock on the video clock channel; and regenerating the audio clock from the time code data and the video clock.

44. A communication system, including:

a receiver;

a transmitter; and a serial link comprising at least one video channel between the transmitter and the receiver, wherein the transmitter is configured to receive video data and audio data, to generate encoded video data and encoded audio data by encoding the video data and audio data, to transmit code words indicative of the encoded video data over the video channel to the receiver in response to a first clock during active video periods, and to transmit packets including encoded auxiliary data to the receiver during data islands by transmitting code words indicative of the packets over the link in response to the first clock, wherein each of the data islands is a time interval that neither coincides with nor overlaps any of the active video periods, wherein the encoded auxiliary data include the encoded audio data, the transmitter is configured to include time code data in at least some of the packets, and the time code data together with the first clock are indicative of an audio clock for the audio data.

45. The system of claim 44, wherein the transmitter is configured to transmit control data to the receiver over the video channel during control data periods, wherein the control data periods neither coincide with nor overlap any of the data islands and neither coincide with nor overlap any of the active video periods.

* * * * *